USOO9500841B2

(12) United States Patent
Ichikawa et al.

(10) Patent No.: US 9,500,841 B2
(45) Date of Patent: Nov. 22, 2016

(54) ZOOM LENS, AND IMAGING APPARATUS INCORPORATING THE SAME

(75) Inventors: Keisuke Ichikawa, Shibuya-ku (JP); Kenji Ono, Shibuya-ku (JP)

(73) Assignee: OLYMPUS CORPORATION, Tokyo (JP)

( * ) Notice: Subject to any disclaimer, the term of this patent is extended or adjusted under 35 U.S.C. 154(b) by 160 days.

(21) Appl. No.: 13/486,926

(22) Filed: Jun. 1, 2012

(65) Prior Publication Data
US 2012/0307372 A1 Dec. 6, 2012

(30) Foreign Application Priority Data

Jun. 3, 2011 (JP) ................................. 2011-124879

(51) Int. Cl.
*G02B 15/177* (2006.01)

(52) U.S. Cl.
CPC ................... *G02B 15/177* (2013.01)

(58) Field of Classification Search
CPC ............ G02B 15/00; G02B 15/14; G02B 15/15; G02B 15/16; G02B 15/20; G02B 15/22; G02B 15/24; G02B 15/155; G02B 15/167; G02B 15/177; G02B 13/009; G02B 7/04; G02B 7/09; G02B 13/18; G02B 27/0006; G02B 27/64
USPC ....... 359/676, 680, 682, 686, 695, 726, 781; 348/335–357, 240.99–240.3
See application file for complete search history.

(56) References Cited

U.S. PATENT DOCUMENTS

| 7,193,786 B2 | 3/2007 | Arimoto et al. |
| 7,375,900 B2 | 5/2008 | Yagyu et al. |
| 7,443,599 B2 | 10/2008 | Kohno et al. |
| 7,458,735 B2 | 12/2008 | Souma et al. |
| 2006/0221212 A1* | 10/2006 | Hankawa et al. ......... 348/240.2 |

(Continued)

FOREIGN PATENT DOCUMENTS

| JP | 2003-043354 | 2/2003 |
| JP | 2003-329930 | 11/2003 |

(Continued)

OTHER PUBLICATIONS

Notice of Rejection received in Application No. JP 2011-124879, drafted Dec. 9, 2014, dispatched Dec. 17, 2014.

*Primary Examiner* — Pascal M Bui Pho
*Assistant Examiner* — Cara Rakowski
(74) *Attorney, Agent, or Firm* — Andrews Kurth Kenyon LLP

(57) ABSTRACT

The zoom lens comprises, from an object side, a first lens group, a second lens group that includes an aperture stop moving integrally therewith, a third lens group, and a fourth lens group having, respectively, negative, positive, negative, and positive refracting power, and during zooming from a wide-angle end to a telephoto end, a spacing between the first and second lens groups becomes narrow, between the second and third lens groups changes, and between the third and fourth lens groups grows wide, and the first lens group includes a first lens having negative refracting power, a second lens having a reflective surface for bending a light ray coming out of an object and a third lens having positive refracting power, and in said second lens group, a most image-plane-side surface of a lens having negative refracting power is configured in a concave shape on an image plane side.

15 Claims, 31 Drawing Sheets

(56) References Cited

U.S. PATENT DOCUMENTS

| | | |
|---|---|---|
| 2006/0268426 A1 | 11/2006 | Arimoto et al. |
| 2006/0280498 A1 | 12/2006 | Souma et al. |
| 2007/0053069 A1 | 3/2007 | Yagyu et al. |
| 2007/0201143 A1 | 8/2007 | Kohno et al. |
| 2009/0059388 A1* | 3/2009 | Miyata ............... G02B 15/177 359/686 |
| 2009/0310225 A1* | 12/2009 | Matsusaka et al. ......... 359/676 |
| 2010/0165480 A1 | 7/2010 | Yamaguchi et al. |
| 2012/0120501 A1* | 5/2012 | Katayose ............ G02B 15/177 359/686 |

FOREIGN PATENT DOCUMENTS

| | | |
|---|---|---|
| JP | 2004-069808 | 3/2004 |
| JP | 2004-205796 | 7/2004 |
| JP | 2004-348082 | 12/2004 |
| JP | 2006-284790 | 10/2006 |
| JP | 2006-330349 | 12/2006 |
| JP | 2006-343554 | 12/2006 |
| JP | 2007-072263 | 3/2007 |
| JP | 2007-232974 | 9/2007 |
| JP | 2008-083125 | 4/2008 |
| JP | 2008-191286 | 8/2008 |
| JP | 2009-265553 | 11/2009 |
| JP | 2010-152143 | 7/2010 |
| JP | 2010-152145 | 7/2010 |
| JP | 2010-152148 | 7/2010 |
| JP | 2010-160277 | 7/2010 |
| JP | 2011-059496 | 3/2011 |
| JP | 2011-059497 | 3/2011 |
| JP | 2011-059498 | 3/2011 |
| JP | 2010-039188 | 2/2012 |
| JP | 2011-039101 | 2/2012 |
| JP | 2004-264343 | 9/2012 |
| JP | 2003-302576 | 10/2012 |
| WO | 2008/072466 | 6/2008 |

* cited by examiner

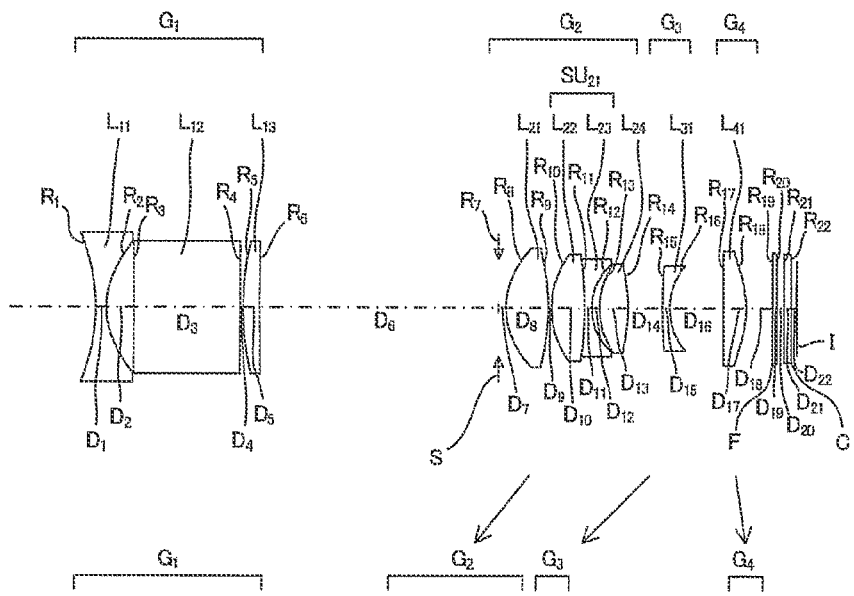
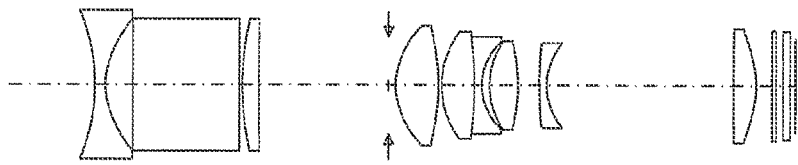
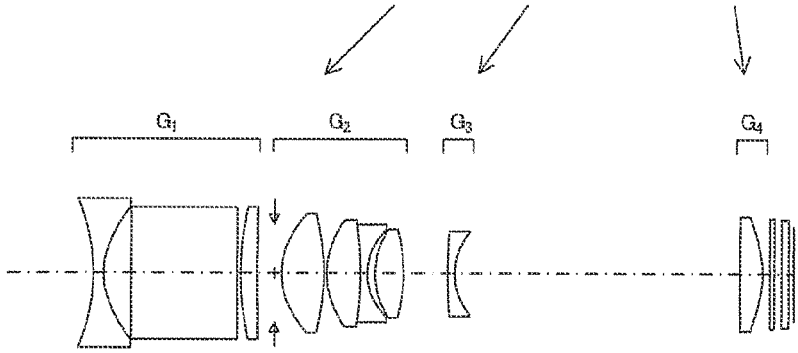
FIG.9A
FIG.9B
FIG.9C

ZOOM LENS, AND IMAGING APPARATUS INCORPORATING THE SAME

BACKGROUND OF THE INVENTION

The present invention relates to a zoom lens used on an imaging module, and an imaging apparatus including that zoom lens.

In recent years, there are mounting demands for digital cameras: they are required to have a small-format, slimmed down yet higher-zoom-ratio, wide-angle arrangement having much more pixels.

Imaging optical systems that have advantageously be used for the slimming-down of optical systems, for instance, include those disclosed in JP(A) 2003-43354 (Patent Publication 1) and JP(A) 2003-302576 (Patent Publication 2). The imaging optical system set forth in Patent Publication 1 or 2 has a reflective optical element for bending an optical path (hereinafter called simply the reflective optical element) included in the most object side lens group.

By the way, the imaging optical system using the reflective optical element is generally broken down into two types depending on whether the lens group including the reflective optical element has negative (Patent Publication 1) or positive (Patent Publication 2) refracting power.

Typical examples where the lens group including the reflective optical element, as viewed from the object side, having positive refracting power are set forth in JP(A) 2003-329930 (Patent Publication 3), JP(A) 2004-264343 (Patent Publication 4), JP(A) 2008-83125 (Patent Publication 5), JP(A) 2008-191286 (Patent Publication 6), JP(A) 2009-265553 (Patent Publication 7), JP(A) 2010-39188 (Patent Publication 8), JP(A) 2011-39101 (Patent Publication 9) and so on.

Typical examples where the lens group including the reflective optical element has negative refracting power are set forth in JP(A) 2004-69808 (Patent Publication 10), JP(A) 2004-205796 (Patent Publication 11), JP(A) 2004-348082 (Patent Publication 12), JP(A) 2010-152145 (Patent Publication 13) and so on.

LISTING OF THE PATENT PUBLICATIONS

Patent Publication 1: JP(A) 2003-43354
Patent Publication 2: JP(A) 2003-302576
Patent Publication 3: JP(A) 2003-329930
Patent Publication 4: JP(A) 2004-264343
Patent Publication 5: JP(A) 2008-83125
Patent Publication 6: JP(A) 2008-191286
Patent Publication 7: JP(A) 2009-265553
Patent Publication 8: JP(A) 2010-39188
Patent Publication 9: JP(A) 2011-39101
Patent Publication 10: JP(A) 2004-69808
Patent Publication 11: JP(A) 2004-205796
Patent Publication 12: JP(A) 2004-348082
Patent Publication 13: JP(A) 2010-152145

SUMMARY OF THE INVENTION

A zoom lens according to one aspect of the invention comprises, in order from an object side, a first lens group having negative refracting power, a second lens group that includes an aperture stop moving integrally therewith and has positive refracting power, a third lens group having negative refracting power, and a fourth lens group having positive refracting power, and is characterized in that during zooming from a wide-angle end to a telephoto end, a spacing between said first lens group and said second lens group becomes narrow, a spacing between said second lens group and said third lens group changes, and a spacing between said third lens group and said fourth lens group grows wide, and said first lens group includes a first lens having negative refracting power, a second lens having a reflective surface for bending a light ray coming out of an object and a third lens having positive refracting power, and in said second lens group, a most image-plane-side surface of a lens having negative refracting power is configured in a concave shape on an image plane side.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 9 is a set of sectional views of the lens system of Example 9 as taken apart and along an optical axis.

DESCRIPTION OF EXEMPLARY EMBODIMENTS

Figure 1A:
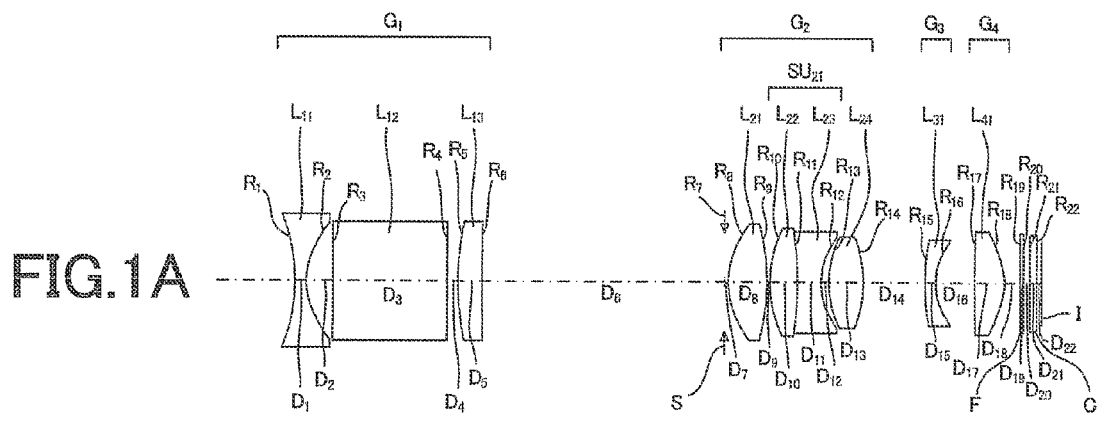
FIG. 1 is a set of sectional views of the lens system of Example 1 as taken apart and along an optical axis.

Prior to examples, the advantages of embodiments according to one aspect of the invention will now be explained; however, the invention is not limited by this embodiment. The description of embodiments includes some specific, detailed contents for exemplification, and those skilled in the art would understand that even variations or changes to those detailed contents will not go beyond the scope of the invention. Thus, the exemplary embodiments of the invention, given later, are described without losing the generality of, and imposing any limitation on, the invention sought for protection of rights.

The zoom lens described hereinafter comprises, in order from an object side, a first lens group having negative refracting power, a second lens group that includes an aperture stop moving integrally therewith and has positive refracting power, a third lens group having negative refracting power, and a fourth lens group having positive refracting power, wherein during zooming from a wide-angle end to a telephoto end, the spacing between said first lens group and said second lens group becomes narrow, the spacing between said second lens group and said third lens group changes, and the spacing between said third lens group and said fourth lens group becomes wide, and said first lens group includes a first lens having negative refracting power, a second lens having a reflective surface for bending an optical ray coming out of an object and a third lens having positive refracting power, and in said second lens group, a most image-plane-side surface of a lens having negative refracting power is configured in a concave shape on an image plane side.

Now the arrangements of, and the requirements for, the invention will be explained. Note here that the positive lens is defined by a lens whose paraxial focal distance takes on a positive value, and the negative lens is defined by a lens whose paraxial focal length takes on a negative value.

According to the arrangement of the invention comprises, in order from an object side, a first lens group having negative refracting power, a second lens group that includes an aperture stop moving integrally therewith and has posi-tive refracting power, a third lens group having negative refracting power, and a fourth lens group having positive refracting power, wherein during zooming from the wide-angle end to the telephoto end, the spacing between said first lens group and said second lens group becomes narrow, the spacing between said second lens group and said third lens group changes, and the spacing between said third lens group and said fourth lens group grows wide, it is possible to keep sensitivity to decentration lower, and make the whole length shorter, with a reduced lenses count.

The first lens group includes the first lens having negative refracting power, the second lens having a reflective surface for bending light rays coming out of an object and the third lens having positive refracting power so that slimming-down in the depth direction, viz., the slimming-down of the second lens is easily achievable.

In the second lens group, the image plane side surface of the lens having negative refracting power is so configured in a concave shape on the image plane side that various aberrations inclusive of chromatic aberrations, spherical aberrations and comas can be more easily corrected, and performance can be ensured while keeping the whole length shorter.

For the reason as described above, it is easy to provide a zoom lens having an angle of view of greater than 40° at the wide-angle end and a zoom ratio of the order of about 5. In particular, it is easy to keep sensitivity to decentration (the degree of aberration deteriorations due to decentration errors) lower. It is also easy to provide a zoom lens that is comprised of fewer lenses, has a curtailed whole length, and is slimmed down in the depth direction.

According to the arrangement as described above, it is possible to provide a zoom lens that has a high zoom ratio and a curtailed whole length, keeps sensitivity to decentration (the degree of aberration deteriorations due to decentration errors) in particular lower and has a reduced lenses count, and an imaging apparatus incorporating the same.

Further, the optical system as described above should preferably satisfy any one of the following requirements.

It is preferable for the zoom lens of the aforesaid arrangement to satisfy the following condition (1):

$$0 < fw/f13 < 1.0 \tag{1}$$

where f13 is the focal length of the third lens in the first lens group, and fw is the focal length of the whole system at the wide-angle end (upon focusing on an infinite object point).

As the lower limit value of Condition (1) is not reached, it would cause the second lens to get thick, rendering depthwise slimming-down difficult.

As the upper limit value of Condition (1) is exceeded, it would cause the lens elements that form the first lens group together to have too tight a curvature. In particular, it would cause distortion, meridional field curvature or coma to go worse at the wide-angle end.

Note here that it is more preferable to satisfy the following Condition (1) instead of Condition (1):

$$0.04 < fw/f13 < 0.8 \tag{1}$$

It is even more preferable to satisfy the following Condition (1) instead of Condition (1):

$$0.06 < fw/f13 < 0.6 \tag{1}$$

It is more preferable to satisfy the following Condition (1) instead of Condition (1):

$$0.08 < fw/f13 < 0.5 \tag{1}$$

It is preferable for the zoom lens to satisfy the following Condition (2):

$$0 < ft/f13 < 3.0 \quad (2)$$

where f13 is the focal length of the third lens in the first lens group, and ft is the focal length of the whole system at the telephoto end (upon focusing on an infinite object point).

As the lower limit value of Condition (2) is not reached, it would render correction of longitudinal chromatic aberration on the telephoto side difficult.

As the upper limit value of Condition (2) is exceeded, it would cause the lens elements that form the first lens group to have too tight a curvature, making spherical aberrations and coma on the telephoto side in particular likely to go worse.

It is more preferable to satisfy the following Condition (2) instead of Condition (2):

$$0.2 < ft/f13 < 2.4 \quad (2)$$

It is even more preferable to satisfy the following Condition (2) instead of Condition (2):

$$0.3 < ft/f13 < 1.8 \quad (2)$$

It is more preferable to satisfy the following Condition (2) instead of Condition (2):

$$0.4 < ft/f13 < 1.5 \quad (2)$$

It is preferable for the zoom lens to satisfy the following Condition (3):

$$-3.0 < fw/f11 < -0.41 \quad (3)$$

where f11 is the focal length of the first lens in the first lens group, and fw is the focal length of the whole system at the wide-angle end (upon focusing on an infinite object point).

As the upper limit value of Condition (3) is exceeded, it would cause the second lens to get thick, rendering depth-wise slimming-down difficult.

As the lower limit value of Condition (3) is not reached, it would cause the lens elements that form the first lens group together to have too tight a curvature. This would in turn cause distortion, meridional field curvature or coma to go worse at the wide-angle end in particular.

It is more preferable to satisfy the following Condition (3) instead of Condition (3):

$$-2.4 < fw/f11 < -0.51 \quad (3)$$

It is even more preferable to satisfy the following Condition (3) instead of Condition (3):

$$-2.0 < fw/f11 < -0.56 \quad (3)$$

It is more preferable to satisfy the following Condition (3) instead of Condition (3):

$$-1.8 < fw/f11 < -0.58 \quad (3)$$

It is preferable for the zoom lens to satisfy the following Condition (4):

$$-9.0 < ft/f11 < -1.0 \quad (4)$$

where f11 is the focal length of the first lens in the first lens group, and ft is the focal length of the whole system at the telephoto end (upon focusing on an infinite object point).

As the lower limit value of Condition (4) is not reached, it would render correction of longitudinal chromatic aberration on the telephoto side difficult.

As the upper limit value of Condition (4) is exceeded, it would cause the lens elements that form the first lens group to have too tight a curvature. This would in turn cause spherical aberrations and coma to go worse on the telephoto side in particular.

It is more preferable to satisfy the following Condition (4) instead of Condition (4).

$$-8.0 < ft/f11 < -1.5 \quad (4)$$

It is even more preferable to satisfy the following Condition (4) instead of Condition (4).

$$-7.0 < ft/f11 < -2.1 \quad (4)$$

It is more preferable to satisfy the following Condition (4) instead of Condition (4).

$$-6.0 < ft/f11 < -2.4 \quad (4)$$

It is preferable for the zoom lens to satisfy the following Condition (5):

$$-0.6 < f11/f13 < 0 \quad (5)$$

As the upper limit value of Condition (5) is exceeded, it would cause the second lens to get thick while, at the same time, correction of chromatic aberrations to get difficult from the wide-angle end to the telephoto end.

As the lower limit value of Condition (5) is not reached, it would cause the refracting power of the whole first lens group to get low, rendering it difficult to make sure the desired zoom ratio.

It is more preferable to satisfy the following condition (5) instead of Condition (5).

$$-0.5 < f11/f13 < -0.04 \quad (5)$$

It is even more preferable to satisfy the following condition (5) instead of Condition (5).

$$-0.4 < f11/f13 < -0.08 \quad (5)$$

It is more preferable to satisfy the following condition (5) instead of Condition (5).

$$-0.3 < f11/f13 < -0.12 \quad (5)$$

For the zoom lens it is preferable to satisfy the following Condition (6):

$$0.0181 < 1/v13 - 1/v11 < 0.05 \quad (6)$$

where v11 is the Abbe constant of the medium of the first lens in the first lens group, and v13 is the Abbe constant of the medium of the third lens in the first lens group.

As the lower limit value of Condition (6) is not reached, it would render correction of longitudinal chromatic aberration at the telephoto end and chromatic aberration of magnification at the wide-angle end difficult.

As the upper limit value of Condition (6) is exceeded, it would cause overcorrection of the aforesaid chromatic aberrations.

It is more preferable to satisfy the following Condition (6) instead of Condition (6).

$$0.0183 < 1/v13 - 1/v11 < 0.06 \quad (6)$$

It is even more preferable to satisfy the following Condition (6) instead of Condition (6).

$$0.0184 < 1/v13 - 1/v11 < 0.05 \quad (6)$$

For the zoom lens it is preferable to satisfy the following Condition (7):

$$-1.50 < f1/f < -0.20 \quad (7)$$

where f1 is the combined focal length of the first lens group, and ff1 is the front focal position of the first lens group.

As the upper limit value of Condition (7) is exceeded, it would make the second lens likely to get thick.

As the lower limit value of Condition (7) is not reached, it would render correction of distortion and coma difficult, resulting in the inability to make sure the desired zoom ratio.

It is more preferable to satisfy the following Condition (7) instead of Condition (7).

$$-1.03 < ff1/f1 < -0.30 \tag{7}$$

It is even more preferable to satisfy the following Condition (7) instead of Condition (7).

$$-1.00 < ff1/f1 < -0.35 \tag{7}$$

For the zoom lens it is preferable to satisfy the following Condition (8):

$$-0.5 < (R11F + R11R)/(R11F - R11R) < 1.8 \tag{8}$$

where R11F is the radius of curvature of the object-side surface of the first lens in the first lens group, and R11R is the radius of curvature of the image-side surface of the first lens in the first lens group.

As the upper limit value of Condition (8) is exceeded, it would render the second lens likely to get thick, and spherical aberrations and coma on the telephoto side likely to go worse as well.

As the lower limit value of Condition (8) is not reached, it would render distortion, meridional field curvature or coma on the wide-angle side likely to go worse.

It is more preferable to satisfy the following Condition (8) instead of Condition (8).

$$-0.3 < (R11F + R11R)/(R11F - R11R) < 1.0 \tag{8}$$

It is even more preferable to satisfy the following Condition (8) instead of Condition (8).

$$-0.1 < (R11F + R11R)/(R11F - R11R) < 0.93 \tag{8}$$

It is more preferable to satisfy the following Condition (8) instead of Condition (8).

$$-0.0 < (R11F + R11R)/(R11F - R11R) < 0.90 \tag{8}$$

For making the full zoom lens length shorter, it is effective to make the refracting power of the second lens group stronger. In consideration of correction of various aberrations inclusive of chromatic aberrations and coma, the second lens group should preferably be composed of three lens components. If, of the three lens components in the second lens group, any one lens component is made up of a plurality of cemented lenses, it would be desired for correction of chromatic aberrations and coma. To reduce fluctuations of chromatic aberrations and coma during zooming, it is preferable that, of the three lens components in the second lens group, the middle one is a cemented lens component. In view of making the full zoom lens length shorter, that cemented lens component should preferably comprise a positive lens and a negative lens in order from the object side.

Because the third lens group may also be used as a focus lens, it should preferably be made up of one lens component. If aberration fluctuations at the time of focusing are taken in account, the third lens group should preferably be made up of a single lens.

At the time of zooming, the third lens group moves in a single direction from the wide-angle end all the way to the telephoto end, as is the case with the second lens group. In consideration of zooming efficiency and focus space, the third lens group is designed to move such that it is positioned more on the object side at the telephoto end than at the wide-angle end.

For the zoom lens it is preferable to satisfy the following Condition (9):

$$0.03 < D23t/D34t < 0.95 \tag{9}$$

where D23t is the distance from the vertex of the most-image-side refractive surface in the second lens group to the vertex of the most-object-side refractive surface in the third lens group upon focusing on an infinite object point, and D34t is the distance from the vertex of the most-image-side refractive surface in the third lens group to the vertex of the most-object-side refractive surface in the fourth lens group upon focusing on an infinite object point.

As the upper limit value of Condition (9) is exceeded, it would render the zooming action by the third lens group tenuous, and cause moving space for focusing to be hardly secured in some instances.

As the lower limit value of Condition (9) is not reached, it would cause sensitivity to decentration (esp., coma) to go worse on the telephoto end.

It is more preferable to satisfy the following Condition (9) instead of Condition (9).

$$0.06 < D23t/D34t < 0.59 \tag{9}$$

It is even more preferable to satisfy the following Condition (9) instead of Condition (9).

$$0.08 < D23t/D34t < 0.57 \tag{9}$$

For making the full zoom lens length shorter and making sure moving space for the movable groups, the fourth lens group should desirously be composed of one lens component, more preferably a single lens.

For the zoom lens it is preferable to satisfy the following Condition (10):

$$0.45 < M3/M2 < 1.30 \tag{10}$$

where M2 is the amount of movement of the second lens group from the wide-angle end to the telephoto end upon focusing on an infinite object point, and M3 is the amount of movement of the third lens group from the wide-angle end to the telephoto end upon focusing on an infinite object point.

The main purpose of the embodiment here is to slim down the second lens and curtail the full length thereby reducing the size of the optical system. And the first lens group is made up of the first lens having negative refracting power, the second lens having a reflective surface operable to bend light rays coming out of an object, and the third lens group having positive refracting power. For this reason, the second and the third lens group move during zooming such that the combined magnification becomes about −1.

As the upper limit value of Condition (10) is exceeded, it would cause the optical system to grow bulky.

As the lower limit value of Condition (10) is not reached, too, it would cause the optical system to grow bulky.

Unreasonable size reductions would cause worsening of meridional field curvature, coma or chromatic aberration of magnification at the wide-angle end, spherical aberrations, coma or longitudinal chromatic aberration at the telephoto end or longitudinal chromatic aberration at an intermediate focal distance.

It is more preferable to satisfy the following Condition (10) instead of Condition (10).

$$0.64 < M3/M2 < 1.25 \tag{10}$$

It is even more preferable to satisfy the following Condition (10) instead of Condition (10).

$$0.70 < M3/M2 < 1.20 \quad (10)$$

For the zoom lens it is preferable to satisfy the following Condition (11):

$$-0.50 < M4/M2 < -0.01 \quad (11)$$

where M2 is the amount of movement of the second lens group from the wide-angle end to the telephoto end upon focusing on an infinite object point, and M4 is the amount of movement of the fourth lens group from the wide-angle end to the telephoto end upon focusing on an infinite object point.

As the upper limit value of Condition (11) is exceeded, it would render it difficult to obtain sufficient zoom ratios, and unreasonably increased zoom ratios would tend to give rise to large fluctuations of meridional field curvature at the time of zooming.

As the lower limit value of Condition (11) is not reached, it would cause zooming space for each group to get narrow, rather resulting in difficulty in obtaining sufficient zoom ratios.

It is more preferable to satisfy the following Condition (11) instead of Condition (11).

$$-0.30 < M4/M2 < -0.03 \quad (11)$$

It is even more preferable to satisfy the following Condition (11) instead of Condition (11).

$$-0.20 < M4/M2 < -0.04 \quad (11)$$

When there is the third lens group moved in the optical axis direction upon focusing, the zoom lens should preferably satisfy the following Condition (12):

$$-1.5 < f4/f3 < -0.2 \quad (12)$$

where f3 is the focal length of the third lens group, and f4 is the focal length of the fourth lens group.

As the lower limit value of Condition (12) is not reached, it would render coma and meridional field curvature likely to fluctuate largely during zooming or focusing.

As the upper limit value of Condition (12) is exceeded, it would cause the amount of movement during focusing to grow large, rendering it difficult to implement focusing at a near distance. Alternatively, it would render the diameter of the fourth lens group likely to grow large.

It is more preferable to satisfy the following Condition (12) instead of Condition (12).

$$-1.08 < f4/f3 < -0.3 \quad (12)$$

It is even more preferable to satisfy the following Condition (12) instead of Condition (12).

$$-1.04 < f4/f3 < -0.35 \quad (12)$$

For the zoom lens it is preferable to satisfy the following Condition (13):

$$-0.90 < \beta 23w < -0.30 \quad (13)$$

where $\beta 23w$ is the combined magnification of the second lens group and the third lens group upon focusing on an infinite object point at the wide-angle end.

As the upper limit value of Condition (13) is exceeded, it would cause the optical system to grow bulky.

As the lower limit value of Condition (13) is not reached, too, it would cause the optical system to grow bulky.

Unreasonable size reductions would cause worsening of meridional field curvature, coma or chromatic aberration of magnification at the wide-angle end, spherical aberrations, coma or longitudinal chromatic aberration at the telephoto end or longitudinal chromatic aberration at an intermediate focal distance.

It is more preferable to satisfy the following Condition (13) instead of Condition (13).

$$-0.69 < \beta 23w < -0.40 \quad (13)$$

It is even more preferable to satisfy the following Condition (13) instead of Condition (13).

$$-0.66 < \beta 23w < -0.45 \quad (13)$$

For the zoom lens it is preferable to satisfy the following Condition (14):

$$-3.0 < \beta 23t < -1.1 \quad (14)$$

where $\beta 23t$ is the combined magnification of the second lens group and the third lens group at the telephoto end (upon focusing on an infinite object point).

As the upper limit value of Condition (14) is exceeded, it would cause the optical system to grow bulky.

As the lower limit value of Condition (14) is not reached, too, it would cause the optical system to grow bulky.

Unreasonable size reductions would cause worsening of meridional field curvature, coma or chromatic aberration of magnification at the wide-angle end, spherical aberrations, coma or longitudinal chromatic aberration at the telephoto end or longitudinal chromatic aberration at an intermediate focal distance.

It is more preferable to satisfy the following Condition (14) instead of Condition (14).

$$-2.7 < \beta 23t < -1.3 \quad (14)$$

It is even more preferable to satisfy the following Condition (14) instead of Condition (14).

$$-2.5 < \beta 23t < -1.5 \quad (14)$$

For the zoom lens it is preferable to satisfy the following Condition (15):

$$0.24 < \log(\Delta \beta 34)/\log \gamma < 0.7 \quad (15)$$

where $\Delta \beta 34$ is the quantity of change in the combined magnification of the third lens group and the fourth lens group from the wide-angle end to the telephoto end upon focusing on an infinite object point, and $\gamma$ is the zoom ratio of the whole system.

In the zoom lens of the embodiment here, the zooming function is shared by not only the second lens group but also the third lens group and the fourth lens group so that correction of aberrations is easily achievable.

As the lower limit value of Condition (15) is not reached, it would cause burdens on the second lens group to grow heavy, rendering coma and meridional field curvature likely to fluctuate during zooming.

As the upper limit value of Condition (15) is exceeded, it would cause the full length to grow long or, conversely, render it difficult to obtain sufficient zoom ratios.

It is more preferable to satisfy the following Condition (15) instead of Condition (15).

$$0.31 < \log(\Delta \beta 34)/\log \gamma < 0.6 \quad (15)$$

It is even more preferable to satisfy the following Condition (15) instead of Condition (15).

$$0.31 < \log(\Delta \beta 34)/\log \gamma < 0.5 \quad (15)$$

For the zoom lens it is preferable to satisfy the following Condition (16):

$$-0.70 < fw/f1 < -0.25 \quad (16)$$

where f1 is the focal length of the first lens group, and fw is the focal length of the whole system at the wide-angle end (upon focusing on an infinite object point).

As the lower limit value of Condition (16) is not reached, it would cause the second lens to get large or distortion, meridional field curvature and coma at the wide-angle end or spherical aberrations at the telephoto end would be likely to go worse.

As the upper limit value of Condition (16) is exceeded, it would render it difficult to gain any desired zoom ratio.

It is more preferable to satisfy the following Condition (16) instead of Condition (16).

$$-0.50 < fw/f1 < -0.30 \quad (16)$$

It is even more preferable to satisfy the following Condition (16) instead of Condition (16).

$$-0.50 < fw/f1 < -0.35 \quad (16)$$

The zoom lenses of Examples 1 to 14 will now be explained with reference to the accompanying drawing in which FIGS. 1 to 14 are sets of sectional views of the lens systems of Examples 1 to 14 as taken apart and along the optical axes. In each figure, A is indicative of the wide-angle end (upon focusing on an infinite object point), B of an intermediate setting (upon focusing on an infinite object point), and C of the telephoto end (upon focusing on an infinite object point).

It is here to be noted that each example is designed as an interchangeable lens mounted on a camera body free of a quick-return mirror, providing a lens system capable of taking moving images. As a matter of course, it may be applied to an interchangeable lens for single-lens reflex cameras.

In each figure, the first lens group is indicated by $G_1$, the second lens group by $G_2$, an aperture stop by S, the third lens group by $G_3$, the fourth lens group by $G_4$, an optical low-pass filter by F, a cover glass of a CCD that is an electronic imaging device by C and an image plane of the CCD by I. Note here that a near-infrared sharp cut coat may be applied directly on the optical low-pass filter F as an example, or there may be a separate infrared cut absorption filter located in place.

Figure 1B:
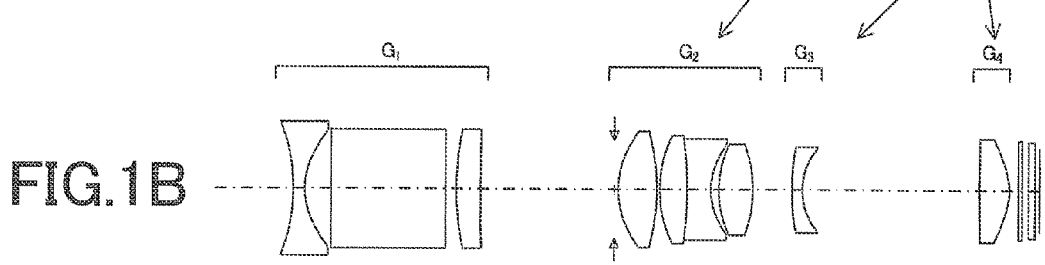
Figure 1C:
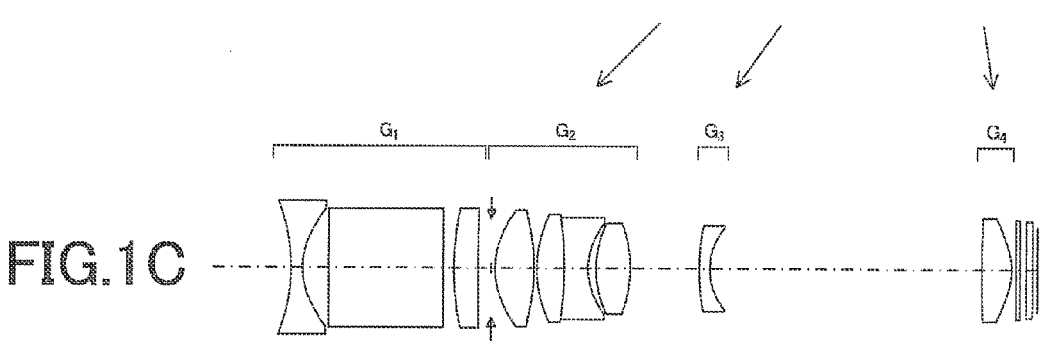

FIG. 1 is a set of sectional views of the lens system exemplified in Example 1.

As shown, the lens system of Example 1 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Seven aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, two at both surfaces $R_{15}$ and $R_{16}$ of the negative meniscus lens $L_{31}$ forming the third lens group $G_3$, and one at the image-plane-side surface $R_{18}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 2A:
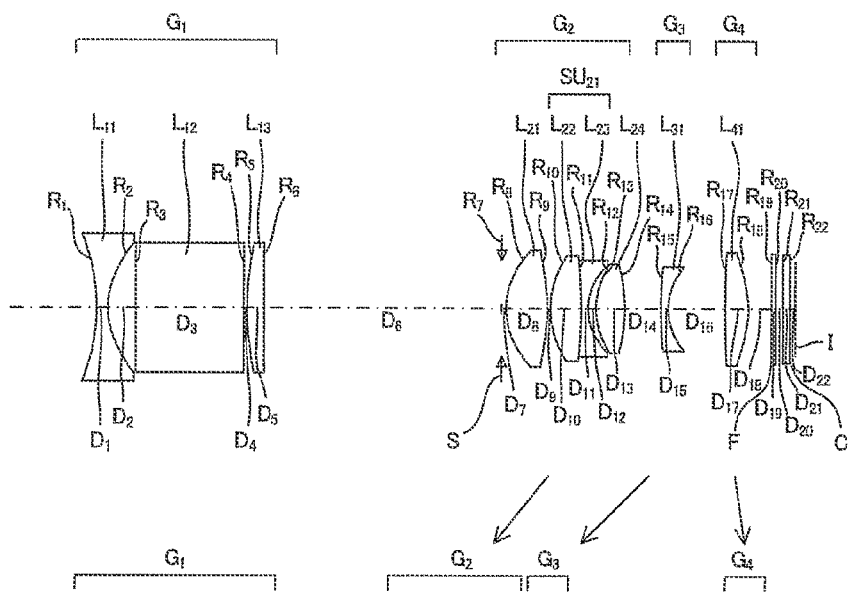
FIG. 2 is a set of sectional views of the lens system of Example 2 as taken apart and along an optical axis.
Figure 2B:
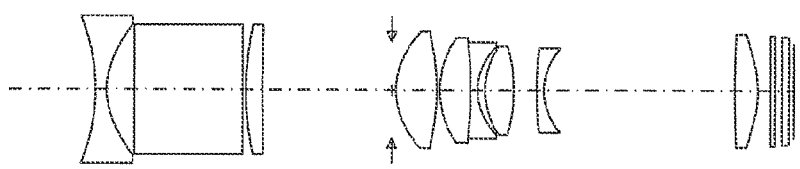
Figure 2C:
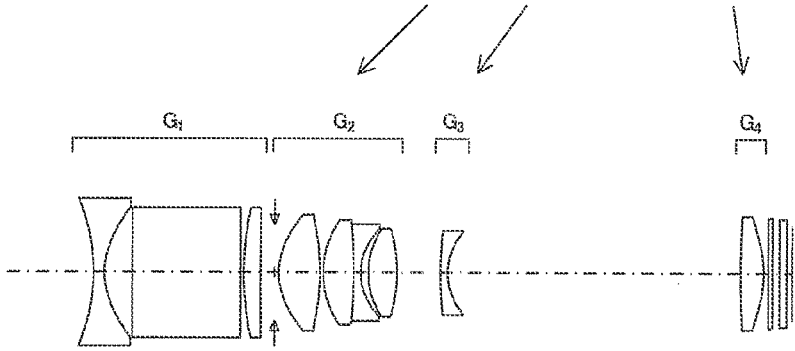

FIG. 2 is a set of sectional views of the lens system exemplified in Example 2.

As shown, the lens system of Example 2 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group G2 includes, in order from the object side to the image side, a double-convex positive lens $L_{21}$, a cemented lens $SU_2$, of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Seven aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, two at both surfaces $R_{15}$ and $R_{16}$ of the negative meniscus lens $L_31$ forming the third lens group $G_3$, and one at the image-plane-side surface $R_{18}$ of the double-convex positive lens $L_{41}$ forming the fourth lens group Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 3A:
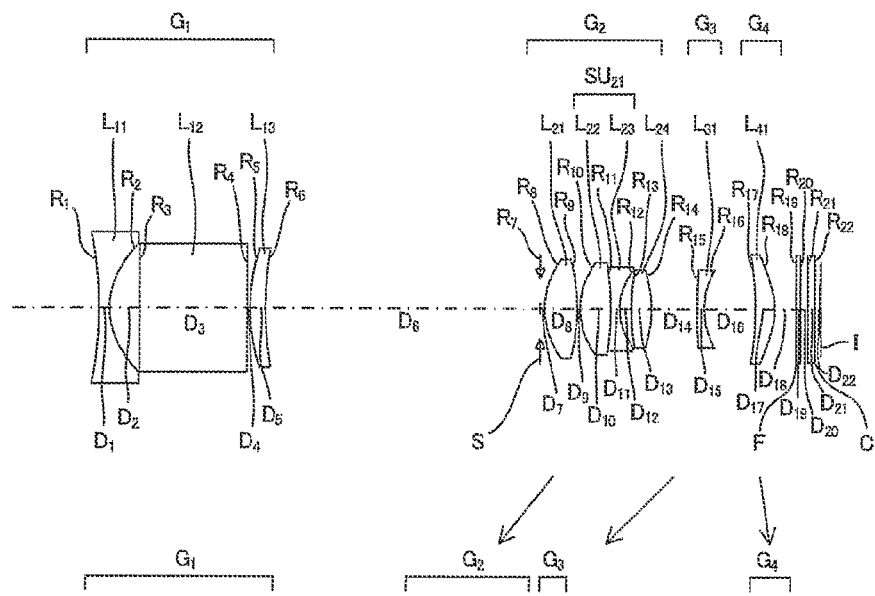
FIG. 3 is a set of sectional views of the lens system of Example 3 as taken apart and along an optical axis.
Figure 3B:
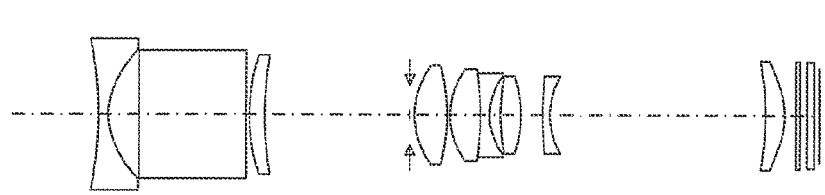
Figure 3C:
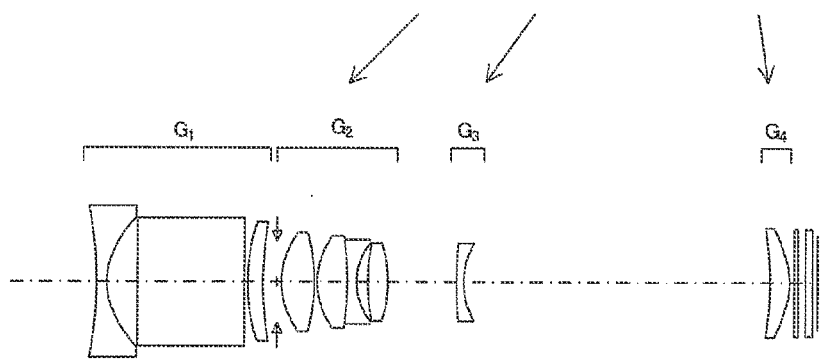

FIG. 3 is a set of sectional views of the lens system exemplified in Example 3.

As shown, the lens system of Example 3 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one positive meniscus lens $L_{41}$ convex on its image side.

Five aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, and one at the image-plane-side surface $R_{18}$ of the positive meniscus lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 4A:
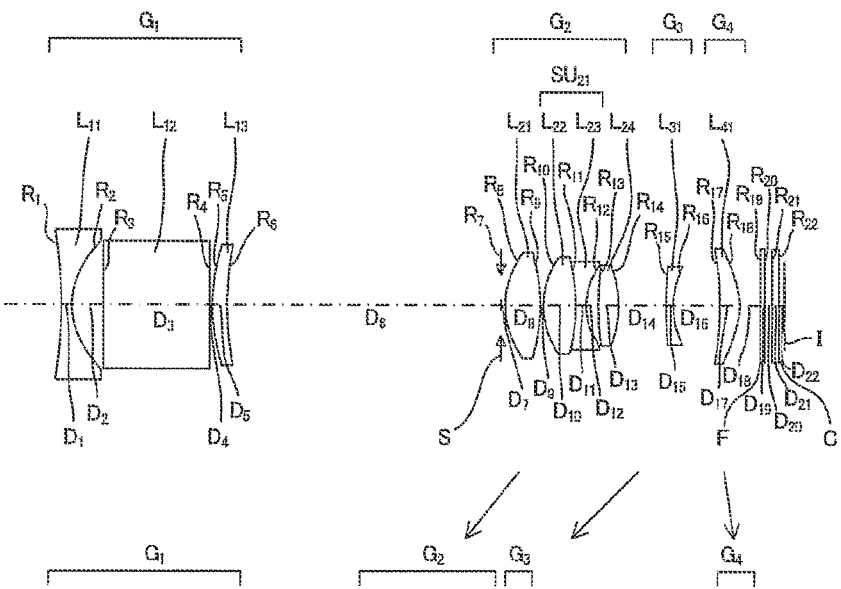
FIG. 4 is a set of sectional views of the lens system of Example 4 as taken apart and along an optical axis.
Figure 4B:
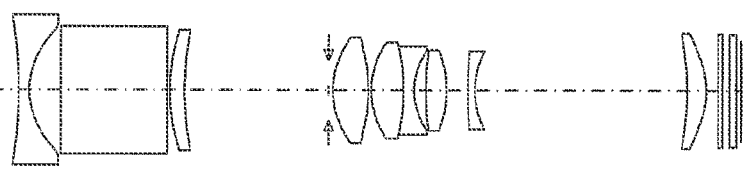
Figure 4C:
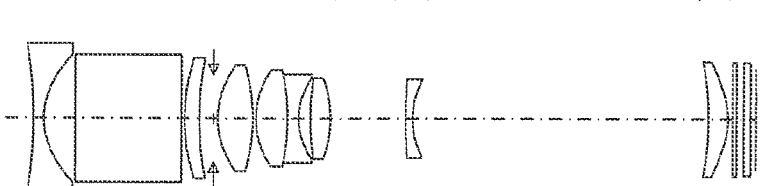

FIG. 4 is a set of sectional views of the lens system exemplified in Example 4.

As shown, the lens system of Example 4 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one positive meniscus lens $L_{41}$ convex on its image side.

Five aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, and one at the image-plane-side surface $R_{18}$ of the positive meniscus lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 5A:
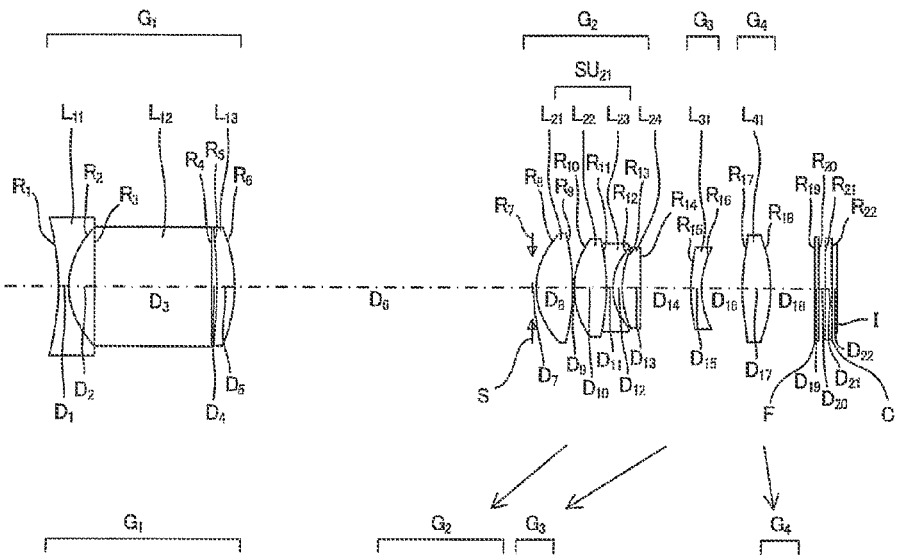
FIG. 5 is a set of sectional views of the lens system of Example 5 as taken apart and along an optical axis.
Figure 5B:
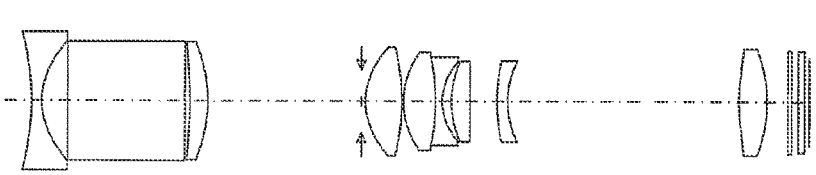
Figure 5C:
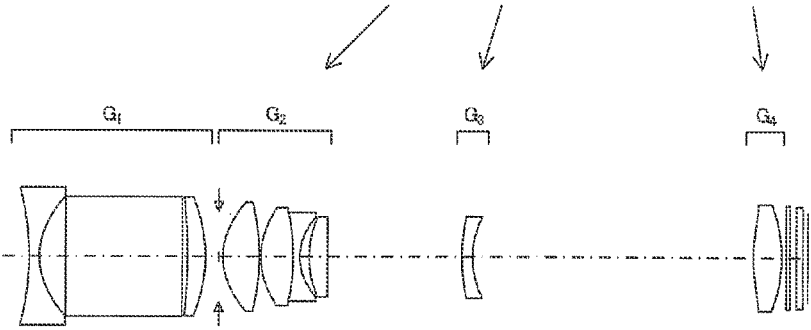

FIG. 5 is a set of sectional views of the lens system exemplified in Example 5.

As shown, the lens system of Example 5 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its image plane side.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a positive meniscus lens $L_{24}$ convex on its object side.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Seven aspheric surfaces are used: two at both surfaces $R_1$ and $R_2$ of the double-concave negative lens $L_{11}$ in the first lens group $G_1$, two at both surfaces $R_5$ and $R_6$ of the positive meniscus lens $L_{13}$ in the first lens group G1, two at both surfaces $R_8$ and $R_9$ of the double-convex positive lens $L_{21}$ in the second lens group $G_2$, and one at the object-side surface $R_{17}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 6A:
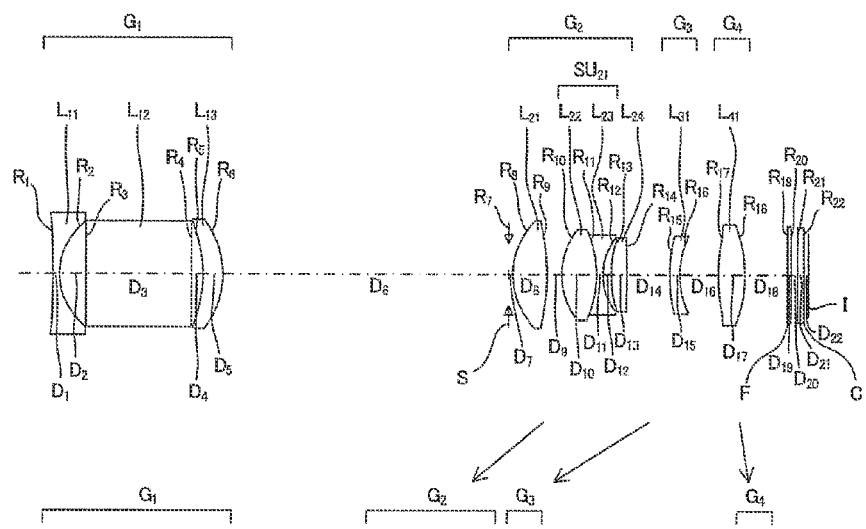
FIG. 6 is a set of sectional views of the lens system of Example 6 as taken apart and along an optical axis.
Figure 6B:
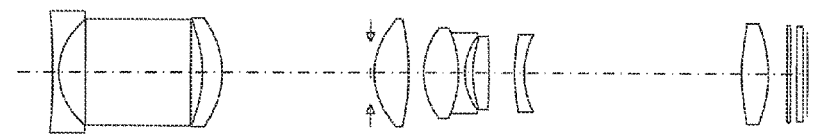
Figure 6C:
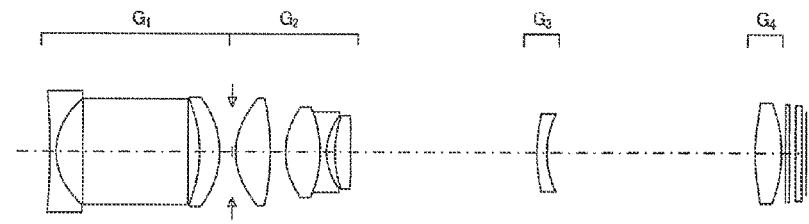

FIG. 6 is a set of sectional views of the lens system exemplified in Example 6.

As shown, the lens system of Example 6 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its image plane side.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex lens $L_{41}$.

Five aspheric surfaces are used: two at both surfaces $R_5$ and $R_6$ of the positive meniscus lens $L_{13}$ in the first lens group $G_1$, two at both surfaces $R_8$ and $R_9$ of the object-side double-convex positive lens $L_{21}$ in the second lens group $G_2$, and one at the object-side surface $R_{17}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ gets narrow. The third lens group $G_3$ is positioned more on the object side at the telephoto end than at the wide-angle end.

From the wide-angle end to the telephoto end, the fourth lens group $G_4$ moves to the image plane side while the spacing between the third lens group $G_3$ and it grows wide, and from the intermediate setting to the telephoto end, the fourth lens group $G_4$ moves to the image plane side while the spacing between the third lens group $G_3$ and it gets narrow. The fourth lens group $G_4$ is positioned more on the image plane side at the telephoto end than at the wide-angle end.

Figure 7A:
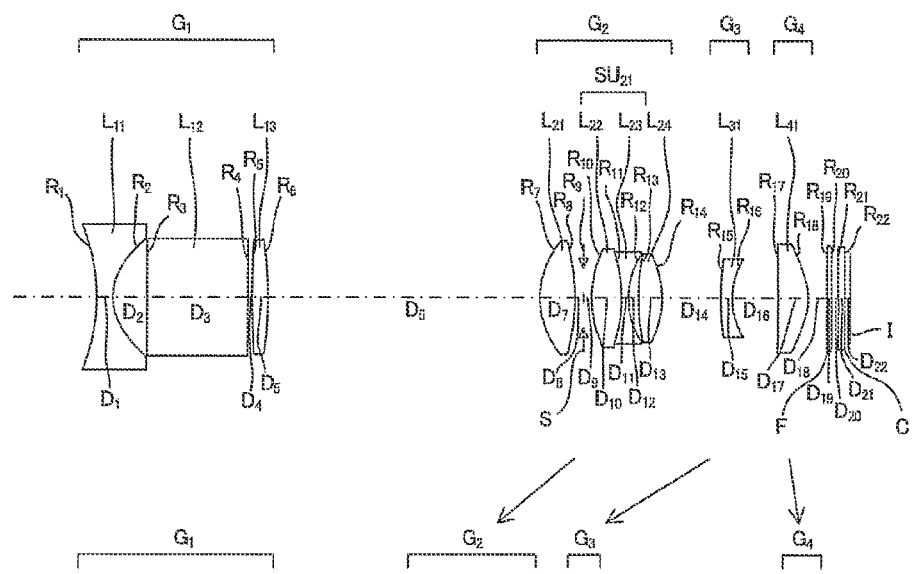
FIG. 7 is a set of sectional views of the lens system of Example 7 as taken apart and along an optical axis.
Figure 7B:
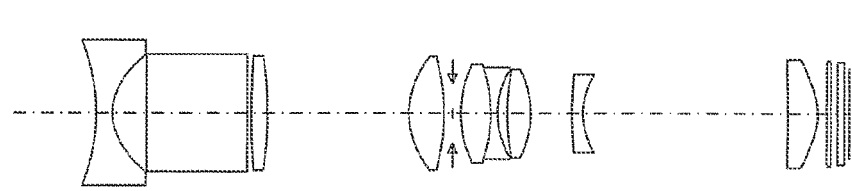
Figure 7C:
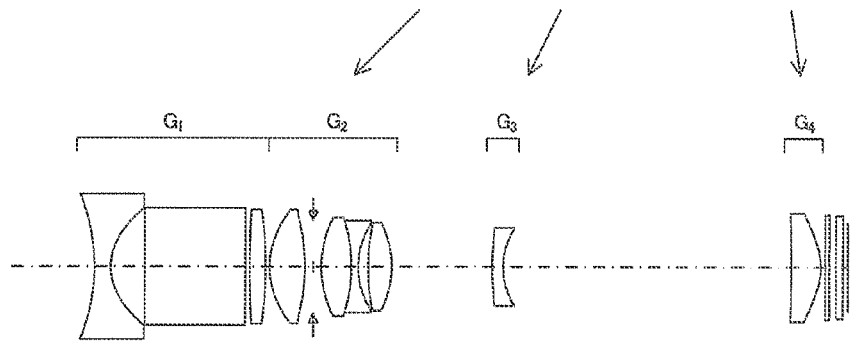

FIG. 7 is a set of sectional views of the lens system exemplified in Example 7.

As shown, the lens system of Example 7 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a double-convex lens $L_{13}$.

The second lens group G2 includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the image plane side of the double-convex positive lens $L_{21}$ in the second lens group $G_2$ and on the object side of the cemented lens $SU_{21}$.

The third lens group $G_3$ includes one negative meniscus lens $L_{31}$ convex on its object side.

The fourth lens group $G_4$ includes one positive meniscus lens $L_{31}$ convex on its image plane side.

Seven aspheric surfaces are used: two at both surfaces $R_1$ and $R_2$ of the double-concave negative lens $L_{11}$ in the first lens group $G_1$, one at the image-plane-side surface $R_6$ of the double-convex positive lens $L_{13}$ in the first lens group $G_1$, two at both surfaces $R_8$ and $R_9$ of the double-convex positive lens $L_{21}$ in the second lens group one at the image-plane-side surface $R_{16}$ of the negative meniscus lens $L_{31}$ forming the third lens group $G_3$, and one at the image-plane-side surface $R_{18}$ of the positive meniscus lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 8A:
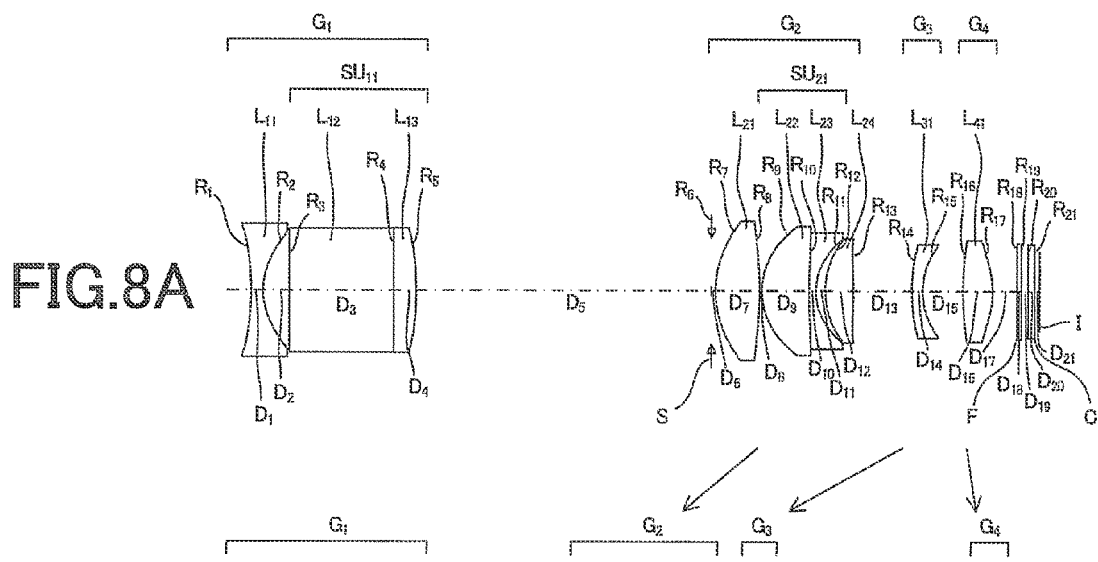
FIG. 8 is a set of sectional views of the lens system of Example 8 as taken apart and along an optical axis.
Figure 8B:
Figure 8C:
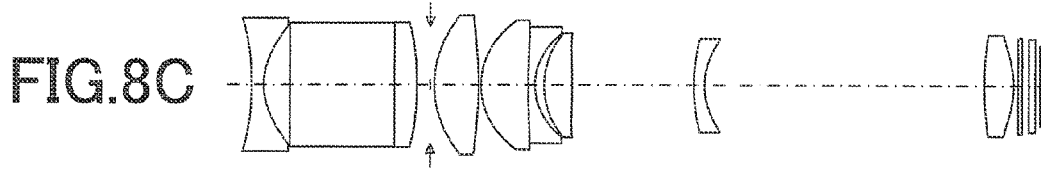

FIG. 8 is a set of sectional views of the lens system exemplified in Example 8.

As shown, the lens system of Example 8 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$ and a cemented lens $SU_{11}$ of a double-plane prism lens $L_{12}$ and a planoconvex positive lens $L_{13}$ convex on its image plane side.

The second lens group $G_2$ includes, in order from the object side to the image side, a double-convex positive lens $L_{21}$, a cemented lens $SU_{21}$ of a positive meniscus lens $L_{22}$ convex on its object side and a negative meniscus lens $L_{23}$ convex on its object side, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex lens $L_{41}$.

Nine aspheric surfaces are used: two at both surfaces $R_1$ and $R_2$ of the double-concave negative lens $L_{11}$ in the first lens group $G_1$, one at the most-image-side surface $R_6$ of the cemented lens $SU_{11}$ in the first lens group $G_1$, two at both surfaces $R_7$ and $R_8$ of the object-side double-convex positive lens $L_{21}$ in the second lens group $G_2$, one at the image-plane-side surface $R_{15}$ of the negative meniscus lens $L_{31}$ forming the third lens group $G_3$, and one at the image-plane-side surface $R_{17}$ of the double-convex positive lens $L_{41}$ forming the fourth lens group Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the image plane side while the spacing between the second lens group $G_2$ and it grows wide and the spacing between it and the fourth lens group $G_4$ gets narrow. The third lens group $G_3$ is positioned more on the object side at the telephoto end than at the wide-angle end.

From the wide-angle end to the intermediate setting, the fourth lens group $G_4$ moves to the image plane side while the spacing between the third lens group $G_3$ and it grows wide, and from the intermediate setting to the telephoto end, the fourth lens group $G_4$ moves to the image plane side with a narrowing spacing between the third lens group $G_3$ and it. The fourth lens group $G_4$ is positioned more on the image plane side at the telephoto end than at the wide-angle end.

FIG. 9 is a set of sectional views of the lens system exemplified in Example 9.

As shown, the lens system of Example 9 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group $G_2$ includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Seven aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, two at both surfaces $R_{15}$ and $R_{16}$ of the negative meniscus lens $L_{31}$ forming the third lens group $G_3$, and one at the image-plane-side surface $R_{18}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 10A:
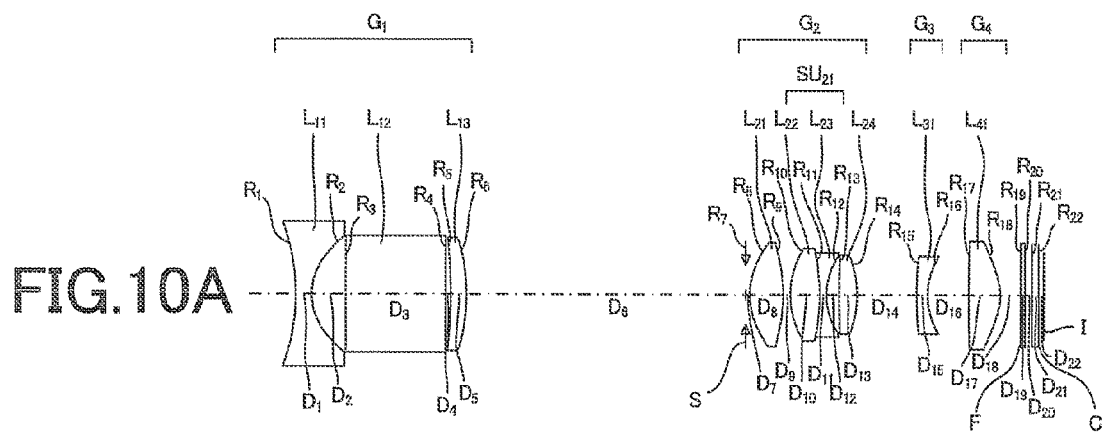
FIG. 10 is a set of sectional views of the lens system of Example 10 as taken apart and along an optical axis.
Figure 10B:
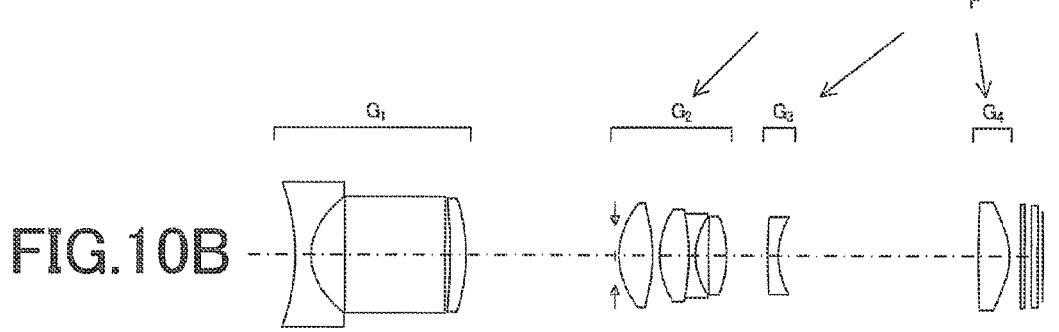
Figure 10C:
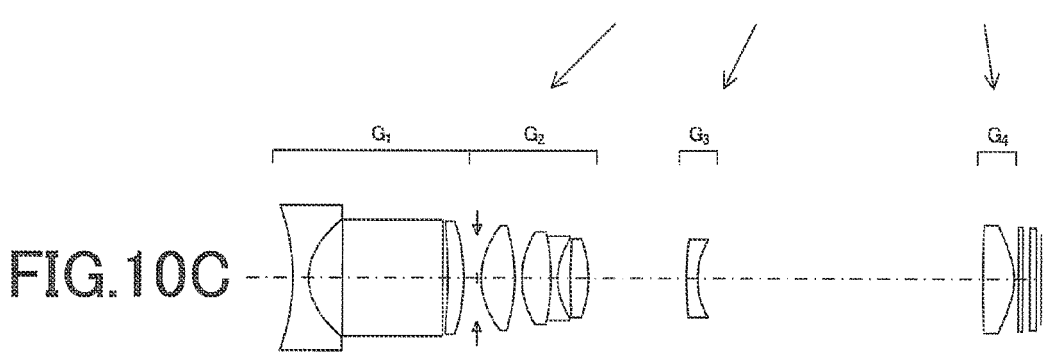

FIG. 10 is a set of sectional views of the lens system exemplified in Example 10.

As shown, the lens system of Example 10 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its image plane side.

The second lens group $G_2$ includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Eight aspheric surfaces are used: two at both surfaces $R_1$ and $R_2$ of the double-concave negative lens $L_{11}$ in the first lens group $G_1$, one at the image-plane-side surface $R_6$ of the positive meniscus lens $L_{13}$ in the first lens group $G_1$, two at both surfaces $R_8$ and $R_9$ of the object-side double-convex positive lens $L_{21}$ in the second lens group $G_2$, two at both surfaces $R_{15}$ and $R_{16}$ of the negative meniscus lens $L_{31}$ forming the third lens group $G_3$, and one at the image-plane-side surface $R_{18}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 11A:
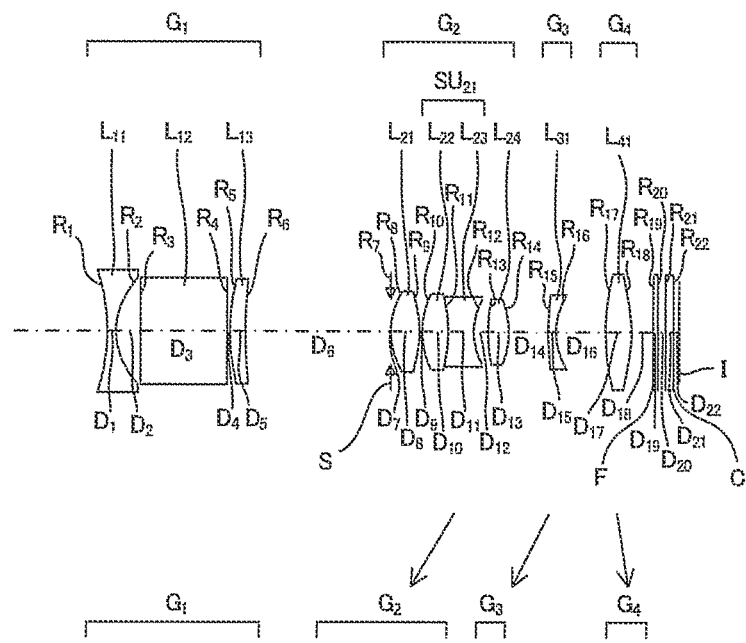
FIG. 11 is a set of sectional views of the lens system of Example 11 as taken apart and along an optical axis.
Figure 11B:
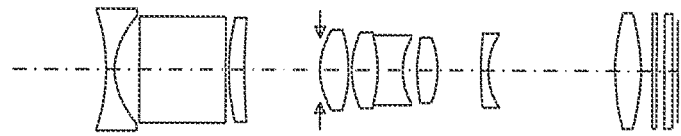
Figure 11C:
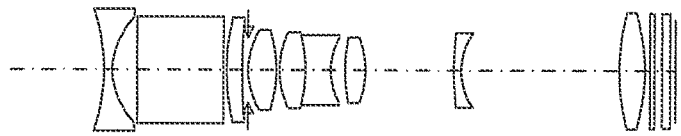

FIG. 11 is a set of sectional views of the lens system exemplified in Example 11.

As shown, the lens system of Example 11 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its image plane side.

The second lens group $G_2$ includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one double-convex positive lens $L_{41}$.

Five aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, and one at the object-side surface $R_{18}$ of the double-convex positive lens $L_4$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the telephoto end, the second lens group $G_2$ moves to the object side while the spacing between the first lens group $G_1$ and it becomes narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the telephoto end, the third lens group $G_3$ moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 12A:
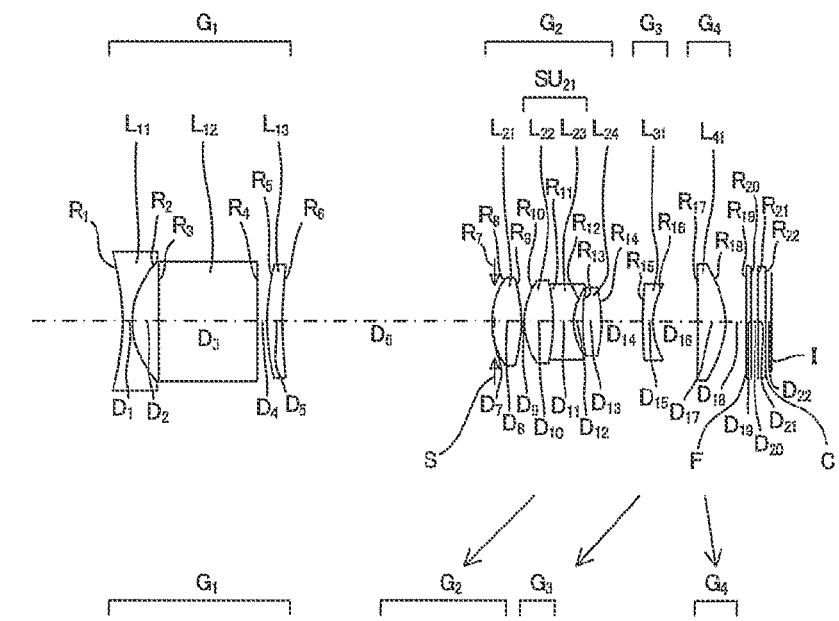
FIG. 12 is a set of sectional views of the lens system of Example 12 as taken apart and along an optical axis.
Figure 12B:
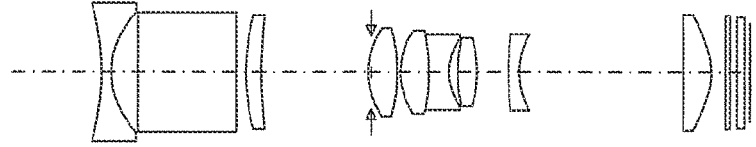
Figure 12C:
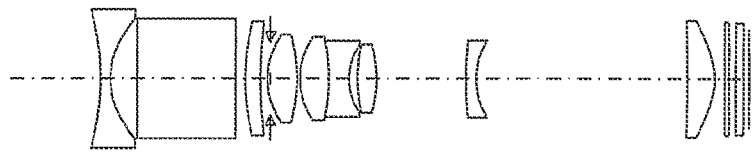

FIG. 12 is a set of sectional views of the lens system exemplified in Example 12.

As shown, the lens system of Example 12 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group $G_2$ includes, in order from the object side to the image side, a double-convex positive lens $L_{21}$, a cemented lens $SU_{21}$ of a double-convex positive lens $L_{22}$ and a double-concave negative lens $L_{23}$, and a double-convex positive lens $L_{24}$.

The aperture stop S is located on the object side of the second lens group $G_2$.

The third lens group $G_3$ includes one negative meniscus lens $L_{31}$ convex on its object side.

The fourth lens group $G_4$ includes one positive meniscus $L_{41}$ convex on its image plane side.

Five aspheric surfaces are used: two at both surfaces $R_1$ and $R_2$ of the double-concave negative lens $L_{11}$ in the first lens group $G_1$, two at both surfaces $R_8$ and $R_9$ of the object-side double-convex positive lens $L_{21}$ in the second lens group $G_2$, and one at the image-plane-side surface $R_{18}$ of the positive meniscus lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting from the telephoto end, the second lens group $G_2$ moves to the object side while the spacing between the first lens group $G_1$ and it gets narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group G3 moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group $G_3$ and it grows wide. The fourth lens group $G_4$ is positioned more on the image plane side at the telephoto end than at the wide-angle end.

Figure 13A:
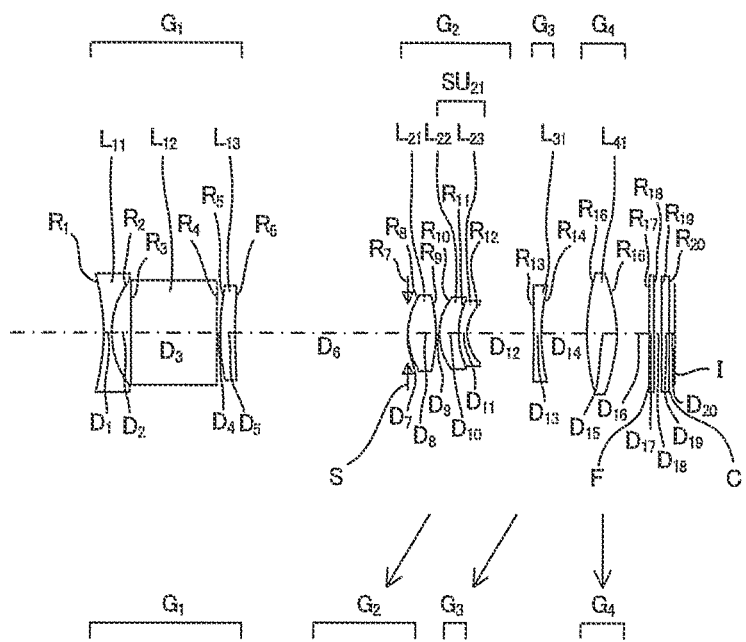
FIG. 13 is a set of sectional views of the lens system of Example 13 as taken apart and along an optical axis.
Figure 13B:
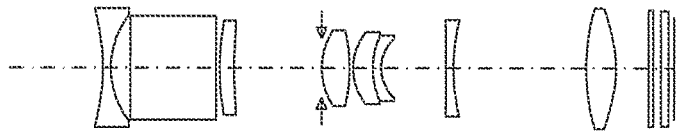
Figure 13C:
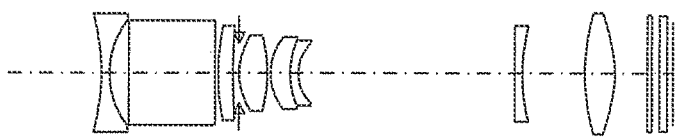

FIG. 13 is a set of sectional views of the lens system exemplified in Example 13.

As shown, the lens system of Example 13 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group $G_2$ includes, in order from the object side to the image side, a double-convex positive lens $L_{21}$, and a cemented lens $SU_{21}$ of a positive meniscus lens $L_{22}$ convex on its object side and a negative meniscus lens $L_{23}$ convex on its object side.

The aperture stop S is located on the object side of the second lens group $G_2$.

The third lens group $G_3$ includes one double-concave negative lens $L_{31}$.

The fourth lens group $G_4$ includes one double-convex positive lens $L_{41}$.

Five aspheric surfaces are used: two at both surfaces $R_1$ and $R_2$ of the double-concave negative lens $L_{11}$ in the first lens group $G_1$, two at both surfaces $R_8$ and $R_9$ of the double-convex positive lens $L_{21}$ in the second lens group $G_2$, and one at the image-plane-side surface R the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting from the telephoto end, the second lens group $G_2$ moves to the object side while the spacing between the first lens group $G_1$ and it gets narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group G3 moves to the image plane side while the spacing between the second lens group $G_2$ and it grows wide and the spacing between it and the fourth lens group $G_4$ becomes narrow. The third lens group $G_3$ is positioned more on the object side at the telephoto end than at the wide-angle end.

From the wide-angle end to the telephoto end, the fourth lens group $G_4$ remains fixed from the wide-angle end to the telephoto end.

Figure 14A:
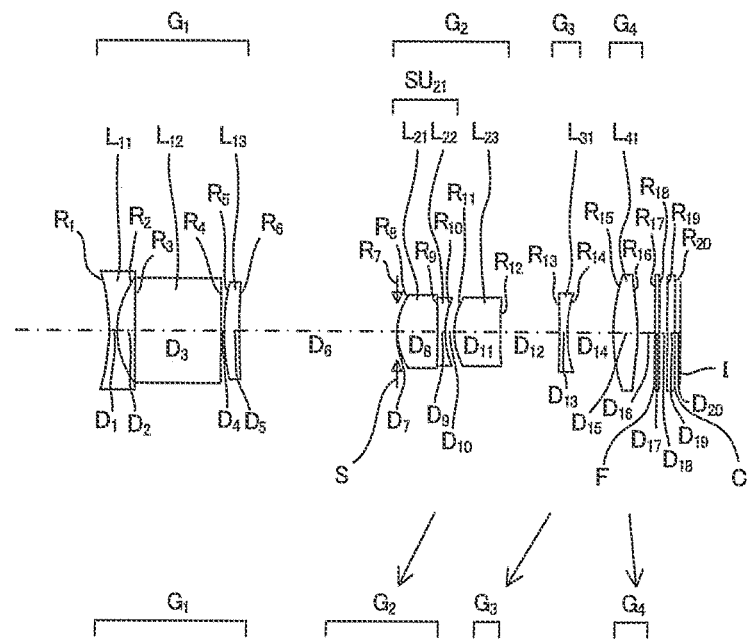
FIG. 14 is a set of sectional views of the lens system of Example 14 as taken apart and along an optical axis.
Figure 14B:
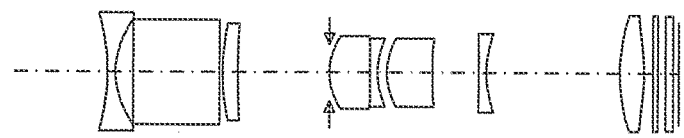
Figure 14C:
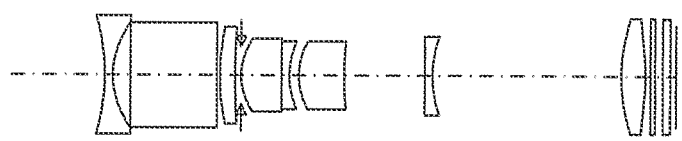
Figure 15A:
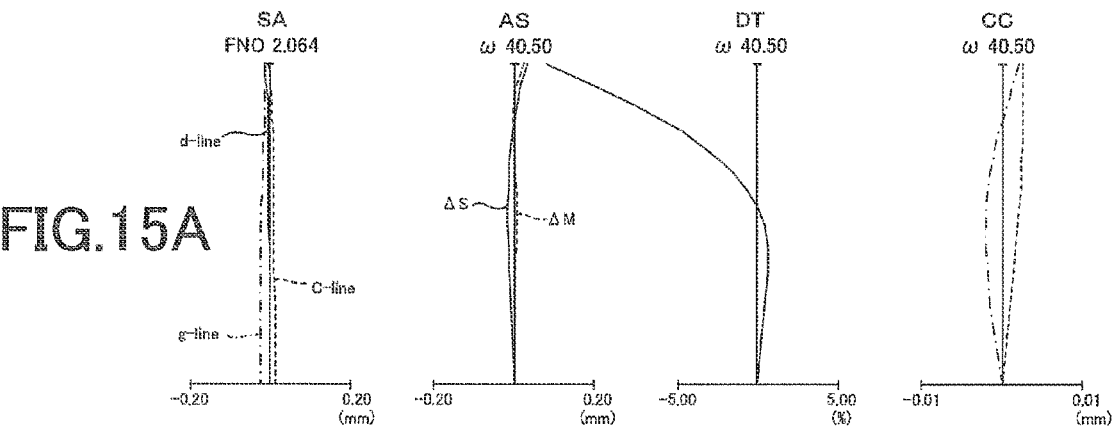
FIG. 15 is a set of aberration diagrams for the lens system of Example 1.
Figure 15B:
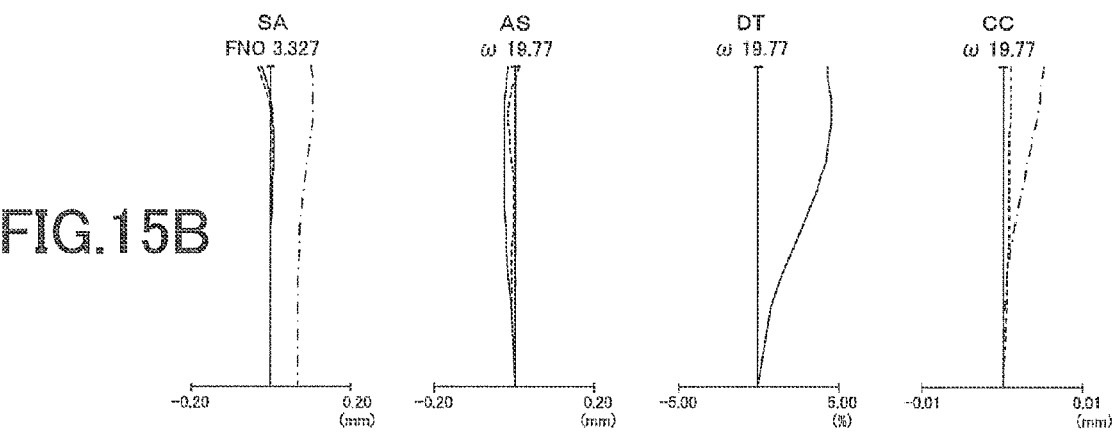
Figure 15C:
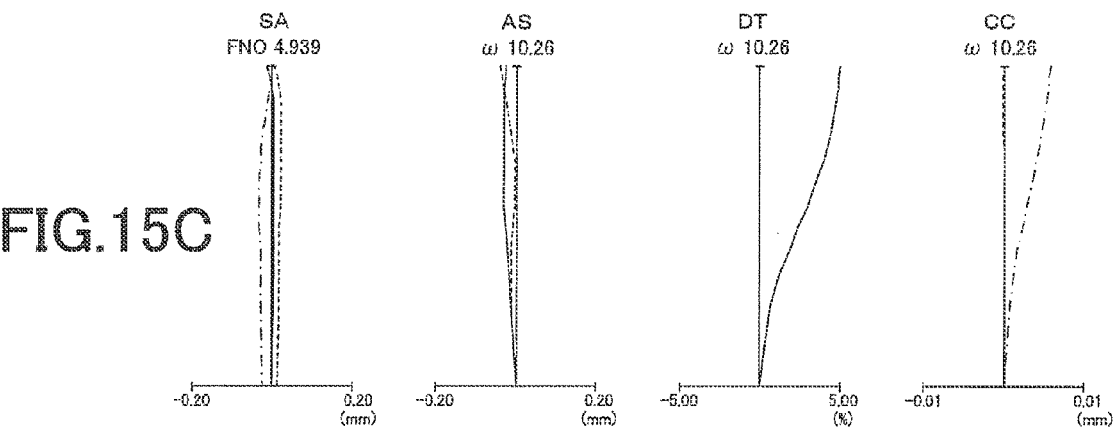
Figure 16A:
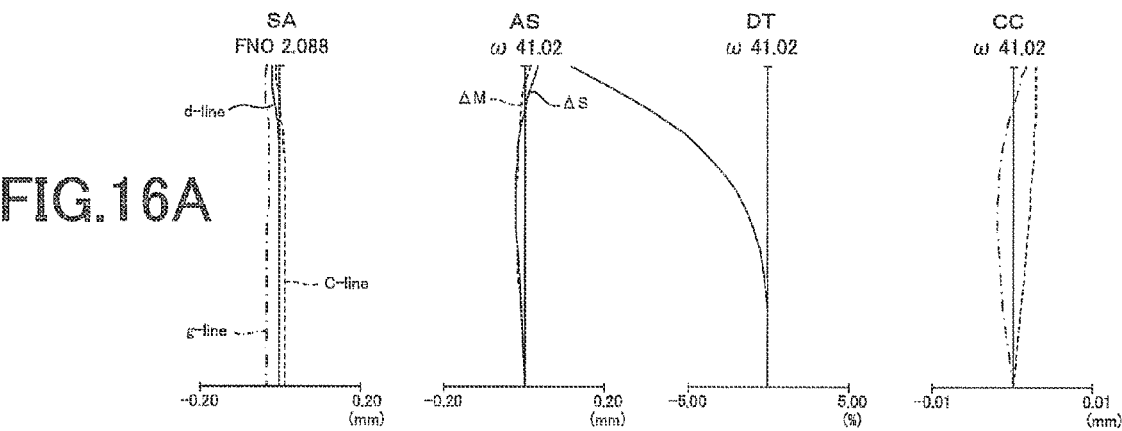
FIG. 16 is a set of aberration diagrams for the lens system of Example 2.
Figure 16B:
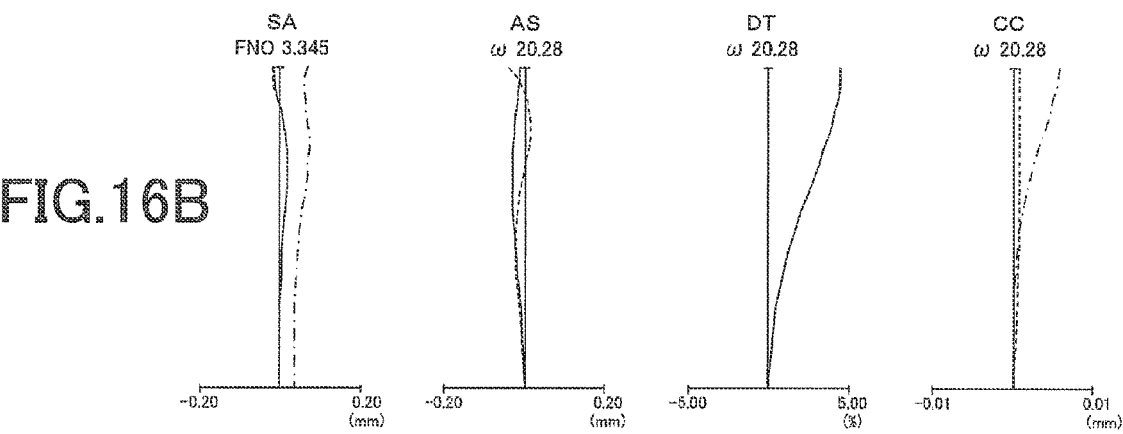
Figure 16C:
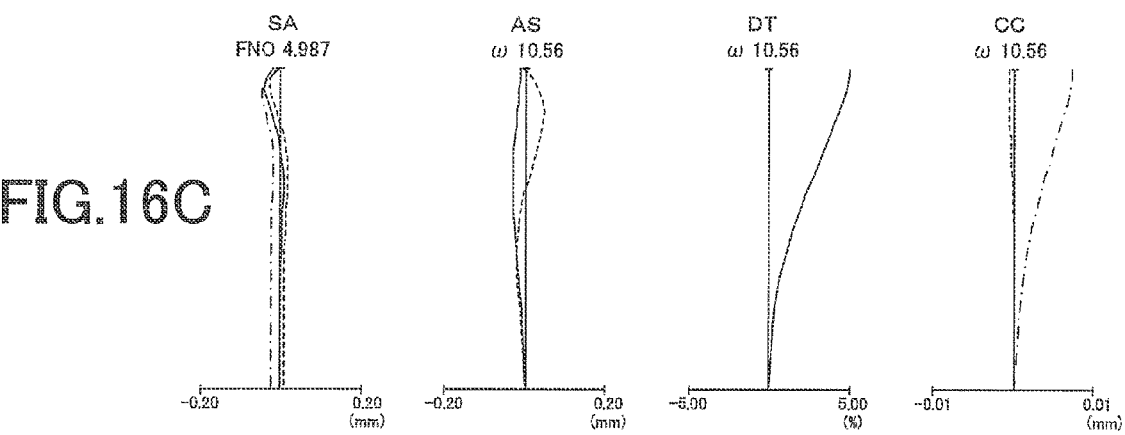
Figure 17A:
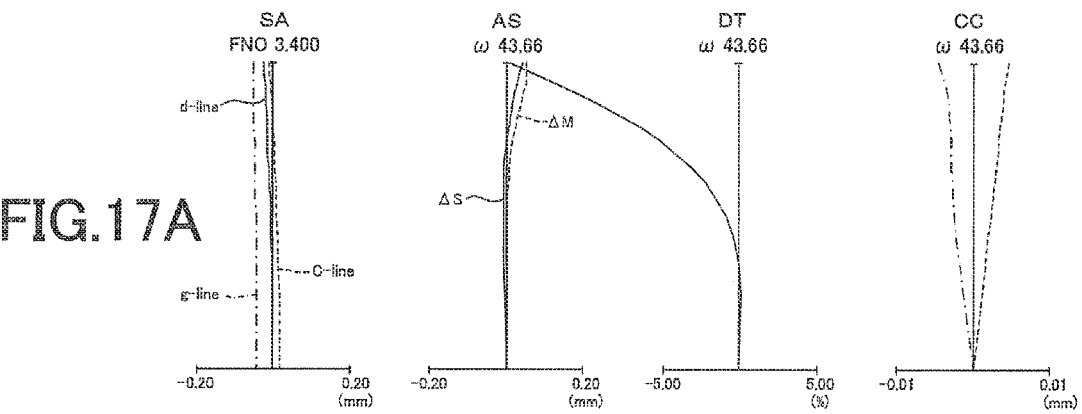
FIG. 17 is a set of aberration diagrams for the lens system of Example 3.
Figure 17B:
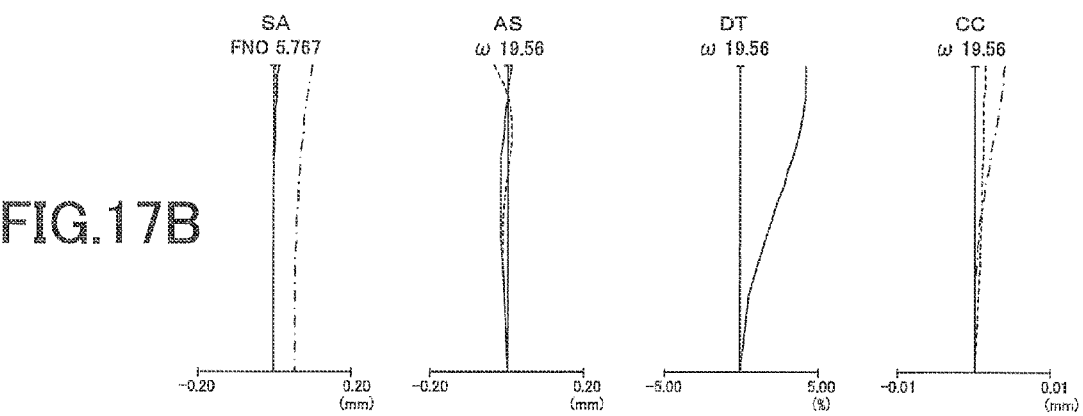
Figure 17C:
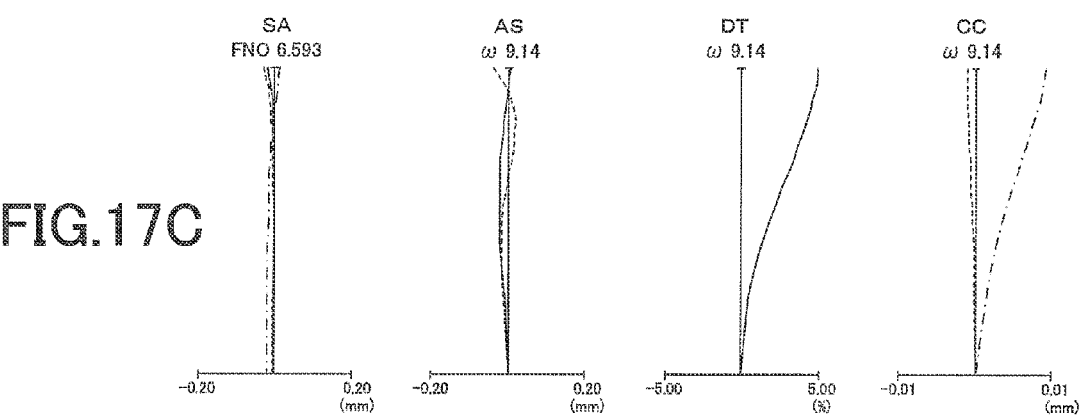
Figure 18A:
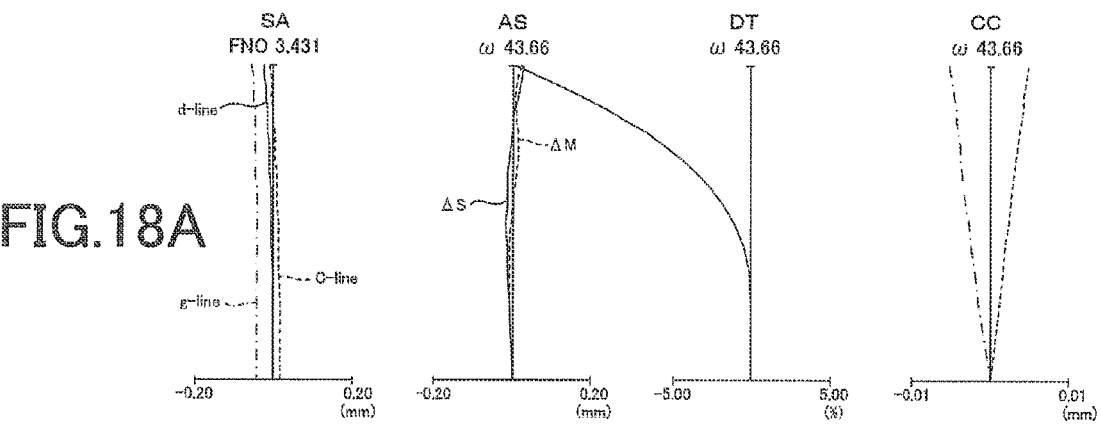
FIG. 18 is a set of aberration diagrams for the lens system of Example 4.
Figure 18B:
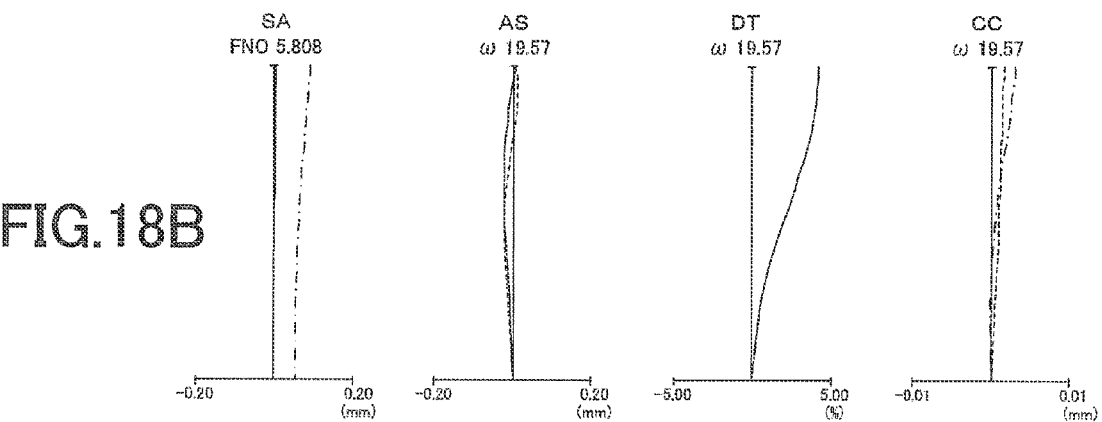
Figure 18C:
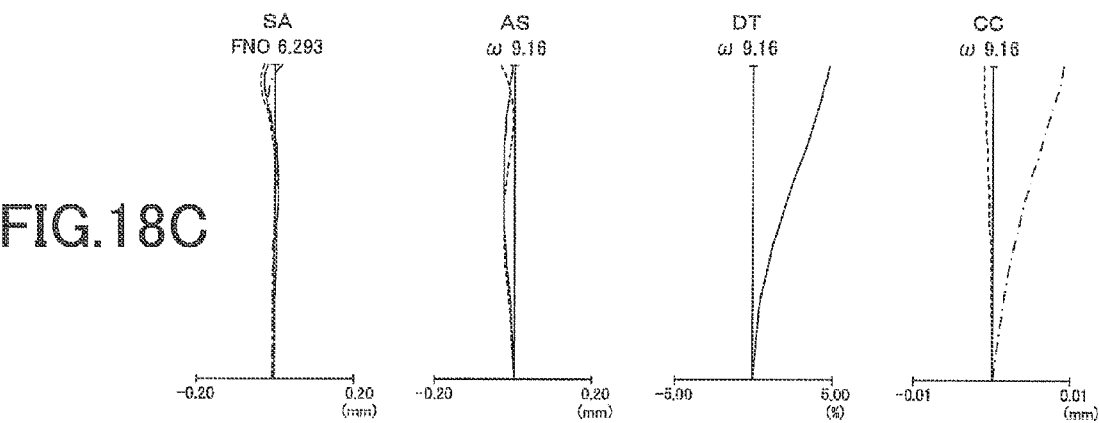
Figure 19A:
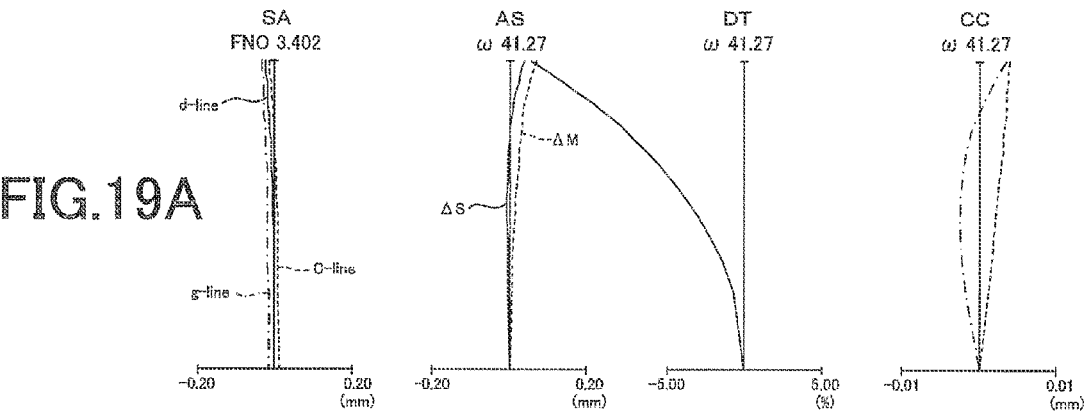
FIG. 19 is a set of aberration diagrams for the lens system of Example 5.
Figure 19B:
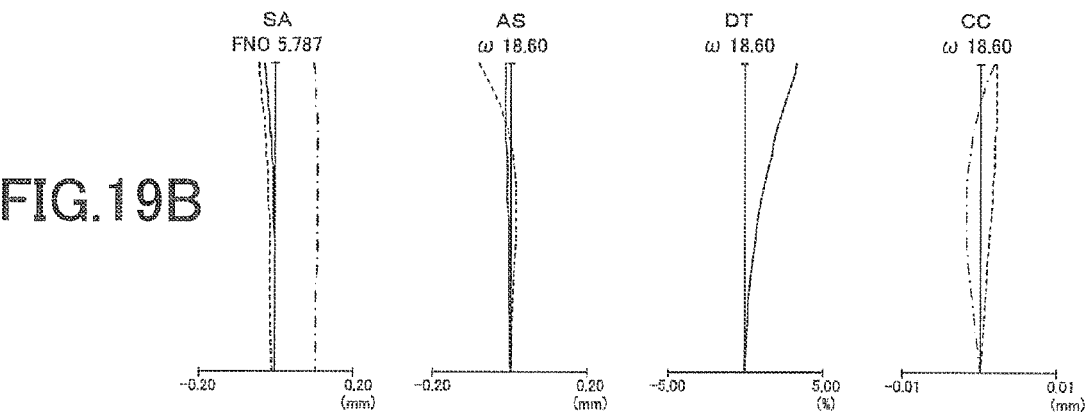
Figure 19C:
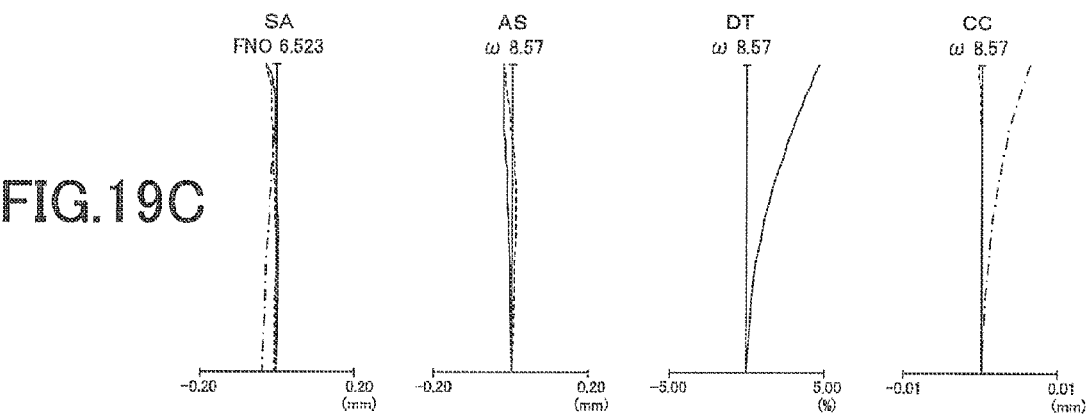
Figure 20A:
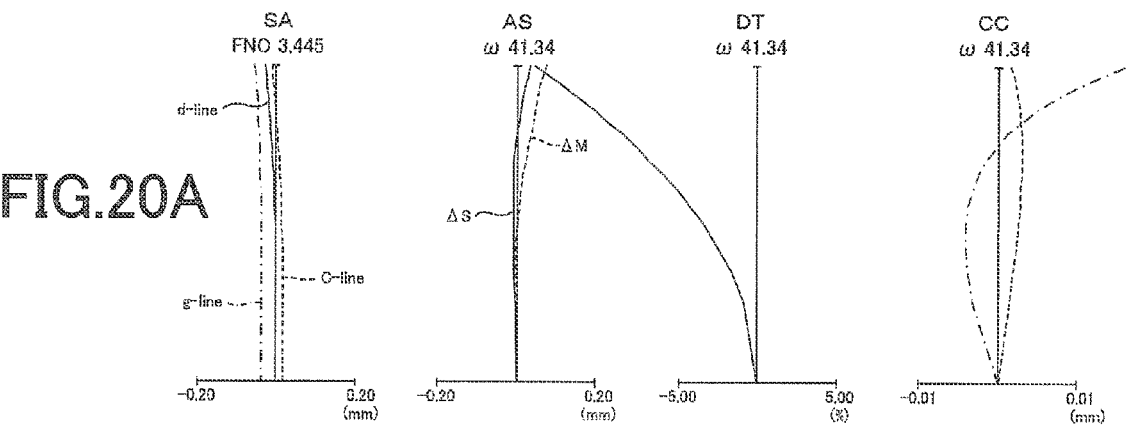
FIG. 20 is a set of aberration diagrams for the lens system of Example 6.
Figure 20B:
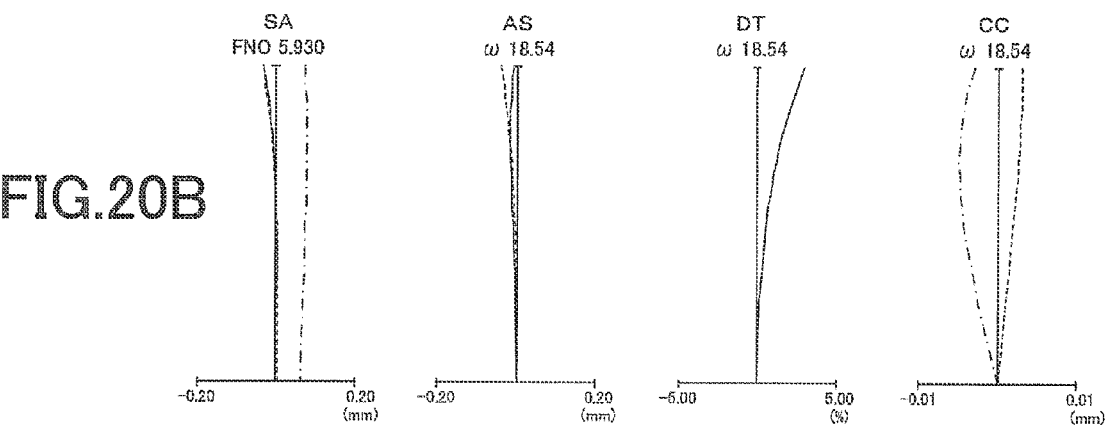
Figure 20C:
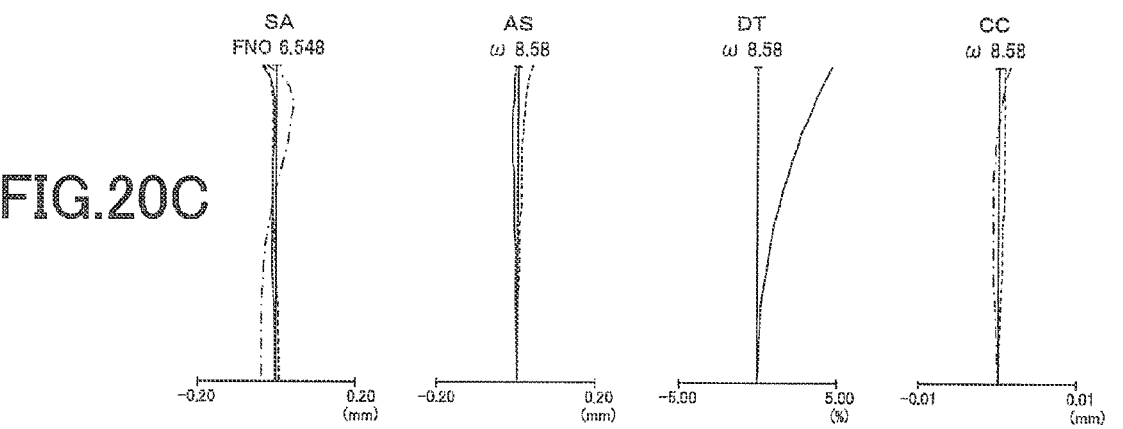
Figure 21A:
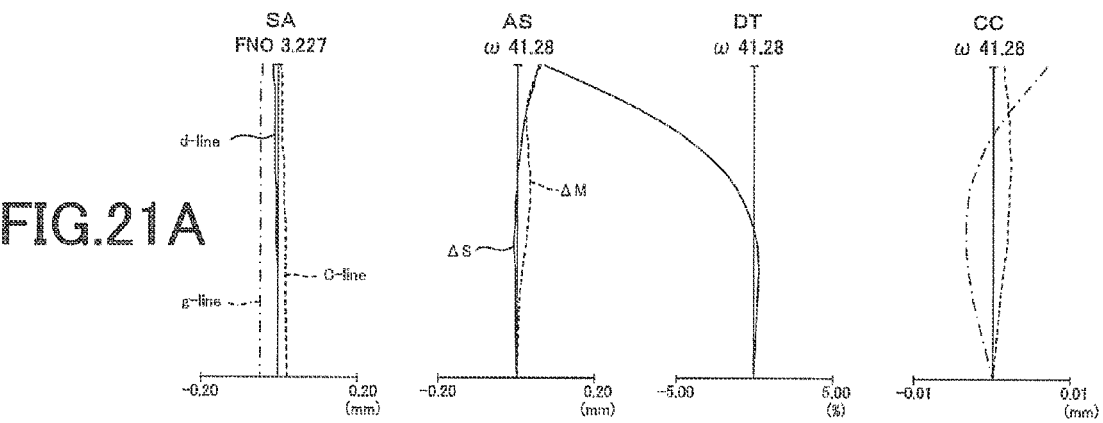
FIG. 21 is a set of aberration diagrams for the lens system of Example 7.
Figure 21B:
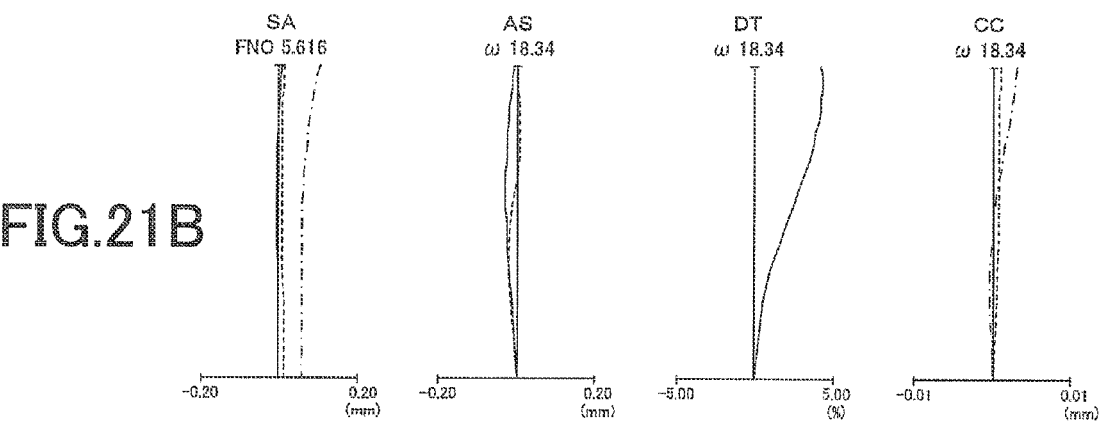
Figure 21C:
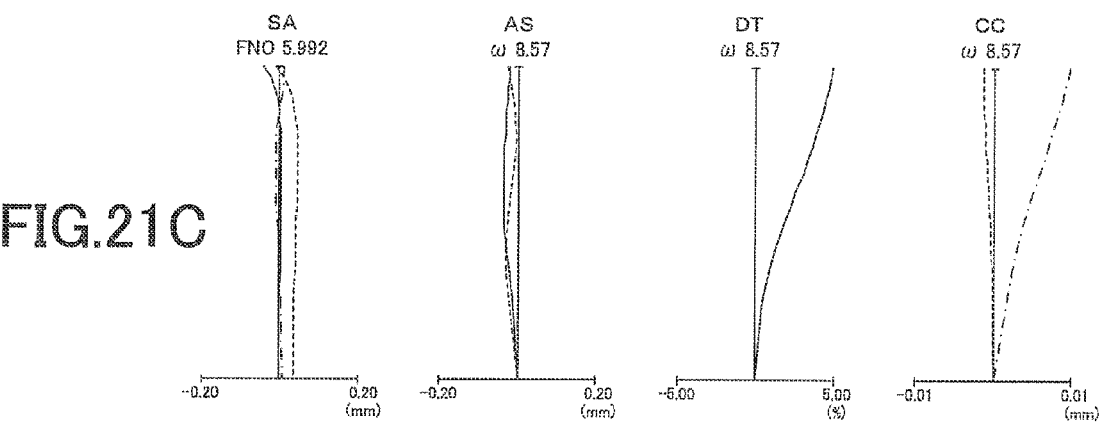
Figure 22A:
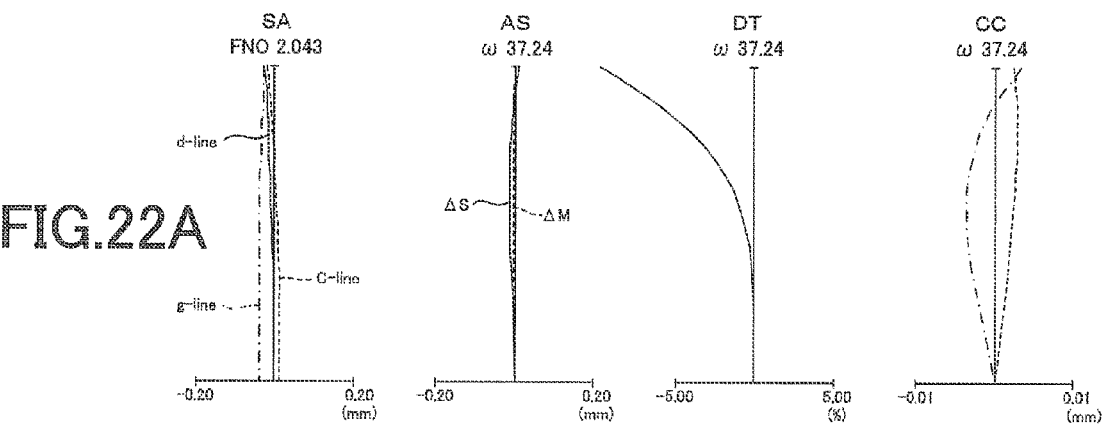
FIG. 22 is a set of aberration diagrams for the lens system of Example 8.
Figure 22B:
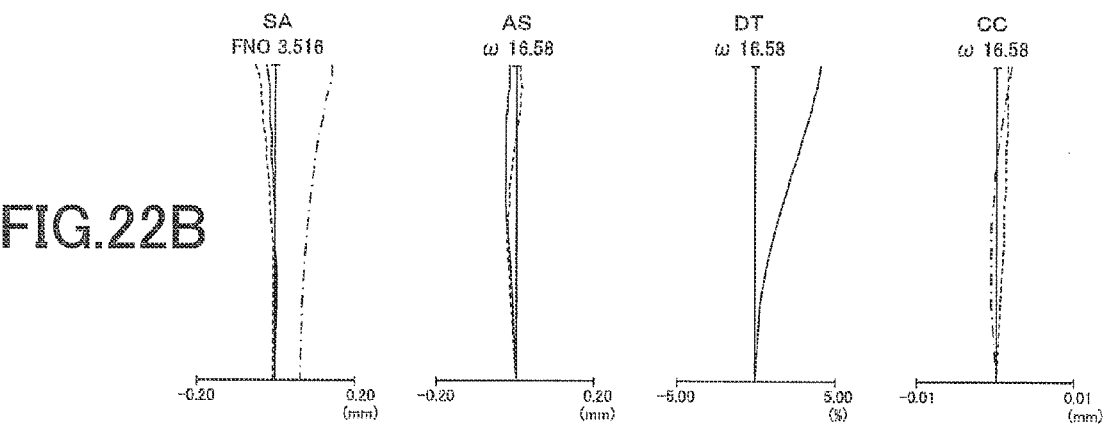
Figure 22C:
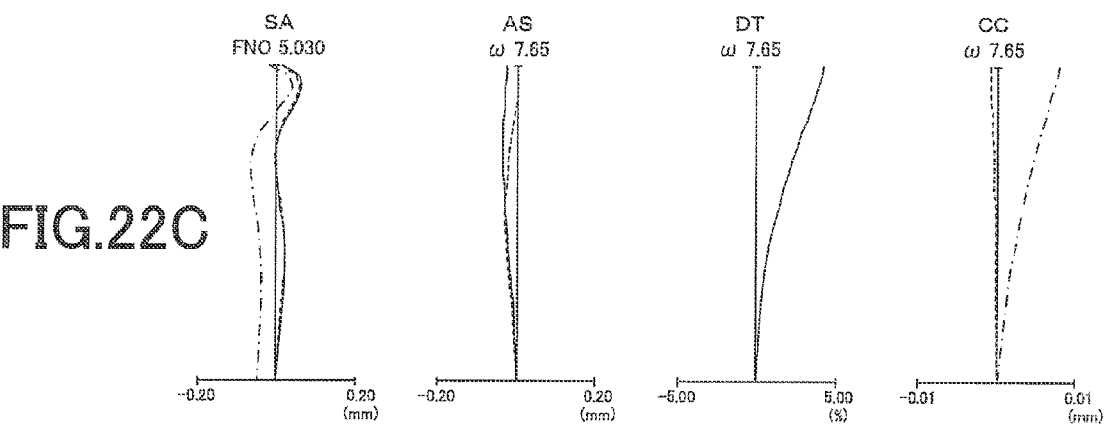
Figure 23A:
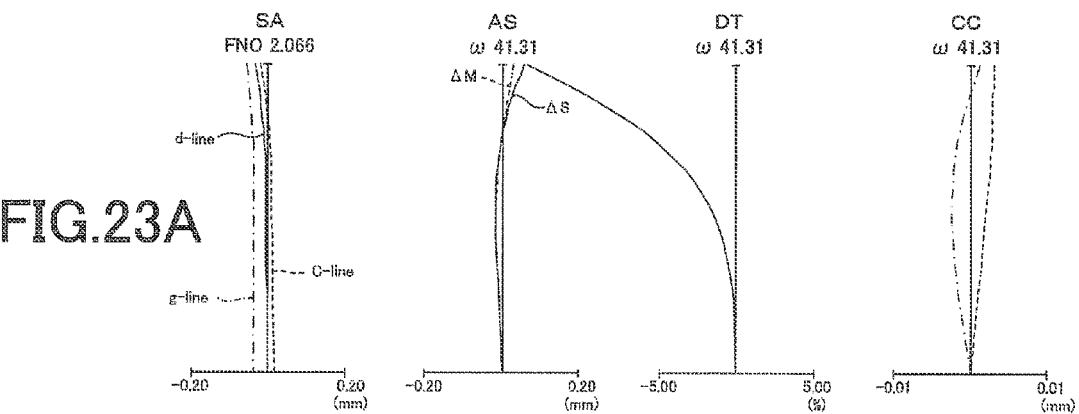
FIG. 23 is a set of aberration diagrams for the lens system of Example 9.
Figure 23B:
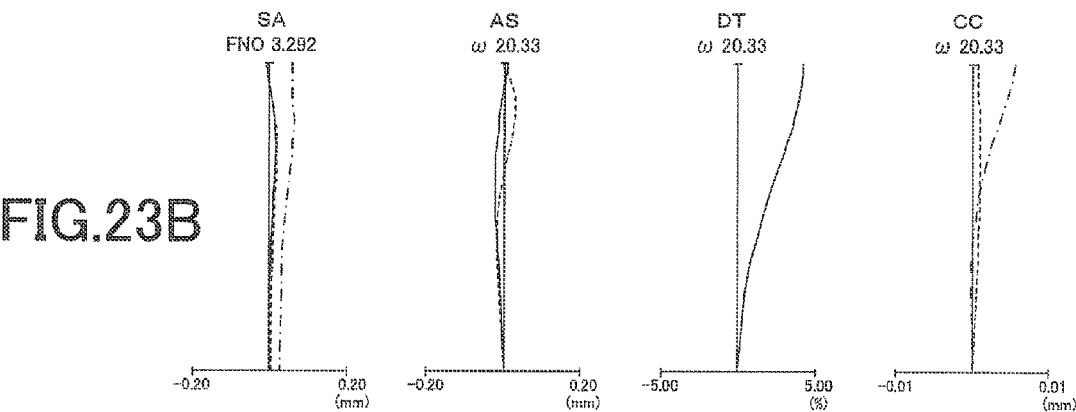
Figure 23C:
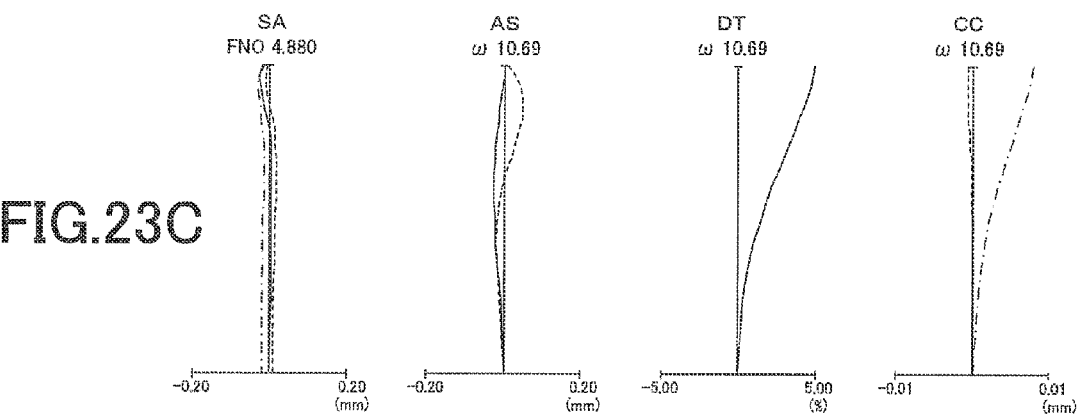
Figure 24A:
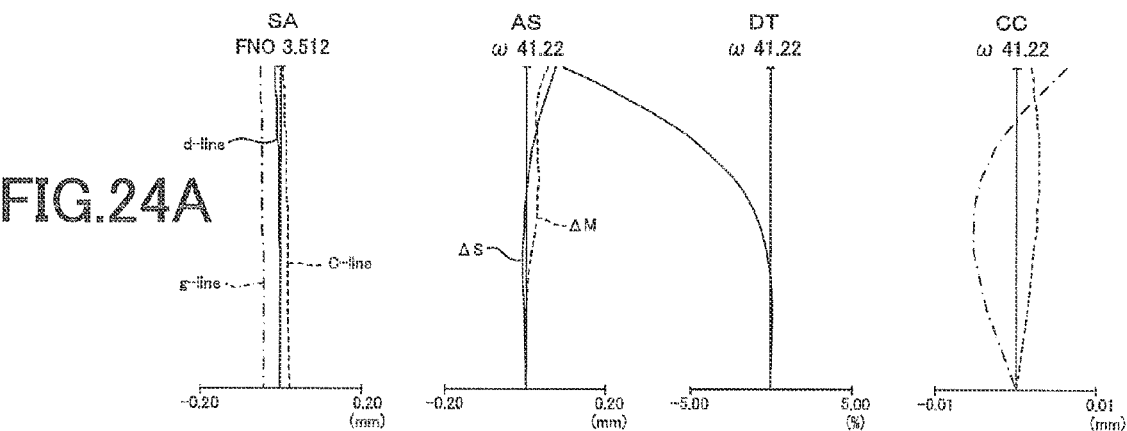
FIG. 24 is a set of aberration diagrams for the lens system of Example 10.
Figure 24B:
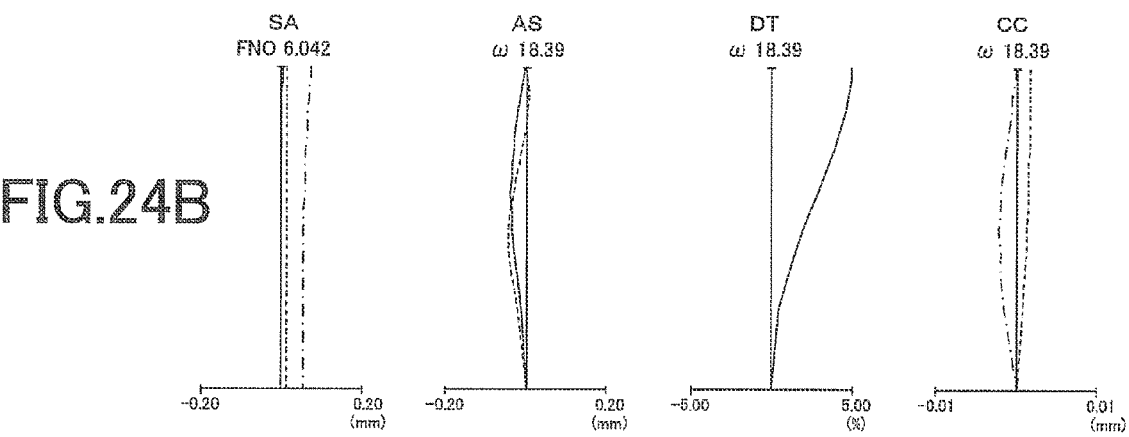
Figure 24C:
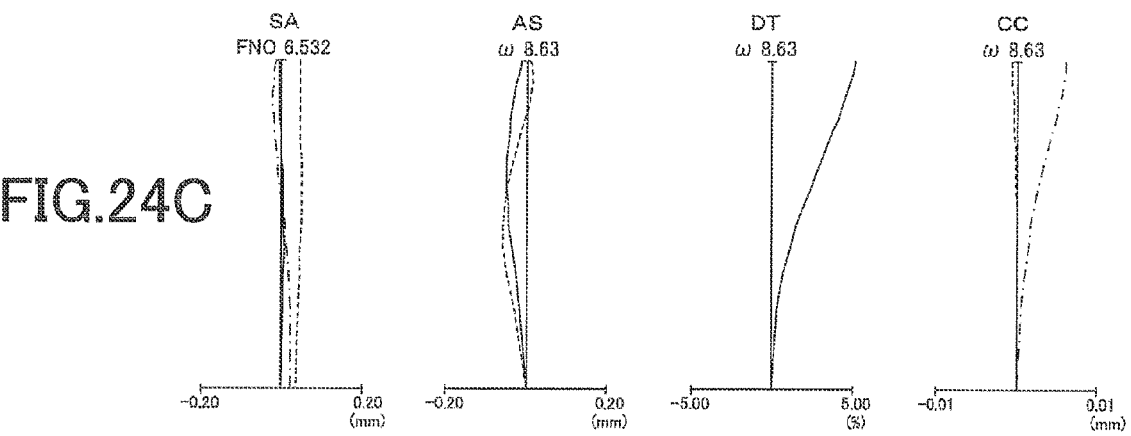
Figure 25A:
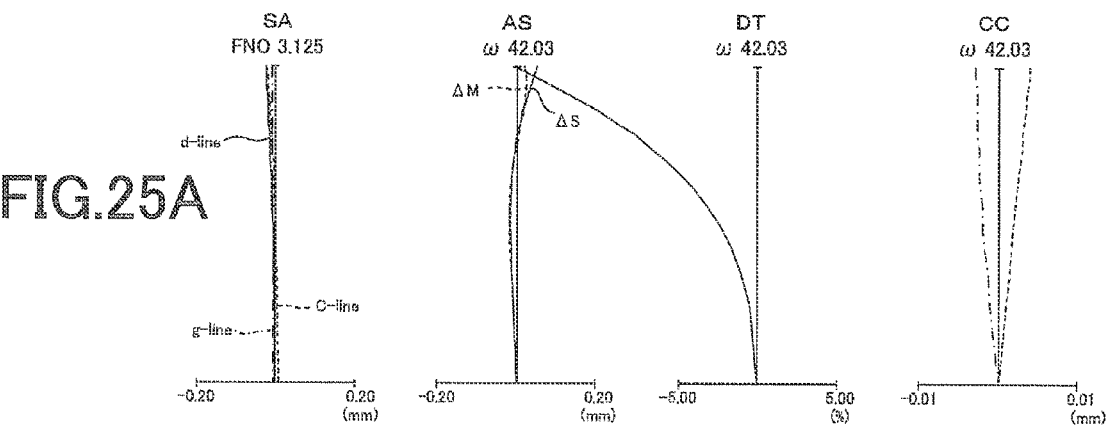
FIG. 25 is a set of aberration diagrams for the lens system of Example 11.
Figure 25B:
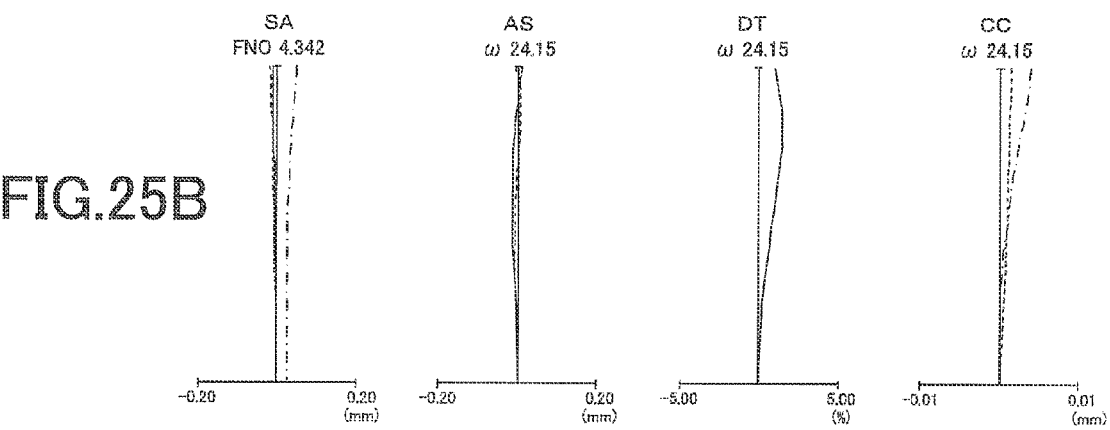
Figure 25C:
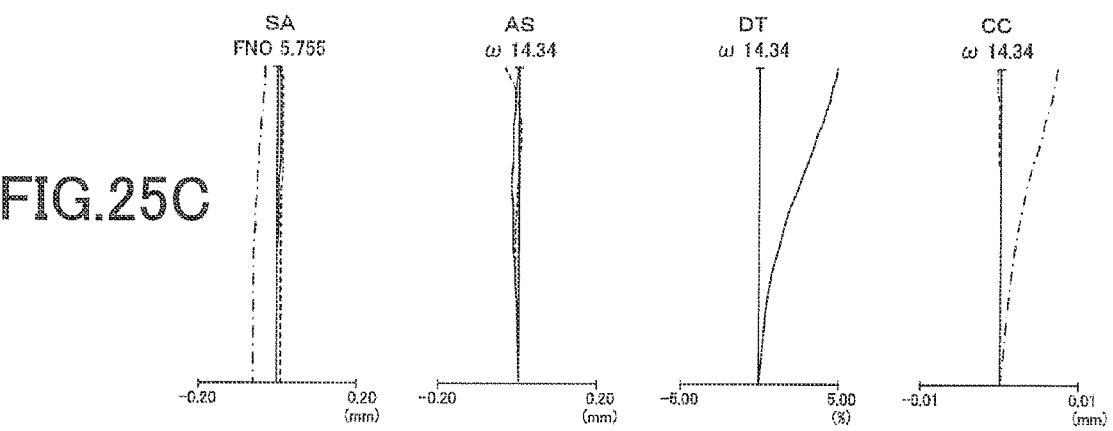
Figure 26A:
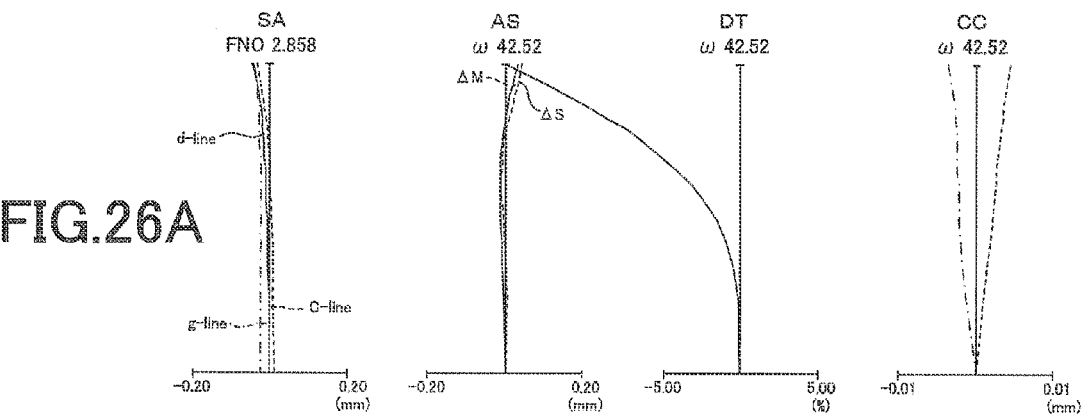
FIG. 26 is a set of aberration diagrams for the lens system of Example 12.
Figure 26B:
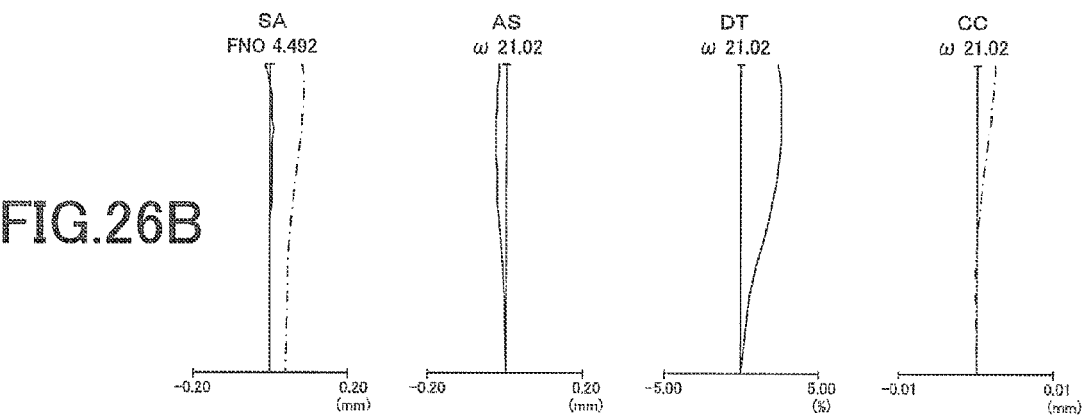
Figure 26C:
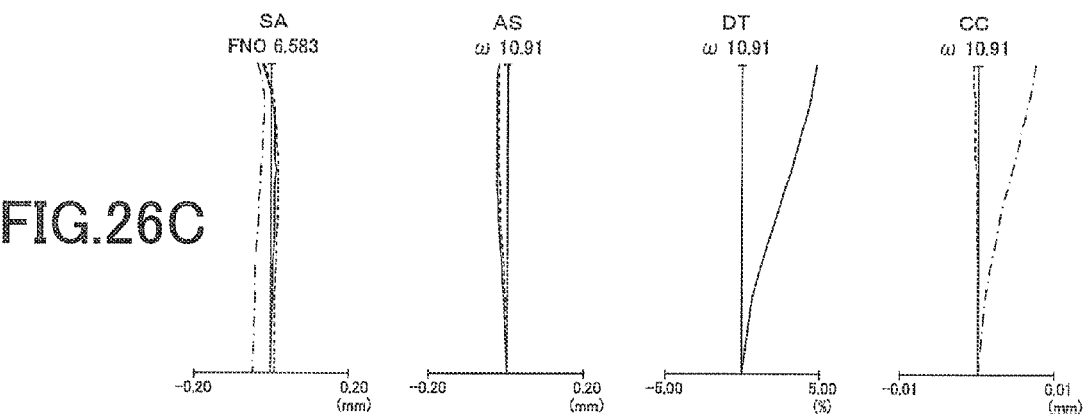
Figure 27A:
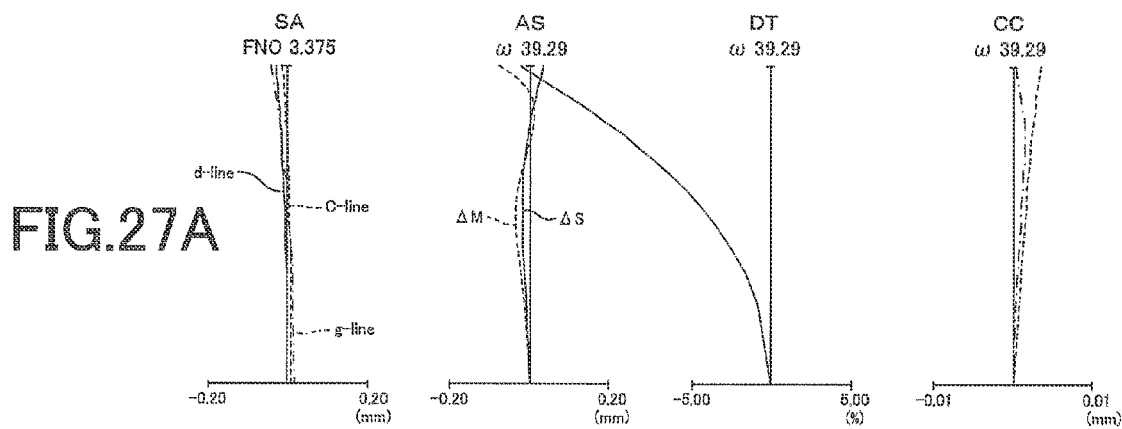
FIG. 27 is a set of aberration diagrams for the lens system of Example 13.
Figure 27B:
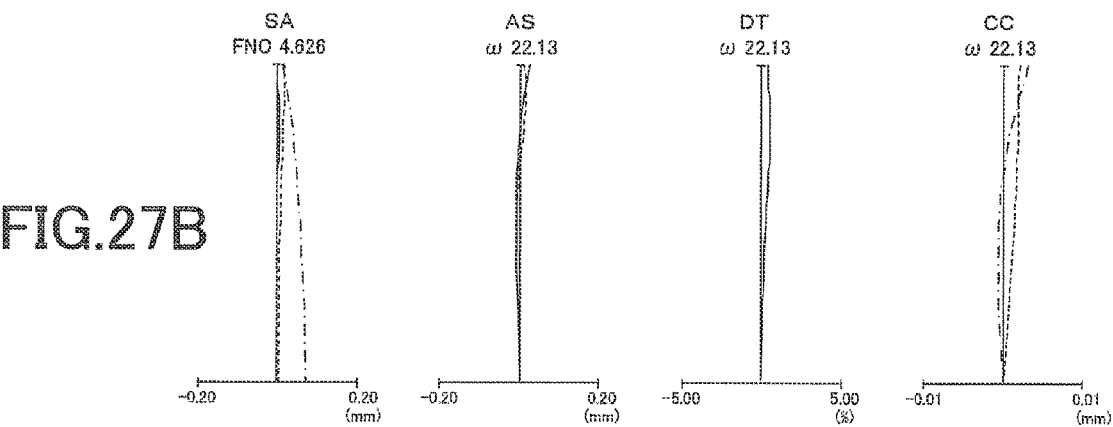
Figure 27C:
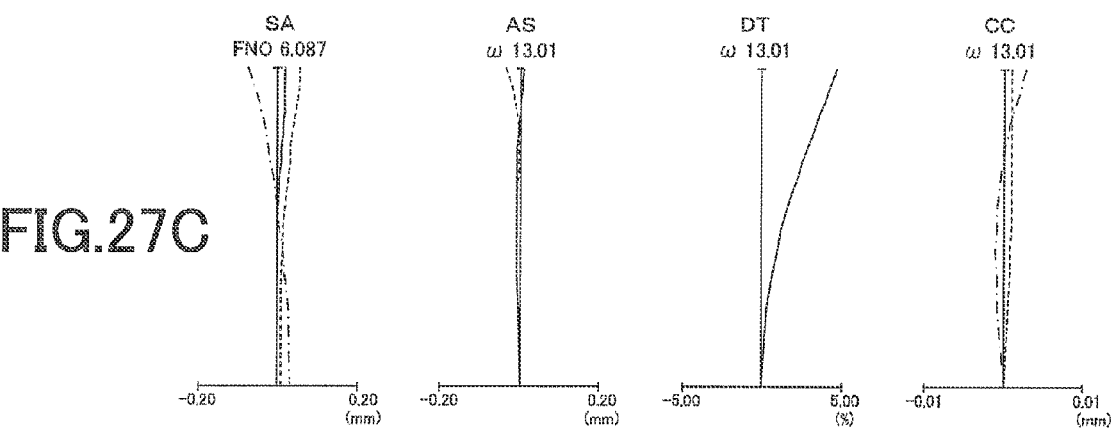
Figure 28A:
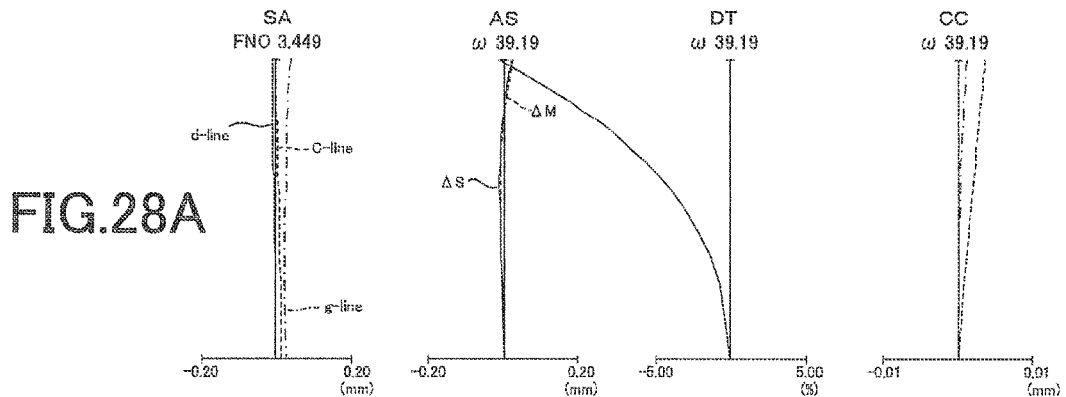
FIG. 28 is a set of aberration diagrams for the lens system of Example 14.
Figure 28B:
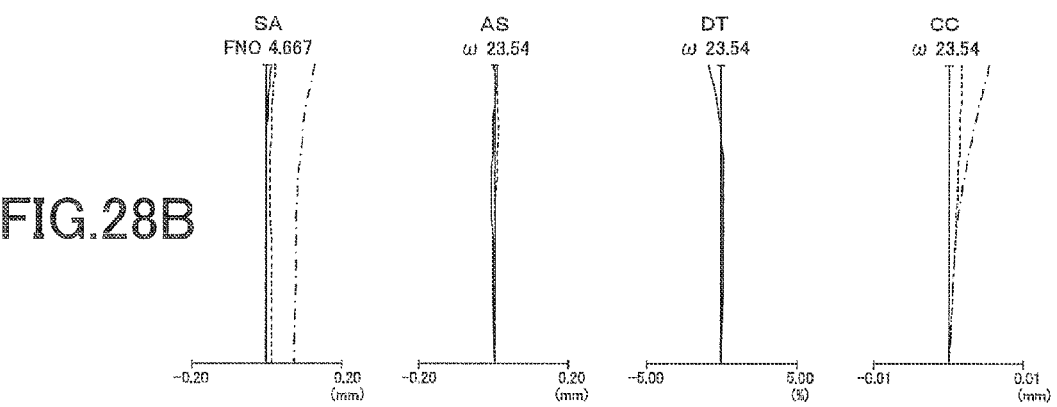
Figure 28C:
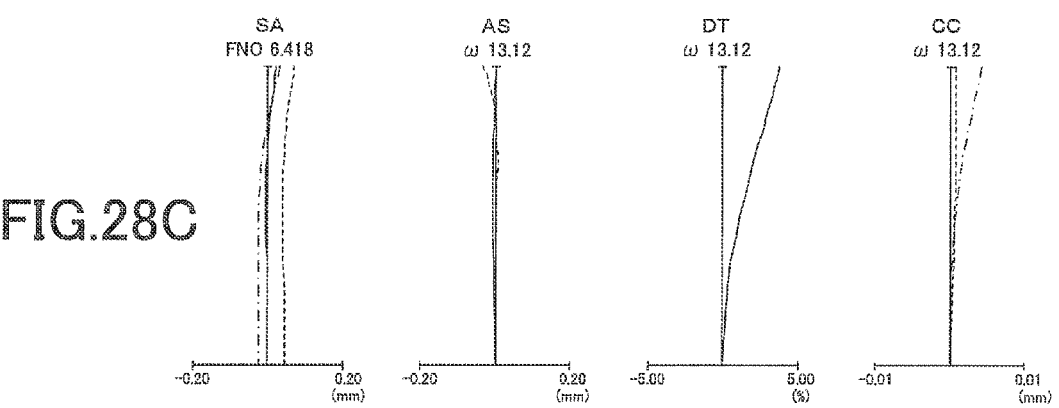

FIG. 14 is a set of sectional views of the lens system exemplified in Example 14.

As shown, the lens system of Example 14 includes, in order from the object side to the image side, the first lens group $G_1$ of negative refracting power, the second lens group $G_2$ of positive refracting power, the third lens group $G_3$ of negative refracting power, and the fourth lens group $G_4$ of positive refracting power.

The first lens group $G_1$ includes, in order from the object side to the image side, a double-concave negative lens $L_{11}$, a double-plane prism lens $L_{12}$ and a positive meniscus lens $L_{13}$ convex on its object side.

The second lens group $G_2$ includes, in order from the object side to the image side, a cemented lens $SU_{21}$ of a double-convex positive lens $L_{21}$ and a double-concave negative lens $L_{22}$, and a positive meniscus lens $L_{23}$ convex on its object side.

The aperture stop S is located on the object side of the second lens group $G_2$.

The third lens group $G_3$ includes one double-concave negative lens $L_{31}$.

The fourth lens group $G_4$ includes one double-convex positive lens $L_{41}$.

Five aspheric surfaces are used: two at both surfaces $R_1$ and $R_2$ of the double-concave negative lens $L_{11}$ in the first lens group $G_1$, one at the most-object-side surface R8 of the cemented lens $SU_{21}$ in the second lens group, one at the image-plane-side surface $R_{12}$ of the positive meniscus lens $L_{23}$ in the second lens group $G_2$, and one at the image-plane-side surface $R_{16}$ of the double-convex positive lens $L_{41}$ forming the fourth lens group $G_4$.

Set out below is how the lens system moves upon zooming from the wide-angle end to the telephoto end.

The first lens group $G_1$ remains fixed from the wide-angle end to the telephoto end.

From the wide-angle end to the intermediate setting, the second lens group $G_2$ moves to the object side while the spacing between the first lens group $G_1$ and it becomes narrow and the spacing between it and the third lens group $G_3$ becomes narrow, and from the intermediate setting from the telephoto end, the second lens group $G_2$ moves to the object side while the spacing between the first lens group $G_1$ and it gets narrow and the spacing between it and the third lens group $G_3$ grows wide. The second lens group $G_2$ is positioned more on the object side at the telephoto end than at the wide-angle end.

From the wide-angle end to the telephoto end, the aperture stop S moves together with the second lens group $G_2$ to the object side.

From the wide-angle end to the intermediate setting, the third lens group $G_3$ moves to the object side while the spacing between the second lens group $G_2$ and it gets narrow and the spacing between it and the fourth lens group $G_4$ grows wide, and from the intermediate setting to the telephoto end, the third lens group G3 moves to the object side while the spacing between the second lens group $G_2$ and it grows wide and the spacing between it and the fourth lens group $G_4$ grows wide. The third lens group $G_3$ is positioned more on the object side at the telephoto end than at the wide-angle end.

From the wide-angle end to the telephoto end, the fourth lens group $G_4$ moves a little to the image plane side while the spacing between the third lens group and it grows wide. The fourth lens group G4 is positioned more on the image plane side at the telephoto end than at the wide-angle end.

Set out below are various numeral data on Examples 1 to 14 (such as surface data, focusing data and the focal lengths of the respective lens groups).

The data, given just below, include for each surface number the radius of curvature R of the lens surface (optical surface), surface separation D, the d-line (587.6 nm) refractive index $n_d$ of the lens (optical medium), and the d-line Abbe constant $v_d$ of the lens. The radius of curvature R and surface separation D are given in mm unit. In the surface data, ∞ in the radius-of-curvature column means infinity.

The zoom data include the focal lengths, F-numbers (FNO), angles of view 2ω (°), variable surface separations D, back focuses fb (in air) and full lengths (in air) at the wide-angle end, in the intermediate setting, and at the telephoto end. The focal lengths, image heights, surface separations, back focuses (in air) and full lengths (in air) are all given in mm unit.

The focal length data on the respective lens groups include the focal lengths f1 to f4 in the respective lens groups, all given in mm unit.

Here let x be the optical axis provided that the direction of travel of light is taken as positive, and y be the direction orthogonal to the optical axis. Aspheric shape is then given by the following formula:

$$x=(y^2/R)/[1+\{1-(K+1)(y/R)^2\}^{1/2}]+A_4y^4+A_6y^6+A_8y^8+A_{10}y^{10}$$

where R is the paraxial radius of curvature, K is the conic coefficient, and $A_4$, $A_6$, $A_8$ and $A_{10}$ are the $4^{th}$-$6^{th}$-, $8^{th}$ and $10^{th}$ order aspheric coefficients.

NUMERAL EXAMPLE 1

Surface Data

| Surface No. | R | D | $n_d$ | $v_d$ |
|---|---|---|---|---|
| 1 (Aspheric Surface) | −19.996 | 0.88 | 1.69350 | 53.21 |
| 2 (Aspheric Surface) | 7.242 | 2.04 | | |
| 3 | ∞ | 8.80 | 1.83481 | 42.71 |
| 4 | ∞ | 0.83 | | |
| 5 | 30.343 | 1.88 | 1.84666 | 23.78 |
| 6 | 314.221 | D6 (Movable) | | |
| 7 (Stop) | ∞ | 0.30 | | |
| 8 (Aspheric Surface) | 8.846 | 3.01 | 1.49700 | 81.61 |
| 9 (Aspheric Surface) | −19.703 | 0.20 | | |
| 10 | 12.828 | 2.12 | 1.51633 | 64.14 |
| 11 | −40.316 | 1.84 | 1.88300 | 40.76 |
| 12 | 7.472 | 0.60 | | |
| 13 | 10.995 | 2.64 | 1.49700 | 81.61 |
| 14 | −13.641 | D14 (Movable) | | |
| 15 (Aspheric Surface) | 32.583 | 0.80 | 1.52542 | 55.78 |
| 16 (Aspheric Surface) | 7.000 | D16 (Movable) | | |
| 17 | 177.038 | 2.31 | 1.52542 | 55.78 |
| 18 (Aspheric Surface) | −5.800 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = 0.000
A4 = −7.76207e−05
A6 = 1.07789e−06

2nd surface k = 0.000
A4 = −6.11238e−04
A6 = 8.19472e−07
A8 = −9.34220e−08

8th surface k = 0.000
A4 = −1.32252e−04
A6 = −1.05120e−06

9th surface k = 0.000
A4 = 2.00471e−04
A6 = −1.41408e−06
A8 = 1.61251e−08

15th surface k = 0.000
A4 = 3.40800e−04
A6 = −1.74875e−05
A8 = 1.19550e−06

16th surface k = 0.000
A4 = 3.66164e−04
A6 = −2.04341e−05
A8 = 1.51914e−06

18th surface k = −0.643
A4 = 3.79772e−03
A6 = −1.76528e−04
A8 = 5.12058e−06
Al0 = −6.43661e−08

Zoom Data

| Zoom Ratio | | 3.90 | |
|---|---|---|---|
| | Wide-Angle | Intermediate | Telephoto |
| Focal Length | 5.10 | 10.09 | 19.89 |
| FN0. | 2.06 | 3.33 | 4.94 |
| Angle of View (2ω) | 81.00 | 39.54 | 20.52 |
| Image Height | 3.78 | 3.78 | 3.78 |
| D6 | 18.67 | 10.28 | 1.00 |
| D14 | 4.72 | 3.01 | 5.33 |
| D16 | 3.02 | 13.63 | 20.96 |
| D18 | 1.17 | 0.66 | 0.30 |
| fb (in air) | 2.58 | 2.04 | 1.70 |
| Full Length (in air) | 57.24 | 57.20 | 57.23 |

Focal Length of Each Group

| 1st group | −12.32 |
|---|---|
| 2nd group | 12.62 |
| 3rd group | −17.15 |
| 4th group | 10.74 |

NUMERAL EXAMPLE 2

Surface Data

| Surface No. | R | D | $n_d$ | $\nu_d$ |
|---|---|---|---|---|
| 1 (Aspheric Surface) | −17.625 | 0.78 | 1.69350 | 53.21 |
| 2 (Aspheric Surface) | 7.460 | 1.94 | | |
| 3 | ∞ | 7.60 | 1.83481 | 42.71 |
| 4 | ∞ | 0.20 | | |
| 5 | 28.545 | 1.17 | 1.84666 | 23.78 |
| 6 | 474.862 | D6 (Movable) | | |
| 7 (Stop) | ∞ | 0.30 | | |
| 8 (Aspheric Surface) | 7.067 | 2.90 | 1.49700 | 81.61 |
| 9 (Aspheric Surface) | −18.068 | 0.20 | | |
| 10 | 8.771 | 2.15 | 1.51633 | 64.14 |
| 11 | −49.927 | 0.50 | 1.88300 | 40.76 |
| 12 | 5.618 | 0.53 | | |
| 13 | 7.627 | 2.02 | 1.49700 | 81.61 |
| 14 | −15.294 | D14 (Movable) | | |
| 15 (Aspheric Surface) | 57.682 | 0.50 | 1.51633 | 64.14 |
| 16 (Aspheric Surface) | 6.077 | D16 (Movable) | | |
| 17 | 83.078 | 1.65 | 1.69350 | 53.21 |
| 18 (Aspheric Surface) | −9.000 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = −0.698
A4 = 3.75220e−05
A6 = −3.48678e−08

2nd surface k = 0.000
A4 = −4.94460e−04
A6 = 1.05376e−06
A8 = −9.30702e−08

8th surface k = 0.000
A4 = −2.19984e−04
A6 = −4.62620e−06
A8 = 7.25818e−08

9th surface k = 0.000
A4 = 3.39244e−04
A6 = −5.25684e−06
A8 = 1.69285e−07

15th surface k = 0.000
A4 = 5.90894e−04
A6 = −6.84616e−05
A8 = 4.50186e−06

16th surface k = 0.000
A4 = 5.46986e−04
A6 = −8.32011e−05
A8 = 5.56455e−06

18th surface k = 0.000
A4 = 1.53440e−03
A6 = −2.32155e−05

Zoom Data

| Zoom Ratio | | 3.90 | |
|---|---|---|---|
| | Wide-Angle | Intermediate | Telephoto |
| Focal Length | 5.06 | 10.00 | 19.72 |
| FN0. | 2.09 | 3.34 | 4.99 |
| Angle of View (2ω) | 82.05 | 40.56 | 21.12 |
| Image Height | 3.78 | 3.78 | 3.78 |
| D6 | 16.76 | 9.08 | 1.00 |
| D14 | 2.52 | 1.61 | 3.10 |
| D16 | 4.01 | 13.34 | 20.50 |
| D18 | 1.62 | 0.87 | 0.30 |
| fb (in air) | 3.03 | 2.24 | 1.71 |
| Full Length (in air) | 48.74 | 48.71 | 48.74 |

Focal Length of Each Group

| 1st group | −12.16 |
|---|---|
| 2nd group | 10.28 |
| 3rd group | −13.20 |
| 4th group | 11.80 |

NUMERAL EXAMPLE 3

Surface Data

| Surface No. | R | D | $n_d$ | $\nu_d$ |
|---|---|---|---|---|
| 1 (Aspheric Surface) | −45.306 | 0.73 | 1.74320 | 49.34 |
| 2 (Aspheric Surface) | 6.787 | 2.14 | | |
| 3 | ∞ | 7.50 | 1.83481 | 42.71 |
| 4 | ∞ | 0.20 | | |
| 5 | 18.439 | 1.05 | 1.92286 | 18.90 |
| 6 | 31.388 | D6 (Movable) | | |
| 7 (Stop) | ∞ | 0.30 | | |
| 8 (Aspheric Surface) | 7.369 | 2.31 | 1.49700 | 81.61 |
| 9 (Aspheric Surface) | −16.140 | 0.20 | | |
| 10 | 7.301 | 2.12 | 1.51633 | 64.14 |
| 11 | −29.616 | 0.65 | 1.88300 | 40.76 |
| 12 | 5.949 | 0.76 | | |
| 13 | 18.829 | 1.44 | 1.49700 | 81.61 |
| 14 | −11.625 | D14 (Movable) | | |
| 15 | 49.027 | 0.50 | 1.51633 | 64.14 |
| 16 | 7.280 | D16 (Movable) | | |
| 17 | −30.321 | 1.37 | 1.58313 | 59.38 |
| 18 (Aspheric Surface) | −6.500 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = 0.000
A4 = −1.45485e−04
A6 = 2.21950e−06

2nd surface k = 0.000
A4 = −5.53232e−04
A6 = −2.78863e−06

8th surface k = 0.000
A4 = −2.34578e−04
A6 = −1.46857e−06

9th surface k = 0.000
A4 = 2.72565e−04
A6 = −1.13653e−06
A8 = 3.48499e−08

18th surface k = −4.760
A4 = 6.28530e−04
A6 = −2.04495e−05

Zoom Data

| Zoom Ratio | | 4.81 | |
|---|---|---|---|
| | Wide-Angle | Intermediate | Telephoto |
| Focal Length | 4.75 | 10.43 | 22.85 |
| FN0. | 3.40 | 5.77 | 6.59 |
| Angle of View (2ω) | 87.32 | 39.12 | 18.29 |
| Image Height | 3.86 | 3.86 | 3.86 |
| D6 | 19.28 | 10.21 | 1.00 |
| D14 | 3.16 | 1.51 | 4.81 |
| D16 | 3.63 | 15.10 | 21.45 |
| D18 | 1.50 | 0.74 | 0.30 |
| fb (in air) | 2.93 | 2.12 | 1.69 |
| Full Length (in air) | 50.25 | 50.20 | 50.22 |

Focal Length of Each Group

| 1st group | −11.16 |
|---|---|
| 2nd group | 10.56 |
| 3rd group | −16.63 |
| 4th group | 13.89 |

NUMERAL EXAMPLE 4

Surface Data

| Surface No. | R | D | $n_d$ | $\nu_d$ |
|---|---|---|---|---|
| 1 (Aspheric Surface) | −44.931 | 0.74 | 1.74320 | 49.34 |
| 2 (Aspheric Surface) | 6.789 | 2.21 | | |
| 3 | ∞ | 7.50 | 1.81600 | 46.62 |
| 4 | ∞ | 0.20 | | |
| 5 | 17.887 | 1.05 | 1.92286 | 18.90 |
| 6 | 29.293 | D6 (Movable) | | |
| 7 (Stop) | ∞ | 0.30 | | |
| 8 (Aspheric Surface) | 7.585 | 2.50 | 1.49700 | 81.61 |
| 9 (Aspheric Surface) | −14.670 | 0.20 | | |
| 10 | 7.733 | 2.26 | 1.51633 | 64.14 |
| 11 | −20.202 | 0.77 | 1.88300 | 40.76 |
| 12 | 6.320 | 0.82 | | |
| 13 | 27.689 | 1.44 | 1.49700 | 81.61 |
| 14 | −10.508 | D14 (Movable) | | |
| 15 | 46.223 | 0.50 | 1.51633 | 64.14 |
| 16 | 7.607 | D16 (Movable) | | |
| 17 | −28.813 | 1.37 | 1.58313 | 59.38 |
| 18 (Aspheric Surface) | −6.500 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = 0.000
A4 = −4.97443e−05
A6 = 7.97258e−07

2nd surface k = 0.000
A4 = −4.55525e−04
A6 = 6.18182e−07
A8 = −1.38791e−07

8th surface k = 0.000
A4 = −2.29544e−04
A6 = −2.42830e−06
A8 = 1.04452e−07

9th surface k = 0.000
A4 = 2.77927e−04
A6 = −2.48690e−06
A8 = 1.46426e−07

18th surface k = −4.937
A4 = 4.57419e−04
A6 = −1.51141e−05

Zoom Data

| Zoom Ratio | | 4.81 | |
|---|---|---|---|
| | Wide-Angle | Intermediate | Telephoto |
| Focal Length | 4.75 | 10.43 | 22.85 |
| FN0. | 3.43 | 5.81 | 6.29 |
| Angle of View (2ω) | 87.32 | 39.14 | 18.32 |
| Image Height | 3.86 | 3.86 | 3.86 |
| D6 | 19.33 | 10.19 | 1.00 |
| D14 | 3.35 | 1.50 | 5.27 |
| D16 | 3.33 | 14.99 | 20.90 |
| D18 | 1.46 | 0.79 | 0.30 |
| fb (in air) | 2.88 | 2.17 | 1.69 |
| Full Length (in air) | 50.75 | 50.70 | 50.72 |

Focal Length of Each Group

| 1st group | −11.16 |
|---|---|
| 2nd group | 10.84 |
| 3rd group | −17.71 |
| 4th group | 14.08 |

NUMERAL EXAMPLE 5

Surface Data

| Surface No. | R | D | $n_d$ | $\nu_d$ |
|---|---|---|---|---|
| 1 (Aspheric Surface) | −25.863 | 0.77 | 1.74320 | 49.34 |
| 2 (Aspheric Surface) | 7.502 | 1.95 | | |
| 3 | ∞ | 8.70 | 1.88300 | 40.76 |
| 4 | ∞ | 0.40 | | |
| 5 (Aspheric Surface) | −37.022 | 1.33 | 1.63493 | 23.90 |
| 6 (Aspheric Surface) | −15.121 | D6 (Movable) | | |
| 7 (Stop) | ∞ | 0.30 | | |
| 8 (Aspheric Surface) | 6.996 | 2.73 | 1.49700 | 81.61 |
| 9 (Aspheric Surface) | −20.559 | 0.10 | | |
| 10 | 8.318 | 2.40 | 1.52249 | 59.84 |
| 11 | −22.894 | 0.50 | 1.88300 | 40.76 |
| 12 | 5.652 | 0.70 | | |
| 13 | 10.058 | 1.36 | 1.49700 | 81.61 |
| 14 | 889.586 | D14 (Movable) | | |
| 15 | 19.572 | 0.80 | 1.52542 | 55.78 |
| 16 | 9.077 | D16 (Movable) | | |
| 17 (Aspheric Surface) | 17.377 | 2.09 | 1.52542 | 55.78 |
| 18 | −15.000 | D18 (Movable) | | |
| 19 | ∞ | 0.30 | 1.51633 | 64.14 |
| 20 | ∞ | 0.50 | | |

| | | | | |
|---|---|---|---|---|
| 21 | ∞ | 0.50 | 1.51633 | 64.14 |
| 22 | ∞ | 0.37 | | |
| Image Plane | ∞ | | | |

Aspheric Coefficient

1st surface k = −1.042
A4 = 2.32644e−05

2nd surface k = −1.020
A4 = 1.26305e−04

5th surface k = 0.000
A4 = 1.48852e−04

6th surface k = 0.000
A4 = 3.64996e−05

8th surface k = −1.444
A4 = 3.11175e−04
A6 = 1.58835e−07

9th surface k = 0.000
A4 = 1.14588e−04
A6 = −7.67453e−07

17th surface k = 0.000
A4 = −5.72695e−04

Zoom Data

| Zoom Ratio | | 4.80 | |
|---|---|---|---|
| | Wide-Angle | Intermediate | Telephoto |
| Focal Length | 5.10 | 11.10 | 24.47 |
| FN0. | 3.40 | 5.79 | 6.52 |
| Angle of View (2ω) | 82.54 | 37.19 | 17.14 |
| Image Height | 3.86 | 3.86 | 3.86 |
| D6 | 22.17 | 11.44 | 1.00 |
| D14 | 3.74 | 2.02 | 10.02 |
| D16 | 3.05 | 17.22 | 20.93 |
| D18 | 3.25 | 1.52 | 0.30 |
| fb (in air) | 4.66 | 2.89 | 1.69 |
| Full Length (in air) | 57.75 | 57.70 | 57.77 |

Focal Length of Each Group

| 1st group | −13.15 |
|---|---|
| 2nd group | 14.10 |
| 3rd group | −33.08 |
| 4th group | 15.67 |

NUMERAL EXAMPLE 6

Surface Data

| Surface No. | R | D | $n_d$ | $v_d$ |
|---|---|---|---|---|
| 1 | −89.068 | 0.50 | 1.83481 | 42.71 |
| 2 | 6.884 | 2.12 | | |
| 3 | ∞ | 8.40 | 1.88300 | 40.76 |
| 4 | ∞ | 0.93 | | |
| 5 (Aspheric Surface) | −13.000 | 1.58 | 1.63493 | 23.90 |
| 6 (Aspheric Surface) | −9.356 | D6 (Movable) | | |
| 7 (Stop) | ∞ | 0.30 | | |
| 8 (Aspheric Surface) | 7.673 | 2.74 | 1.49700 | 81.61 |
| 9 (Aspheric Surface) | 23.982 | 1.18 | | |
| 10 | 7.940 | 2.76 | 1.51633 | 64.14 |
| 11 | −12.243 | 0.50 | 1.88300 | 40.76 |
| 12 | 6.256 | 0.66 | | |
| 13 | 12.546 | 1.26 | 1.49700 | 81.61 |
| 14 | −126.439 | D14 (Movable) | | |
| 15 | 18.587 | 0.80 | 1.52542 | 55.78 |
| 16 | 9.591 | D16 (Movable) | | |
| 17 (Aspheric Surface) | 17.008 | 2.12 | 1.52542 | 55.78 |
| 18 | −15.000 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

5th surface k = 0.000
A4 = 1.90046e−04
A6 = 2.49328e−07
A8 = 3.96175e−08

6th surface k = 0.000
A4 = 4.07608e−05

8th surface k = −1.679
A4 = 3.47496e−04

9th surface k = 0.000
A4 = 9.08894e−05
A6 = −9.69760e−07

17th surface k = 0.000
A4 = −4.78166e−04
A6 = −2.66875e−06

Zoom Data

| Zoom Ratio | | 4.79 | |
|---|---|---|---|
| | Wide-Angle | Intermediate | Telephoto |
| Focal Length | 5.10 | 11.19 | 24.44 |
| FN0. | 3.45 | 5.93 | 6.55 |
| Angle of View (2ω) | 82.67 | 37.07 | 17.16 |
| Image Height | 3.86 | 3.86 | 3.86 |
| D6 | 22.69 | 11.74 | 1.00 |
| D14 | 3.35 | 2.02 | 14.77 |
| D16 | 3.08 | 17.25 | 16.51 |
| D18 | 3.36 | 1.47 | 0.30 |
| fb (in air) | 4.78 | 2.86 | 1.69 |
| Full Length (in air) | 59.75 | 59.71 | 59.81 |

Focal Length of Each Group

| 1st group | −12.78 |
|---|---|
| 2nd group | 14.99 |
| 3rd group | −38.91 |
| 4th group | 15.52 |

NUMERAL EXAMPLE 7

Surface Data

| Surface No. | R | D | $n_d$ | $v_d$ |
|---|---|---|---|---|
| 1(Aspheric Surface) | −19.308 | 1.18 | 1.52542 | 55.78 |
| 2(Aspheric Surface) | 5.453 | 2.50 | | |

-continued

| | | | | |
|---|---|---|---|---|
| 3 | ∞ | 7.35 | 1.88300 | 40.76 |
| 4 | ∞ | 0.30 | | |
| 5 | 82.699 | 1.16 | 1.63493 | 23.90 |
| 6(Aspheric Surface) | −47.112 | D6 (Movable) | | |
| 7(Aspheric Surface) | 8.239 | 2.58 | 1.49700 | 81.61 |
| 8(Aspheric Surface) | −17.428 | 0.60 | | |
| 9(Stop) | ∞ | 0.60 | | |
| 10 | 11.058 | 2.18 | 1.51633 | 64.14 |
| 11 | −15.594 | 0.50 | 1.88300 | 40.76 |
| 12 | 8.034 | 0.72 | | |
| 13 | 22.855 | 1.73 | 1.51633 | 64.14 |
| 14 | −9.643 | D14 (Movable) | | |
| 15 | 38.825 | 0.80 | 1.52542 | 55.78 |
| 16(Aspheric Surface) | 7.150 | D16 (Movable) | | |
| 17 | −222.247 | 2.20 | 1.52542 | 55.78 |
| 18(Aspheric Surface) | −5.764 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface $k = -1.013$
$A4 = -1.75619e-05$

2nd surface $k = -1.414$
$A4 = 4.06305e-04$

6th surface $k = 0.000$
$A4 = -8.86089e-05$
$A6 = -7.99007e-07$

7th surface $k = 0.000$
$A4 = -1.69854e-04$

8th surface $k = 0.000$
$A4 = 2.58754e-04$

16th surface $k = 0.000$
$A4 = -5.95838e-05$
$A6 = -4.76001e-06$

18th surface $k = 0.000$
$A4 = 3.48983e-03$
$A6 = -9.26949e-05$
$A8 = 1.96737e-06$ Zoom Data
Zoom Ratio 4.81

| | Wide-Angle | Intermediate | Telephoto |
|---|---|---|---|
| Focal Length | 5.05 | 11.11 | 24.29 |
| FNO. | 3.23 | 5.62 | 5.99 |
| Angle of View (2ω) | 82.56 | 36.67 | 17.15 |
| Image Height | 3.84 | 3.84 | 3.84 |
| D6 | 19.58 | 10.04 | 0.00 |
| D14 | 4.29 | 3.01 | 7.34 |
| D16 | 3.39 | 14.95 | 21.00 |
| D18 | 1.38 | 0.64 | 0.30 |
| fb (in air) | 2.80 | 2.02 | 1.69 |
| Full Length (in air) | 54.75 | 54.71 | 54.72 |

-continued

Focal Length of Each Group

| 1st group | −11.75 |
|---|---|
| 2nd group | 12.09 |
| 3rd group | −16.83 |
| 4th group | 11.22 |

NUMERAL EXAMPLE 8

Surface Data

| Surface No. | R | D | $n_d$ | $v_d$ |
|---|---|---|---|---|
| 1(Aspheric Surface) | −34.174 | 0.90 | 1.74320 | 49.34 |
| 2(Aspheric Surface) | 6.795 | 1.97 | | |
| 3 | ∞ | 7.80 | 1.81600 | 46.62 |
| 4 | ∞ | 1.70 | 1.82115 | 24.06 |
| 5(Aspheric Surface) | −31.194 | D6 (Movable) | | |
| 6(Stop) | ∞ | 0.30 | | |
| 7(Aspheric Surface) | 10.590 | 3.31 | 1.49700 | 81.61 |
| 8(Aspheric Surface) | −37.221 | 0.16 | | |
| 9 | 7.383 | 3.53 | 1.49700 | 81.61 |
| 10 | 105.184 | 0.50 | 1.88300 | 40.76 |
| 11 | 6.152 | 0.70 | | |
| 12(Aspheric Surface) | 8.690 | 2.11 | 1.49700 | 81.61 |
| 13(Aspheric Surface) | −48.196 | D13 (Movable) | | |
| 14 | 19.470 | 0.80 | 1.52542 | 55.78 |
| 15(Aspheric Surface) | 7.419 | D15 (Movable) | | |
| 16 | 33.374 | 2.23 | 1.52542 | 55.78 |
| 17(Aspheric Surface) | −8.231 | D17 (Movable) | | |
| 18 | ∞ | 0.30 | 1.51633 | 64.14 |
| 19 | ∞ | 0.50 | | |
| 20 | ∞ | 0.50 | 1.51633 | 64.14 |
| 21 | ∞ | 0.37 | | |
| Image Plane | ∞ | | | |

Aspheric Coefficient

1st surface $k = 14.955$
$A4 = -1.38685e-04$
$A6 = 1.27819e-06$

2nd surface $k = -1.186$
$A4 = -9.77247e-05$
$A6 = -1.24688e-06$

5th surface $k = 0.000$
$A4 = -5.98442e-05$
$A6 = -2.54845e-07$

7th surface $k = 0.000$
$A4 = -1.16505e-05$
$A6 = -5.60946e-07$

8th surface $k = 0.000$
$A4 = 1.19972e-04$
$A6 = -1.09938e-06$

12th surface $k = 0.000$
$A4 = 1.17284e-04$
$A6 = 8.05104e-06$

13th surface $k = 0.000$
$A4 = 2.71559e-04$
$A6 = 1.17538e-05$

-continued

| 15th surface |
|---|
| k = 0.000 |
| A4 = −3.73399e−05 |
| A6 = −3.03036e−06 |

| 17th surface |
|---|
| k = 0.000 |
| A4 = 1.88117e−03 |
| A6 = −3.70572e−05 |
| A8 = 3.45642e−07 |

Zoom Data
Zoom Ratio 4.90

|  | Wide-Angle | Intermediate | Telephoto |
|---|---|---|---|
| Focal Length | 5.10 | 11.30 | 25.01 |
| FNO. | 2.04 | 3.52 | 5.03 |
| Angle of View (2ω) | 74.49 | 33.16 | 15.29 |
| Image Height | 3.50 | 3.50 | 3.50 |
| D6 | 22.10 | 11.63 | 1.00 |
| D13 | 4.36 | 2.51 | 9.11 |
| D15 | 3.05 | 16.30 | 20.93 |
| D17 | 1.83 | 0.89 | 0.30 |
| fb (in air) | 3.25 | 2.27 | 1.67 |
| Full Length (in air) | 58.75 | 58.71 | 58.71 |

Focal Length of Each Group

| 1st group | −12.40 |
|---|---|
| 2nd group | 13.46 |
| 3rd group | −23.35 |
| 4th group | 12.80 |

NUMERAL EXAMPLE 9

Surface Data

| Surface No. | R | D | $n_d$ | $v_d$ |
|---|---|---|---|---|
| 1(Aspheric Surface) | −17.002 | 0.72 | 1.69350 | 53.21 |
| 2(Aspheric Surface) | 7.526 | 1.90 | | |
| 3 | ∞ | 7.45 | 1.83481 | 42.71 |
| 4 | ∞ | 0.20 | | |
| 5 | 28.193 | 1.16 | 1.84666 | 23.78 |
| 6 | 450.740 | D6 (Movable) | | |
| 7(Stop) | ∞ | 0.50 | | |
| 8(Aspheric Surface) | 7.169 | 2.99 | 1.49700 | 81.61 |
| 9(Aspheric Surface) | −17.576 | 0.20 | | |
| 10 | 8.372 | 2.32 | 1.51633 | 64.14 |
| 11 | −37.586 | 0.50 | 1.88300 | 40.76 |
| 12 | 5.499 | 0.54 | | |
| 13 | 7.460 | 2.00 | 1.49700 | 81.61 |
| 14 | −16.759 | D14 (Movable) | | |
| 15(Aspheric Surface) | 65.943 | 0.50 | 1.51633 | 64.14 |
| 16(Aspheric Surface) | 6.271 | D16 (Movable) | | |
| 17 | 468.642 | 1.59 | 1.74320 | 49.34 |
| 18(Aspheric Surface) | −9.106 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

| 1st surface |
|---|
| k = −7.695 |
| A4 = −1.23370e−04 |
| A6 = 1.00693e−06 |

-continued

| 2nd surface |
|---|
| k = 0.000 |
| A4 = −4.69528e−04 |
| A6 = 3.77253e−09 |
| A8 = −5.69632e−08 |

| 8th surface |
|---|
| k = 0.000 |
| A4 = −2.08779e−04 |
| A6 = −3.93525e−06 |
| A8 = 3.76506e−08 |

| 9th surface |
|---|
| k = 0.000 |
| A4 = 3.12372e−04 |
| A6 = −4.43692e−06 |
| A8 = 1.23525e−07 |

| 15th surface |
|---|
| k = 0.000 |
| A4 = 8.48272e−04 |
| A6 = −9.74055e−05 |
| A8 = 5.16376e−06 |

| 16th surface |
|---|
| k = 0.000 |
| A4 = 8.53439e−04 |
| A6 = −1.14159e−04 |
| A8 = 5.93228e−06 |

| 18th surface |
|---|
| k = 0.000 |
| A4 = 1.28808e−03 |
| A6 = −1.75311e−05 |

Zoom Data
Zoom Ratio 4.84

|  | Wide-Angle | Intermediate | Telephoto |
|---|---|---|---|
| Focal Length | 5.08 | 10.00 | 19.50 |
| FNO. | 2.07 | 3.29 | 4.88 |
| Angle of View (2ω) | 82.62 | 40.65 | 21.37 |
| Image Height | 3.86 | 3.86 | 3.86 |
| D6 | 16.74 | 9.09 | 1.20 |
| D14 | 2.39 | 1.51 | 3.08 |
| D16 | 3.82 | 13.08 | 19.99 |
| D18 | 1.81 | 1.08 | 0.50 |
| fb (in air) | 3.23 | 2.46 | 1.90 |
| Full Length (in air) | 48.75 | 48.71 | 48.74 |

Focal Length of Each Group

| 1st group | −12.10 |
|---|---|
| 2nd group | 10.37 |
| 3rd group | −13.46 |
| 4th group | 12.04 |

NUMERAL EXAMPLE 10

Surface Data

| Surface No. | R | D | $n_d$ | $v_d$ |
|---|---|---|---|---|
| 1(Aspheric Surface) | −20.848 | 1.15 | 1.52542 | 55.78 |
| 2(Aspheric Surface) | 5.696 | 2.50 | | |
| 3 | ∞ | 7.35 | 1.80610 | 40.92 |
| 4 | ∞ | 0.40 | | |
| 5 | −52.943 | 1.15 | 1.63493 | 23.90 |
| 6(Aspheric Surface) | −20.677 | D6 (Movable) | | |
| 7(Stop) | ∞ | 0.30 | | |
| 8(Aspheric Surface) | 7.475 | 2.46 | 1.49700 | 81.61 |
| 9(Aspheric Surface) | −15.504 | 0.53 | | |
| 10 | 8.718 | 2.15 | 1.51633 | 64.14 |

-continued

| | | | | |
|---|---|---|---|---|
| 11 | −21.187 | 0.50 | 1.88300 | 40.76 |
| 12 | 6.839 | 0.95 | | |
| 13 | 144.444 | 1.31 | 1.51633 | 64.14 |
| 14 | −11.007 | D14 (Movable) | | |
| 15(Aspheric Surface) | 40.100 | 0.80 | 1.52542 | 55.78 |
| 16(Aspheric Surface) | 7.469 | D16 (Movable) | | |
| 17 | 127.980 | 2.30 | 1.52542 | 55.78 |
| 18(Aspheric Surface) | −5.899 | D18 | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface $k = -1.017$
$A4 = -1.60827e-05$

2nd surface $k = -1.579$
$A4 = 5.98410e-04$

6th surface $k = 0.000$
$A4 = -1.08812e-04$
$A6 = -1.10248e-06$

8th surface $k = 0.000$
$A4 = -2.29430e-04$
$A6 = -2.57629e-06$

9th surface $k = 0.000$
$A4 = 2.84535e-04$
$A6 = -3.03024e-06$
$A8 = 5.83059e-08$ 15th surface $k = 0.000$
$A4 = 6.09419e-05$
$A6 = -4.47367e-06$ 16th surface $k = 0.000$
$A4 = -1.32624e-05$
$A6 = 1.18867e-07$ 18th surface $k = 0.000$
$A4 = 3.15519e-03$
$A6 = -6.81782e-05$
$A8 = 1.33063e-06$ Zoom Data
Zoom Ratio 4.79

| | Wide-Angle | Intermediate | Telephoto |
|---|---|---|---|
| Focal Length | 5.03 | 11.01 | 24.07 |
| FNO. | 3.51 | 6.04 | 6.53 |
| Angle of View (2ω) | 82.45 | 36.77 | 17.26 |
| Image Height | 3.84 | 3.84 | 3.84 |
| D6 | 20.56 | 10.98 | 1.00 |
| D14 | 4.37 | 3.01 | 7.22 |
| D16 | 3.04 | 14.72 | 21.02 |
| D18 | 1.51 | 0.76 | 0.30 |
| fb (in air) | 2.93 | 2.14 | 1.69 |
| Full Length (in air) | 54.75 | 54.71 | 54.78 |

-continued

Focal Length of Each Group

| 1st group | −12.27 |
|---|---|
| 2nd group | 12.26 |
| 3rd group | −17.62 |
| 4th group | 10.80 |

NUMERAL EXAMPLE 11

Surface Data

| Surface No. | R | D | $n_d$ | $v_d$ |
|---|---|---|---|---|
| 1(Aspheric Surface) | −16.351 | 0.54 | 1.74320 | 49.34 |
| 2(Aspheric Surface) | 5.696 | 1.61 | | |
| 3 | ∞ | 5.60 | 1.83481 | 42.71 |
| 4 | ∞ | 0.20 | | |
| 5 | 19.274 | 1.01 | 1.92286 | 18.90 |
| 6 | 51.502 | D6 (Movable) | | |
| 7(Stop) | ∞ | 0.00 | | |
| 8(Aspheric Surface) | 6.500 | 1.84 | 1.49700 | 81.61 |
| 9(Aspheric Surface) | −10.554 | 0.20 | | |
| 10 | 7.875 | 1.69 | 1.51633 | 64.14 |
| 11 | −11.979 | 1.61 | 1.88300 | 40.76 |
| 12 | 5.725 | 0.94 | | |
| 13 | 14.741 | 1.33 | 1.49700 | 81.61 |
| 14 | −7.732 | D14 (Movable) | | |
| 15 | 29.693 | 0.50 | 1.52542 | 55.78 |
| 16 | 6.000 | D16 (Movable) | | |
| 17 | 20.090 | 1.67 | 1.52542 | 55.78 |
| 18(Aspheric Surface) | −12.056 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface $k = 0.000$
$A4 = -5.57135e-06$
$A6 = 4.64714e-06$

2nd surface $k = 0.000$
$A4 = -9.91604e-04$

8th surface $k = 0.000$
$A4 = -3.88353e-04$

9th surface $k = 0.000$
$A4 = 5.55958e-04$

18th surface $k = 0.000$
$A4 = 1.38069e-03$
$A6 = -3.17877e-05$

Zoom Data
Zoom Ratio 2.85

| | Wide-Angle | Intermediate | Telephoto |
|---|---|---|---|
| Focal Length | 5.05 | 8.53 | 14.39 |
| FNO. | 3.13 | 4.34 | 5.75 |
| Angle of View (2ω) | 84.07 | 48.30 | 28.69 |
| Image Height | 3.86 | 3.86 | 3.86 |
| D6 | 9.43 | 4.93 | 0.40 |
| D14 | 2.53 | 2.77 | 5.71 |
| D16 | 3.22 | 8.20 | 10.18 |
| D18 | 1.41 | 0.70 | 0.30 |

|  | | | |
|---|---|---|---|
| fb (in air) | 2.82 | 2.09 | 1.70 |
| Full Length (in air) | 36.74 | 36.72 | 36.73 |

Focal Length of Each Group

| | |
|---|---|
| 1st group | −8.17 |
| 2nd group | 8.81 |
| 3rd group | −14.42 |
| 4th group | 14.60 |

NUMERAL EXAMPLE 12

Surface Data

| Surface No. | R | D | $n_d$ | $v_d$ |
|---|---|---|---|---|
| 1(Aspheric Surface) | −21.341 | 0.64 | 1.74320 | 49.34 |
| 2(Aspheric Surface) | 6.978 | 1.80 | | |
| 3 | ∞ | 6.60 | 1.83481 | 42.71 |
| 4 | ∞ | 0.62 | | |
| 5 | 19.841 | 1.02 | 1.92286 | 18.90 |
| 6 | 39.840 | D6 (Movable) | | |
| 7(Stop) | ∞ | −0.20 | | |
| 8(Aspheric Surface) | 6.787 | 1.97 | 1.49700 | 81.61 |
| 9(Aspheric Surface) | −14.061 | 0.20 | | |
| 10 | 6.704 | 1.94 | 1.51633 | 64.14 |
| 11 | −18.562 | 1.33 | 1.88300 | 40.76 |
| 12 | 5.135 | 0.61 | | |
| 13 | 14.677 | 1.28 | 1.49700 | 81.61 |
| 14 | −11.506 | D14 (Movable) | | |
| 15 | 38.652 | 0.70 | 1.52542 | 55.78 |
| 16 | 6.862 | D16 (Movable) | | |
| 17 | −295.798 | 1.85 | 1.52542 | 55.78 |
| 18(Aspheric Surface) | −6.157 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = 0.000
A4 = 4.63920e−05
A6 = 1.20973e−06

2nd surface k = 0.000
A4 = −4.10119e−04
A6 = 1.86490e−06

8th surface k = 0.000
A4 = −2.42036e−04
A6 = −7.92356e−06

9th surface k = 0.000
A4 = 3.42518e−04
A6 = −9.21678e−06
A8 = 1.39485e−07

18th surface k = −6.047
A4 = −1.44839e−04
A6 = −2.41408e−06

Zoom Data
Zoom Ratio 3.85

| | Wide-Angle | Intermediate | Telephoto |
|---|---|---|---|
| Focal Length | 4.96 | 9.81 | 19.10 |
| FNO. | 2.86 | 4.49 | 6.58 |
| Angle of View (2ω) | 85.05 | 42.04 | 21.82 |
| Image Height | 3.86 | 3.86 | 3.86 |
| D6 | 14.31 | 7.40 | 0.70 |
| D14 | 2.73 | 2.11 | 6.01 |
| D16 | 3.03 | 11.01 | 14.10 |
| D18 | 1.39 | 0.94 | 0.66 |
| fb (in air) | 2.81 | 2.31 | 2.05 |
| Full Length (in air) | 43.25 | 43.20 | 43.22 |

Focal Length of Each Group

| | |
|---|---|
| 1st group | −10.03 |
| 2nd group | 9.81 |
| 3rd group | −16.00 |
| 4th group | 11.94 |

NUMERAL EXAMPLE 13

Surface Data

| Surface No. | R | D | $n_d$ | $v_d$ |
|---|---|---|---|---|
| 1(Aspheric Surface) | −16.019 | 0.50 | 1.74320 | 49.34 |
| 2(Aspheric Surface) | 7.617 | 1.24 | | |
| 3 | ∞ | 5.60 | 1.83481 | 42.71 |
| 4 | ∞ | 0.20 | | |
| 5 | 20.583 | 0.98 | 1.92286 | 18.90 |
| 6 | 63.940 | D6 (Movable) | | |
| 7(Stop) | ∞ | 0.00 | | |
| 8(Aspheric Surface) | 5.791 | 1.82 | 1.49700 | 81.61 |
| 9(Aspheric Surface) | −11.879 | 0.20 | | |
| 10 | 4.959 | 1.27 | 1.51633 | 64.14 |
| 11 | 7.271 | 0.53 | 1.80518 | 25.42 |
| 12 | 3.566 | 0.88 | | |
| 13 | ∞ | 0.80 | | |
| 14 | ∞ | D14 (Movable) | | |
| 15 | −582.611 | 0.50 | 1.52542 | 55.78 |
| 16 | 17.244 | D16 (Movable) | | |
| 17 | 19.018 | 1.96 | 1.52542 | 55.78 |
| 18(Aspheric Surface) | −10.440 | D18 (Movable) | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.37 | | |
| Image Plane | ∞ | | | |

Aspheric Coefficient

1st surface k = 0.000
A4 = 2.27861e−04
A6 = 3.82712e−06

2nd surface k = 0.000
A4 = −1.85485e−04
A6 = 7.58811e−06
A8 = 4.30211e−07

8th surface k = 0.000
A4 = −6.69820e−04
A6 = −2.12856e−06

-continued

9th surface k = 0.000
A4 = 4.54619e−04
A6 = 5.22805e−06

18th surface k = 0.000
A4 = 8.00241e−04
A6 = −7.43344e−06

Zoom Data
Zoom Ratio 2.85

|  | Wide-Angle | Intermediate | Telephoto |
|---|---|---|---|
| Focal Length | 5.60 | 9.45 | 15.96 |
| FNO. | 3.37 | 4.63 | 6.09 |
| Angle of View (2ω) | 78.59 | 44.27 | 26.01 |
| Image Height | 3.86 | 3.86 | 3.86 |
| D6 | 11.16 | 5.66 | 0.40 |
| D14 | 2.61 | 2.50 | 12.28 |
| D16 | 3.00 | 8.62 | 4.09 |
| D18 | 2.09 | 2.09 | 2.09 |
| fb (in air) | 3.49 | 3.49 | 3.49 |
| Full Length (in air) | 36.73 | 36.73 | 36.73 |

Focal Length of Each Group

| 1st group | −10.51 |
|---|---|
| 2nd group | 9.88 |
| 3rd group | −31.87 |
| 4th group | 13.13 |

NUMERAL EXAMPLE 14

Surface Data

| Surface No. | R | D | $n_d$ | $v_d$ |
|---|---|---|---|---|
| 1(Aspheric Surface) | −17.220 | 0.50 | 1.74320 | 49.34 |
| 2(Aspheric Surface) | 6.994 | 1.16 |  |  |
| 3 | ∞ | 5.60 | 1.83481 | 42.71 |
| 4 | ∞ | 0.20 |  |  |
| 5 | 20.561 | 0.99 | 1.92286 | 18.90 |
| 6 | 75.052 | D6 (Movable) |  |  |
| 7(Stop) | ∞ | 0.00 |  |  |
| 8(Aspheric Surface) | 5.554 | 2.61 | 1.67790 | 55.34 |
| 9 | −510.360 | 0.50 | 1.80518 | 25.42 |
| 10 | 7.326 | 0.60 |  |  |
| 11 | 5.999 | 2.96 | 1.58313 | 59.38 |
| 12(Aspheric Surface) | 1418.775 | D12 (Movable) |  |  |
| 13 | −181.047 | 0.50 | 1.52542 | 55.78 |
| 14 | 10.000 | D14 (Movable) |  |  |
| 15 | 16.281 | 1.56 | 1.52542 | 55.78 |
| 16(Aspheric Surface) | −17.709 | D16 (Movable) |  |  |
| 17 | ∞ | 0.30 | 1.51633 | 64.14 |
| 18 | ∞ | 0.50 |  |  |
| 19 | ∞ | 0.50 | 1.51633 | 64.14 |
| 20 | ∞ | 0.37 |  |  |
| Image Plane | ∞ |  |  |  |

Aspheric Coefficient

1st surface k = 0.000
A4 = 1.08450e−04
A6 = 5.01520e−07

2nd surface k = 0.000
A4 = −4.03516e−04

8th surface k = 0.000
A4 = −−1.35152e−04

12th surface k = 0.000
A4 = 2.30253e−03
A6 = 6.15717e−05
A8 = 5.19875e−06

16th surface k = 0.000
A4 = 9.97933e−04
A6 = −1.81277e−05

Zoom Data
Zoom Ratio 2.85

|  | Wide-Angle | Intermediate | Telephoto |
|---|---|---|---|
| Focal Length | 5.60 | 8.94 | 15.96 |
| FNO. | 3.45 | 4.67 | 6.42 |
| Angle of View (2ω) | 78.38 | 47.08 | 26.24 |
| Image Height | 3.86 | 3.86 | 3.86 |
| D6 | 10.20 | 5.91 | 0.40 |
| D12 | 3.84 | 2.99 | 5.18 |
| D14 | 3.00 | 8.66 | 12.26 |
| D16 | 1.11 | 0.58 | 0.30 |
| fb (in air) | 2.50 | 1.98 | 1.70 |
| Full Length (in air) | 36.73 | 36.73 | 36.73 |

Focal Length of Each Group

| 1st group | −10.36 |
|---|---|
| 2nd group | 9.12 |
| 3rd group | −18.02 |
| 4th group | 16.40 |

FIGS. 15 to 28 are aberration diagrams for Examples 1 to 14 A at the wide-angle end, B in the intermediate setting, and C at the telephoto end, respectively.

In these aberration diagrams, SA, AS, DT and CC indicate spherical aberrations, astigmatism, distortion and chromatic aberration of magnification, respectively. Spherical aberrations SA are found at three wavelengths: 587.6 nm (d-line: a solid line), 435.8 nm (g-line: a one-dot line) and 656.3 nm (C-line: a broken line), and chromatic aberration of magnification CC is found at d-line basis two wavelengths: 435.8 nm (g-line: a one-dot line) and 656.3 nm (C-line: a broken line). Astigmatism DT is given for the sagittal image plane by a solid line, and the meridional image plane by a broken line. Note here that FNO is an F-number and w is a half angle of view.

Given below are the values of Conditions (1) to (16) in Examples 1 to 14.

| Condition | Example 1 | Example 2 | Example 3 | Example 4 |
|---|---|---|---|---|
| (1) fw/f13 | 0.129 | 0.141 | 0.102 | 0.1 |
| (2) ft/f13 | 0.503 | 0.55 | 0.49 | 0.479 |
| (3) fw/f11 | −0.674 | −0.678 | −0.602 | −0.603 |
| (4) ft/f11 | −2.628 | −2.642 | −2.895 | −2.897 |
| (5) f11/f13 | −0.191 | −0.208 | −0.169 | −0.165 |
| (6) 1/v13−1/v11 | 0.023 | 0.023 | 0.033 | 0.033 |
| (7) ff1/f1 | −0.836 | −0.848 | −0.91 | −0.912 |
| (8) (R11F + R11R)/ (R11F − R11R) | 0.468 | 0.405 | 0.739 | 0.737 |
| (9) D23t/D34t | 0.254 | 0.151 | 0.224 | 0.252 |
| (10) M3/M2 | 0.965 | 0.963 | 0.909 | 0.895 |
| (11) M4/M2 | −0.050 | −0.084 | −0.068 | −0.065 |
| (12) f4/f3 | −0.626 | −0.894 | −0.836 | −0.795 |
| (13) β23w | −0.548 | −0.566 | −0.529 | −0.529 |

-continued

| Condition | | | | |
|---|---|---|---|---|
| (14) β23t | −1.928 | −1.915 | −2.289 | −2.303 |
| (15) log(Δβ34)/logγ | 0.449 | 0.470 | 0.387 | 0.374 |
| (16) fw/f1 | −0.414 | −0.416 | −0.426 | −0.43 |

| Condition | Example 5 | Example 6 | Example 7 | Example 8 |
|---|---|---|---|---|
| (1) fw/f13 | 0.13 | 0.113 | 0.107 | 0.134 |
| (2) ft/f13 | 0.622 | 0.543 | 0.512 | 0.658 |
| (3) fw/f11 | −0.658 | −0.668 | −0.635 | −0.675 |
| (4) ft/f11 | −3.158 | −3.200 | −3.050 | −3.31 |
| (5) f11/f13 | −0.197 | −0.17 | −0.17 | −0.199 |
| (6) 1/ν13−1/ν11 | 0.022 | 0.018 | 0.024 | 0.021 |
| (7) ff1/f1 | −0.812 | −0.787 | −0.896 | −0.843 |
| (8) (R11F + R11R)/(R11F − R11R) | 0.550 | 0.857 | 0.56 | 0.668 |
| (9) D23t/D34t | 0.479 | 0.894 | 0.35 | 0.435 |
| (10) M3/M2 | 0.703 | 0.475 | 0.844 | 0.774 |
| (11) M4/M2 | −0.140 | −0.142 | −0.057 | −0.075 |
| (12) f4/f3 | −0.473 | −0.399 | −0.667 | −0.548 |
| (13) β23w | −0.589 | −0.615 | −0.571 | −0.569 |
| (14) β23t | −2.186 | −2.254 | −2.423 | −2.383 |
| (15) log(Δβ34)/logγ | 0.320 | 0.263 | 0.39 | 0.344 |
| (16) fw/f1 | −0.388 | −0.399 | −0.430 | −0.411 |

| Condition | Example 9 | Example 10 | Example 11 | Example 12 |
|---|---|---|---|---|
| (1) fw/f13 | 0.143 | 0.095 | 0.154 | 0.119 |
| (2) ft/f13 | 0.55 | 0.457 | 0.438 | 0.457 |
| (3) fw/f11 | −0.684 | −0.599 | −0.898 | −0.708 |
| (4) ft/f11 | −2.623 | −2.87 | −2.558 | −2.726 |
| (5) f11/f13 | −0.21 | −0.159 | −0.171 | −0.168 |
| (6) 1/ν13−1/ν11 | 0.023 | 0.024 | 0.033 | 0.033 |
| (7) ff1/f1 | −0.848 | −0.891 | −0.887 | −0.894 |
| (8) (R11F + R11R)/(R11F − R11R) | 0.386 | 0.571 | 0.483 | 0.507 |
| (9) D23t/D34t | 0.154 | 0.343 | 0.561 | 0.426 |
| (10) M3/M2 | 0.955 | 0.855 | 0.647 | 0.758 |
| (11) M4/M2 | −0.085 | −0.063 | −0.125 | −0.056 |
| (12) f4/f3 | −0.894 | −0.613 | −1.013 | −0.746 |
| (13) β23w | −0.576 | −0.567 | −0.794 | −0.645 |
| (14) β23t | −1.918 | −2.344 | −2.059 | −2.292 |
| (15) log(Δβ34)/logγ | 0.463 | 0.398 | 0.292 | 0.317 |
| (16) fw/f1 | −0.420 | −0.41 | −0.618 | −0.495 |

| Condition | Example 13 | Example 14 |
|---|---|---|
| (1) fw/f13 | 0.172 | 0.184 |
| (2) ft/f13 | 0.490 | 0.525 |
| (3) fw/f11 | −0.813 | −0.844 |
| (4) ft/f11 | −2.318 | −2.406 |
| (5) f11/f13 | −0.212 | −0.218 |
| (6) 1/ν13−1/ν11 | 0.033 | 0.033 |
| (7) ff1/f1 | −0.003 | −0.878 |
| (8) (R11F + R11R)/(R11F − R11R) | 0.355 | 0.422 |
| (9) D23t/D34t | 0.409 | 0.423 |
| (10) M3/M2 | 0.102 | 0.863 |
| (11) M4/M2 | 0 | −0.082 |
| (12) f4/f3 | −0.412 | −0.910 |
| (13) β23w | −0.762 | −0.664 |
| (14) β23t | −2.172 | −1.784 |
| (15) log(Δβ34)/logγ | 0.025 | 0.322 |
| (16) fw/f1 | −0.533 | −0.541 |

The invention may be applied to electronic imaging apparatus in general wherein an object image is formed through the zoom lens according to the embodiments as described above and that image is received at an electronic imaging device such as a CCD for imaging, and digital cameras and video cameras in particular, as embodied below.

Figure 29:
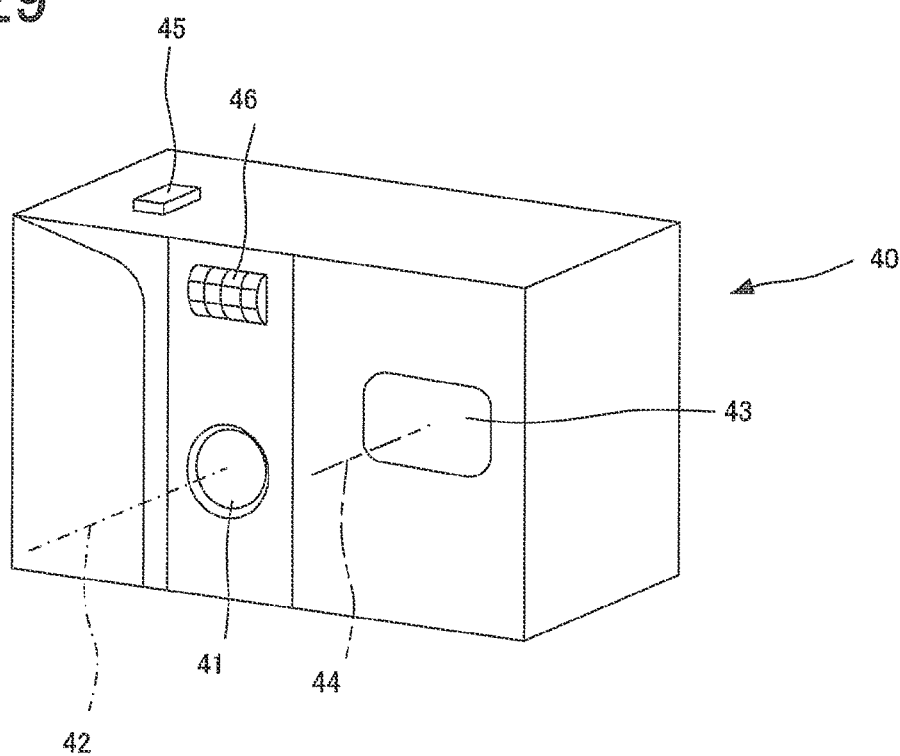
FIG. 29 is a sectional view of an imaging apparatus wherein the lens system according to one embodiment of the invention is used as an interchangeable lens.
Figure 30:
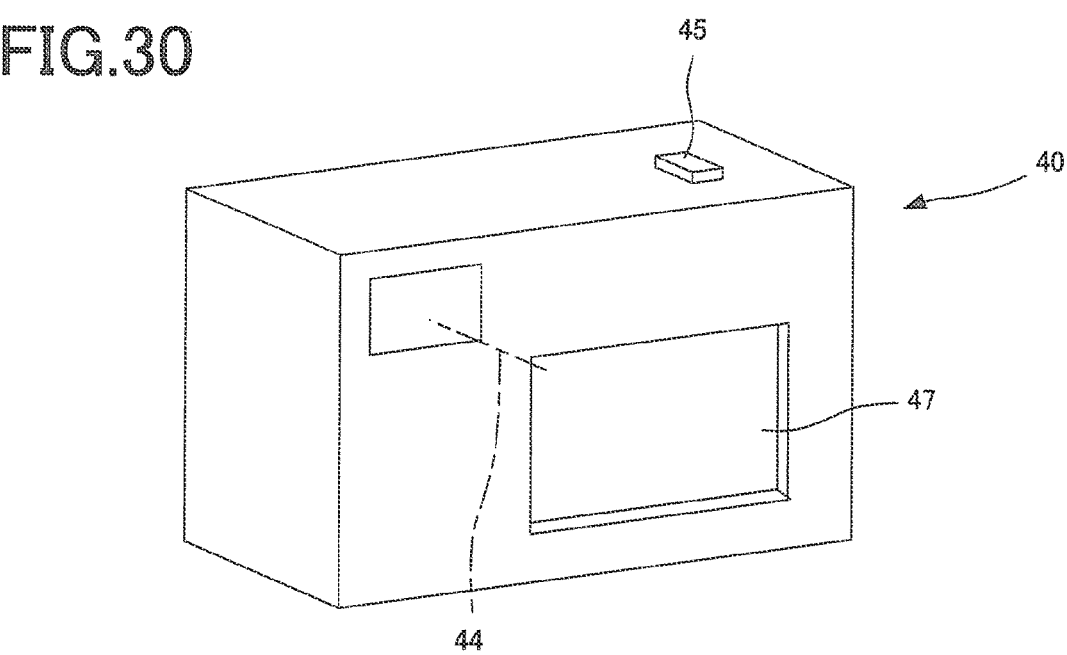
FIG. 30 is a front perspective view of the outside shape of the digital camera according to one embodiment of the invention.
Figure 31:
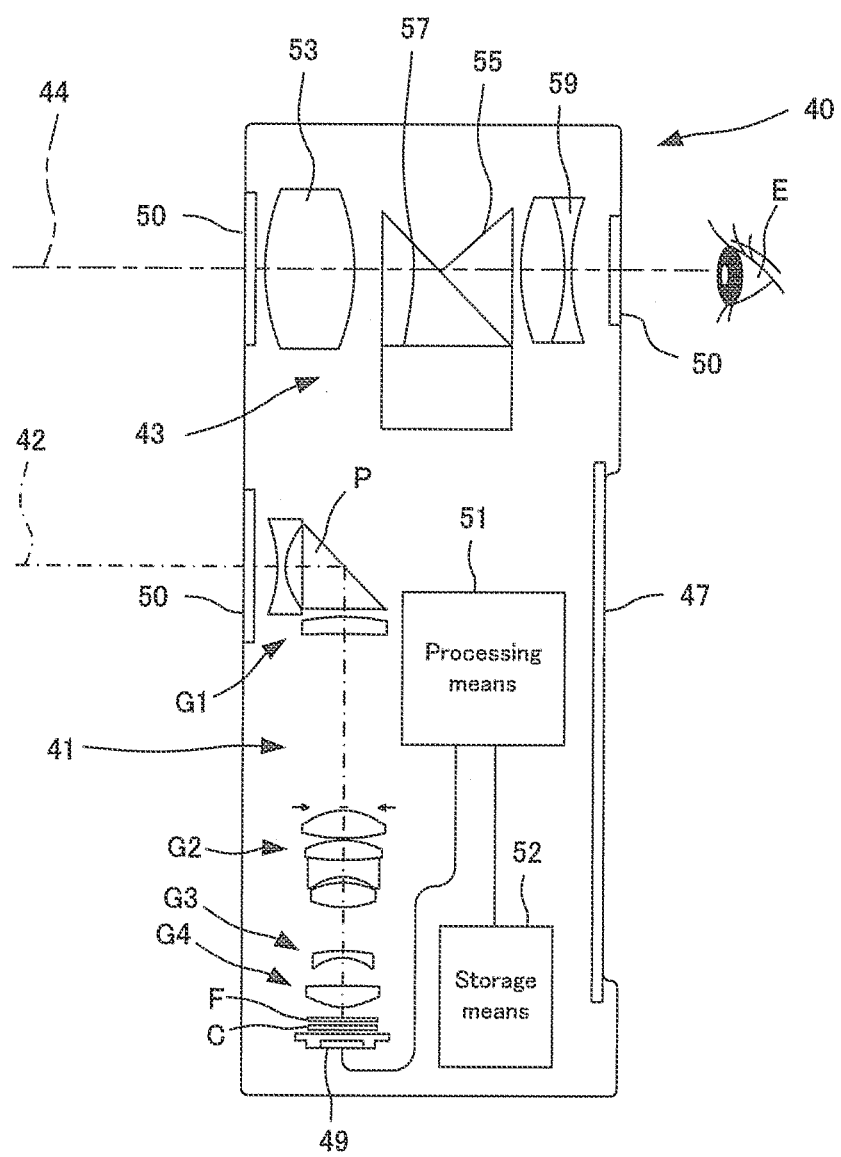
FIG. 31 is a rear perspective view of the outside shape of the digital camera according to one embodiment of the invention.

FIGS. 29, 30 and 31 are illustrative in conception of an arrangement in which the zoom lens disclosed herein is built in an image-taking optical system 41 of a digital camera: FIGS. 29 and 30 are a front perspective view and a rear perspective view of the outside shape of the digital camera 40, and FIG. 31 is a sectional view of the makeup of the digital camera 40.

In this embodiment, the digital camera 40 includes the image-taking optical system 41 having an image-taking optical path 42, a finder optical system 43 having a finder optical path 44, a shutter 45, a flash 46, a liquid crystal display monitor 47, and so on.

As the shutter 45 located on top of the camera 40 is pressed down, it causes images to be taken through the image-taking optical system 41, for instance, the optical path-bending zoom lens of Example 1. An object image formed through the image-taking optical system 41 is formed on the imaging plane of a CCD 49 via a near-infrared cut filter and an optical low-pass filter F. The object image received on the CCD 49 is displayed as an electronic image on a liquid crystal display monitor 47 located on the back of the camera via a processing means 51. That processing means 51 may be connected with a recording means 52 for the recording of taken electronic images.

It is here to be noted that the recording means 52 may be provided separately from the processing means 51 or, alternatively, it may be designed in such a way as to implement electronic recording or writing on flexible disks, memory cards, MOs, or the like. If silver halide film is provided in place of the CCD 49, then the digital camera may be set up as a silver-halide camera.

Moreover, a finder objective optical system 53 is located on the finder optical path 44. An object image formed by the finder objective optical system 53 is formed on a field-of-view frame 57 for a Porro prism 55 that is an image erecting member. In the rear of this Porro prism 55 there is an eyepiece optical system 59 located for guiding the erected, orthoscopic image onto the viewer eyeball E. It is here to be noted that a cover member 50 is located on the entrance side of the image-taking optical system 41 and finder objective optical system 53, and on the exit side of the eyepiece optical system 59.

The thus set-up digital camera 40 can perform better, be much more slimmed down in the depthwise direction and less costly, because the image-taking system 41 is provided by a zoom lens having a zoom ratio as high as about 5 and higher optical performance.

While a plane-parallel plate is located as the cover member 50 in the embodiment here, it is to be understood that it may be left out.

Figure 32:
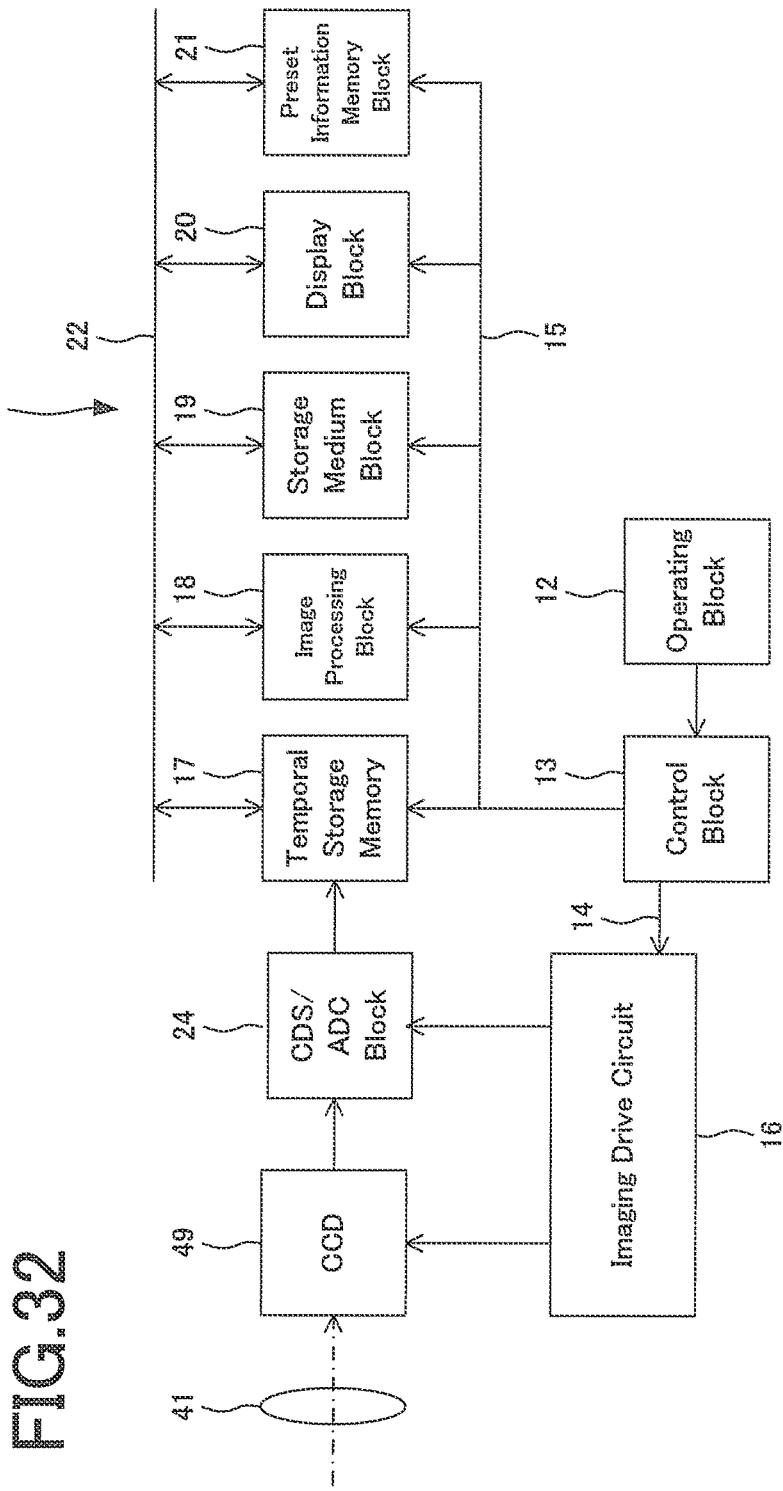
FIG. 32 is a block diagram illustrative of the control setup of the digital camera according to one embodiment of the invention.

FIG. 32 is a block diagram for the internal circuitry in the main part of the digital camera 40. In what follows, the aforesaid processing means shown by 51 is made up of a CDS/ADC block 24, a temporary storage memory 17, an image processing block 18, etc., and a storage means 52 is made up of a storage medium block, etc.

As shown in FIG. 32, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block 13. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 is an imaging device that is driven and controlled by the image-taking drive circuit 16 to convert light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of an SDRAM, etc.: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing inclusive of distortion correction based on an image quality parameter instructed by the control block 13.

The storage medium block 19 is a control circuit for a device that detachably receives a card type or stick type recording medium comprising typically a flash memory so that the RAW data transferred from the temporal memory 17 or image data processed at the image processing block 18 are recorded and held in that card type or stick type flash memory.

The display block 20 is built up of the liquid crystal display monitor 45 and such for displaying the taken images, operating menus or the like thereon. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12.

The thus assembled digital camera 40, because the inventive zoom lens is used as the imaging optical system 41, may be used as a small-format imaging apparatus suitable well fit for the taking of moving images.

While various embodiments of the invention have been explained, it is to be understood that the present invention is never limited to them alone, and embodiments comprising combinations of the essential requirements and limitations are embraced in the category of the invention too.

For instance, a lens substantially free of refracting power may be located in any one of the lens groups or, alternatively, apart from the first lens group G1 to the fourth lens group G4, a lens or lens group substantially void of refracting power may be disposed in place.

What is claimed is:

1. A zoom lens, comprising:
in order from an object side:
a first lens group having negative refracting power,
a second lens group that includes an aperture stop moving integrally therewith and has positive refracting power,
a third lens group having negative refracting power, and
a fourth lens group having positive refracting power; during zooming from a wide-angle end to a telephoto end,
the first lens group is fixed in position, the second lens group and the third lens group move toward the object side only, and the fourth lens group moves,
a spacing between the first lens group and the second lens group becomes narrow,
a spacing between the second lens group and the third lens group changes, and
a spacing between the third lens group and the fourth lens group grows wide;
wherein the first lens group consists of:
a first lens having negative refracting power,
an optical element having a reflective surface for bending a light ray coming out of an object, and
a second lens having positive refracting power, wherein the second lens having positive refracting power is a singlet positive lens;
wherein the second lens group comprises:
a cemented meniscus lens component concave to an image side including a positive lens element convex to the object side and a negative lens element concave to the image side, and
a positive lens component,
wherein the cemented meniscus lens component in the second lens group has the positive lens element positioned on the object side and the negative lens element positioned on the image side;
wherein the first lens in the first lens group is a bi-concave lens having an object-side surface concave to the object side, and the first lens in the first lens group satisfies the following Conditions (8) and (11):

$$-0.5 < (R11F + R11R)/(R11F - R11R) < 1.0 \qquad (8)$$

$$-0.5 < M4/M2 < -0.01 \qquad (11)$$

where R11F is a radius of curvature of the object-side surface of the first lens in the first lens group,
R11R is a radius of curvature of an image-side surface of the first lens in the first lens group,
M2 is an amount of movement of the second lens group from the wide-angle end to the telephoto end upon focusing on an infinite object point, and
M4 is an amount of movement of the fourth lens group from the wide-angle end to the telephoto end upon focusing on the infinite object point.

2. The zoom lens according to claim 1, wherein the first lens in the first lens group satisfies the following Condition:

$$-0.5 < (R11F + R11R)/(R11F - R11R) \leq 0.739$$

where R11F is a radius of curvature of the object-side surface of the first lens in the first lens group, and
R11R is a radius of curvature of an image-side surface of the first lens in the first lens group.

3. The zoom lens according to claim 1, which satisfies the following Condition (1):

$$0.095 \leq f_W/f13 < 1.0 \qquad (1)$$

where f13 is a focal length of said second lens in said first lens group, and fw is a focal length of the whole system at the wide-angle end upon focusing on an infinite object point.

4. The zoom lens according to claim 1, which satisfies the following Condition (2):

$$0.438 \leq ft/f13 < 3.0 \quad (2)$$

where f13 is a focal length of said second lens in said first lens group, and ft is a focal length of the whole system at the telephoto end upon focusing on an infinite object point.

5. The zoom lens according to claim 1, which satisfies the following Condition (3):

$$-3.0 < fw/f11 < -0.41 \quad (3)$$

where f11 is a focal length of said first lens in said first lens group, and fw is a focal length of the whole system at the wide-angle end upon focusing on an infinite object point.

6. The zoom lens according to claim 1, which satisfies the following Condition (4):

$$-9.0 < ft/f11 \leq -2.318 \quad (4)$$

where f11 is a focal length of said first lens in said first lens group, and ft is a focal length of the whole system at the telephoto end upon focusing on an infinite object point.

7. The zoom lens according to claim 1, which satisfies the following Condition (5):

$$-0.6 < f11/f13 \leq -0.159 \quad (5)$$

where f11 is a focal length of said first lens in said first lens group, and f13 is a focal length of said second lens in said first lens group.

8. The zoom lens according to claim 1, which satisfies the following Condition (6):

$$0.0181 < 1/v13 - 1/v11 < 0.05 \quad (6)$$

where v11 is an Abbe constant of a medium of said first lens in said first lens group, and v13 is an Abbe constant of a medium of said second lens in said first lens group.

9. The zoom lens according to claim 1, which satisfies the following Condition (7):

$$-1.50 < ff1/f1 < -0.20 \quad (7)$$

where f1 is a combined focal length of said first lens group, and ff1 is a front focal position of said first lens group.

10. The zoom lens according to claim 1, wherein the second lens group includes an additional positive lens component.

11. The zoom lens according to claim 1, which satisfies the following Condition:

$$-0.5 < (R11F+R11R)/(R11F-R11R) \leq 0.668.$$

12. A zoom lens, comprising:
in order from an object side:
a first lens group having negative refracting power,
a second lens group that includes an aperture stop moving integrally therewith and has positive refracting power,
a third lens group having negative refracting power, and
a fourth lens group having positive refracting power;
during zooming from a wide-angle end to a telephoto end,
the first lens group is fixed in position, the second lens group and the third lens group move toward the object side only, and the fourth lens group moves,
a spacing between the first lens group and the second lens group becomes narrow,
a spacing between the second lens group and the third lens group changes, and
a spacing between the third lens group and the fourth lens group grows wide;
wherein the first lens group consists of:
a first lens having negative refracting power,
an optical element having a reflective surface for bending a light ray coming out of an object, and
a second lens having positive refracting power, wherein the second lens having positive refracting power is a singlet positive lens;
wherein the second lens group, comprises:
in order from the object side:
a positive lens element convex to the object side,
a positive lens element convex to the object side, and
a negative lens element concave to an image side;
wherein the first lens in the first lens group is a bi-concave lens having an object-side surface concave to the object side, and the first lens in the first lens group satisfies the following Conditions (8) and (11):

$$-0.5 < (R11F+R11R)/(R11F-R11R) < 1.0 \quad (8)$$

$$-0.5 < M4/M2 < -0.01 \quad (11)$$

where R11F is a radius of curvature of the object-side surface of the first lens in the first lens group,
R11R is a radius of curvature of an image-side surface of the first lens in the first lens group,
M2 is an amount of movement of the second lens group from the wide-angle end to the telephoto end upon focusing on an infinite object point, and
M4 is an amount of movement of the fourth lens group from the wide-angle end to the telephoto end upon focusing on the infinite object point.

13. The zoom lens according to claim 12, wherein the first lens in the first lens group satisfies the following Condition:

$$-0.5 < (R11F+R11R)/(R11F-R11R) \leq 0.739$$

where R11F is a radius of curvature of an object-side surface of the first lens in the first lens group, and
R11R is a radius of curvature of an image-side surface of the first lens in the first lens group.

14. The zoom lens according to claim 12, wherein the second lens group includes an additional positive lens component.

15. The zoom lens according to claim 12, which satisfies the following Condition:

$$-0.5 < (R11F+R11R)/(R11F-R11R) \leq 0.668.$$

* * * * *